(12) United States Patent
Vitry

(10) Patent No.: US 6,786,518 B2
(45) Date of Patent: Sep. 7, 2004

(54) LOAD FLOOR LATCH

(75) Inventor: Fabrice Vitry, Worcester (GB)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 09/880,525

(22) Filed: Jun. 13, 2001

(65) Prior Publication Data
US 2002/0130521 A1 Sep. 19, 2002

Related U.S. Application Data

(60) Provisional application No. 60/211,150, filed on Jun. 13, 2000, provisional application No. 60/214,068, filed on Jun. 26, 2000, provisional application No. 60/219,923, filed on Jul. 21, 2000, provisional application No. 60/229,786, filed on Sep. 1, 2000, and provisional application No. 60/234,641, filed on Sep. 22, 2000.

(51) Int. Cl.[7] .................................................. E05C 1/12
(52) U.S. Cl. ....................... 292/165; 292/163; 292/169; 292/173
(58) Field of Search ................................. 292/163, 165, 292/170, 169, 175, 173

(56) References Cited

U.S. PATENT DOCUMENTS

| | | | | |
|---|---|---|---|---|
| 2,608,085 A | * | 8/1952 | Castle | 70/169 |
| 2,922,297 A | * | 1/1960 | Hitzelberger | 70/144 |
| 3,201,161 A | * | 8/1965 | Castle | 292/173 |
| 3,850,464 A | * | 11/1974 | Bisbing et al. | 292/175 |
| 4,790,479 A | * | 12/1988 | Matsumoto et al. | 239/102.2 |
| 5,056,846 A | * | 10/1991 | Tanaka | 296/37.1 |
| 5,193,707 A | * | 3/1993 | Mizumura | 220/326 |
| 5,482,333 A | * | 1/1996 | Gehrs et al. | 292/163 |
| 5,897,147 A | * | 4/1999 | Alyanakian et al. | 292/175 |
| 6,109,669 A | * | 8/2000 | Pinkow | 292/175 |
| 6,374,460 B1 | * | 4/2002 | Edevold et al. | 16/422 |
| D459,192 S | * | 6/2002 | Weinerman et al. | D8/338 |
| 6,409,234 B1 | * | 6/2002 | Larsen et al. | 292/173 |
| 6,460,902 B1 | * | 10/2002 | Kyle | 292/165 |
| 2002/0070563 A1 | * | 6/2002 | Vitry | 292/175 |

FOREIGN PATENT DOCUMENTS

WO    WO 200048870 A1  *  8/2000  ........... B60R/25/02

* cited by examiner

Primary Examiner—Robert J. Sandy
Assistant Examiner—Thomas Ho
(74) Attorney, Agent, or Firm—Paul & Paul

(57) ABSTRACT

A load floor latch that can be installed in a vehicle floor for storage having a biasing means for actuation but allows slam action closure. The latch comprises an actuation assembly that is attached to a housing or lid and is designed to accommodate a pawl member for engaging and disengaging a frame. The flat lid and out-of-way handle allow extra room within the vehicle and prevent damage or breakage of the latch.

20 Claims, 101 Drawing Sheets

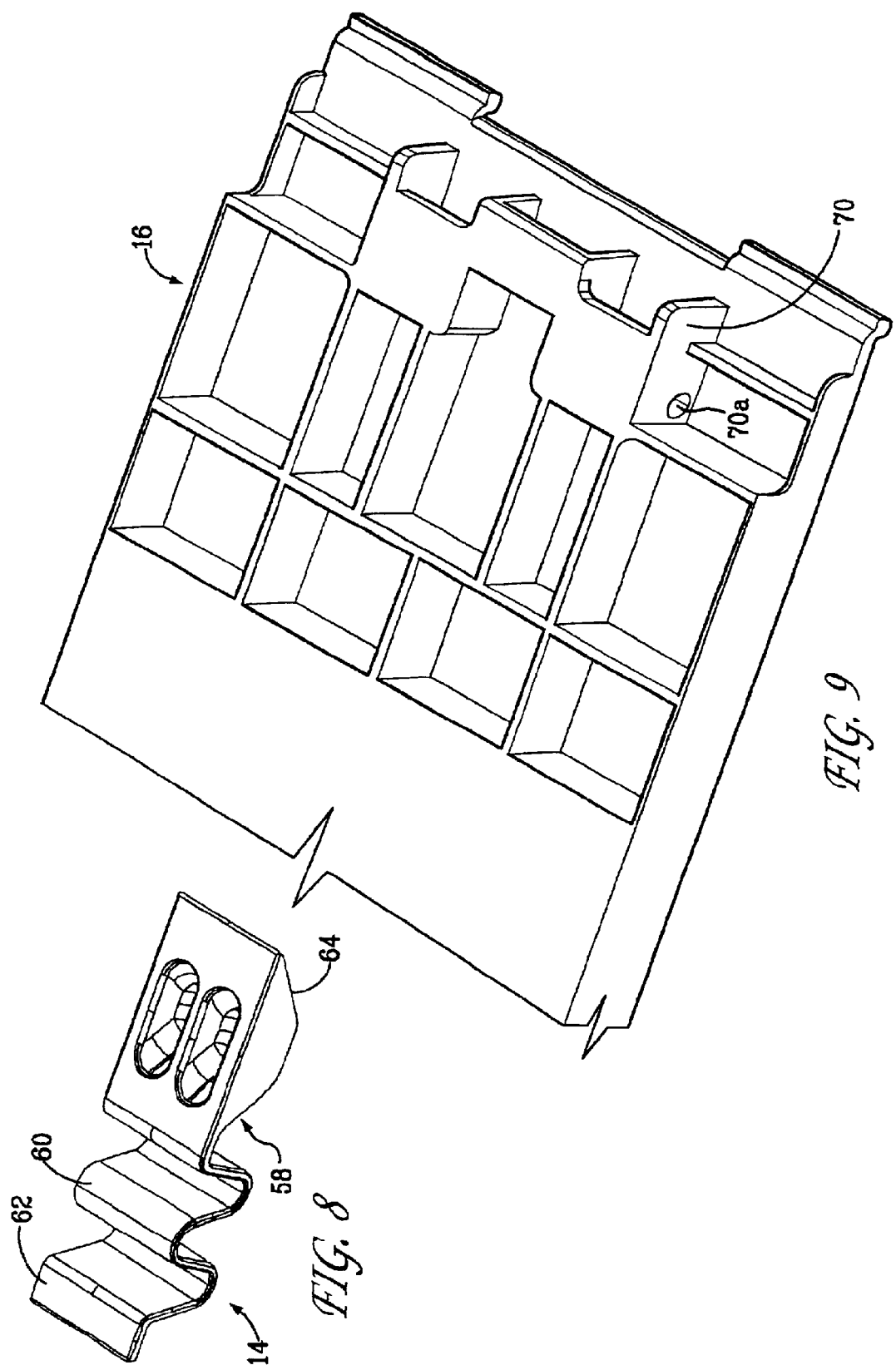

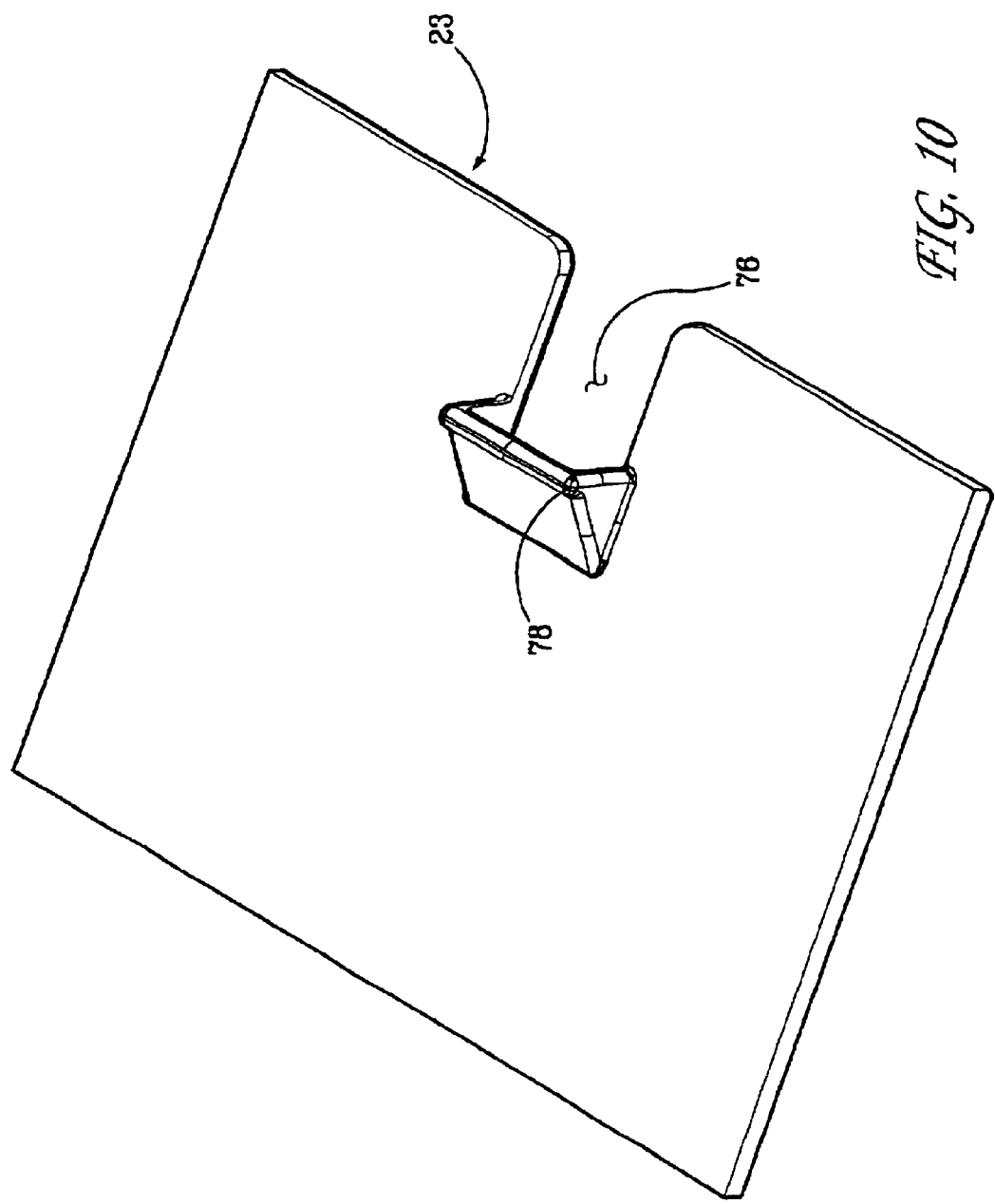

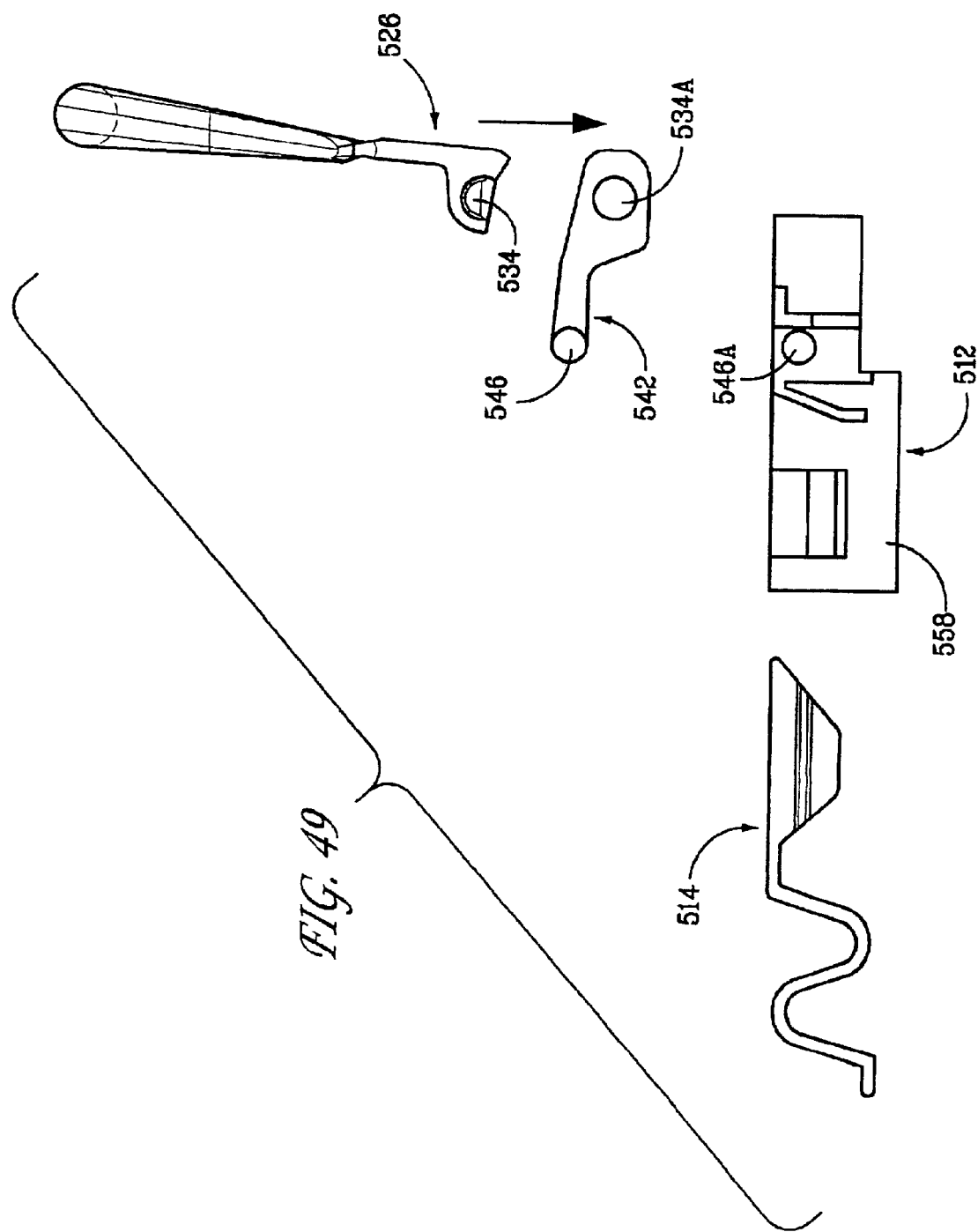

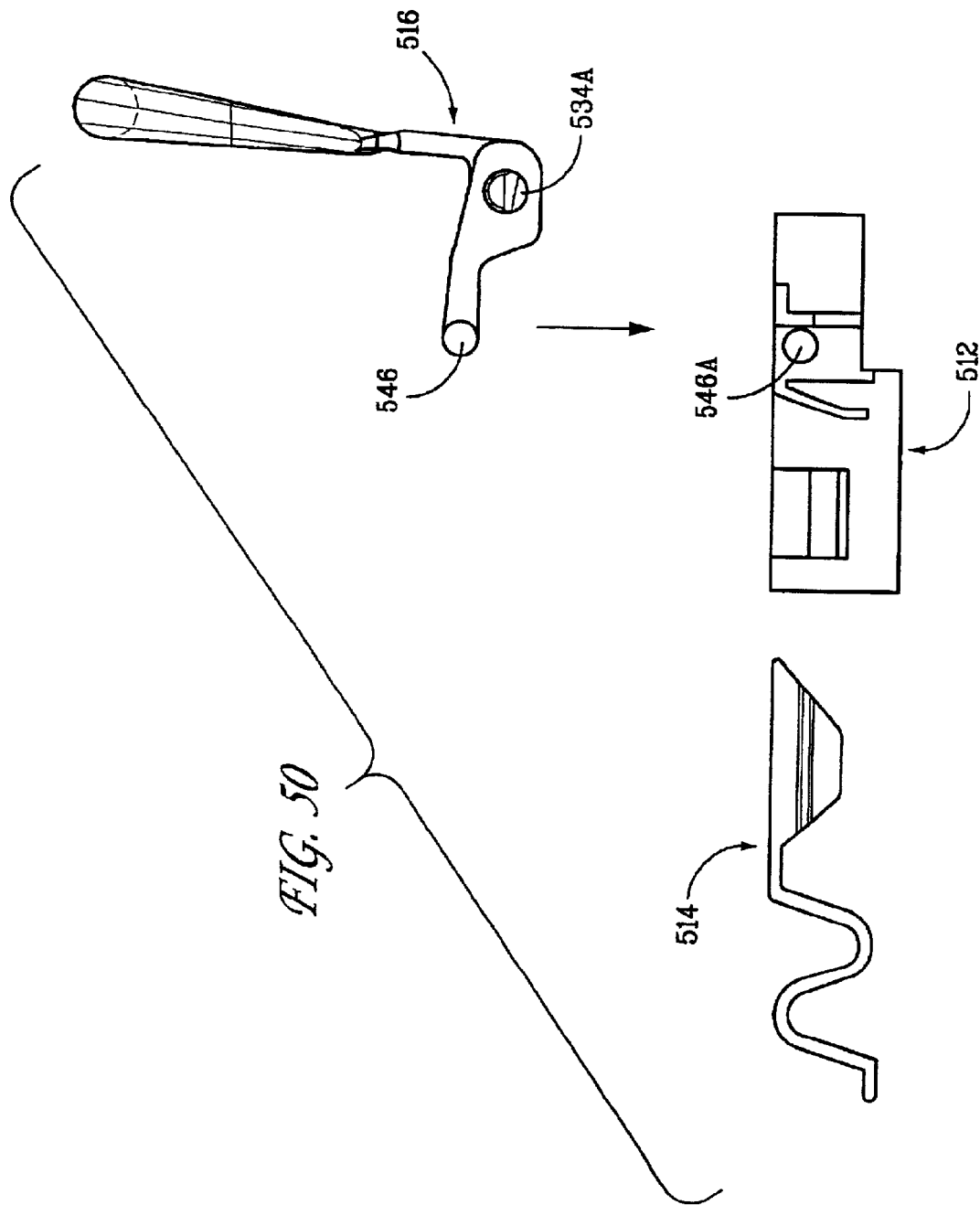

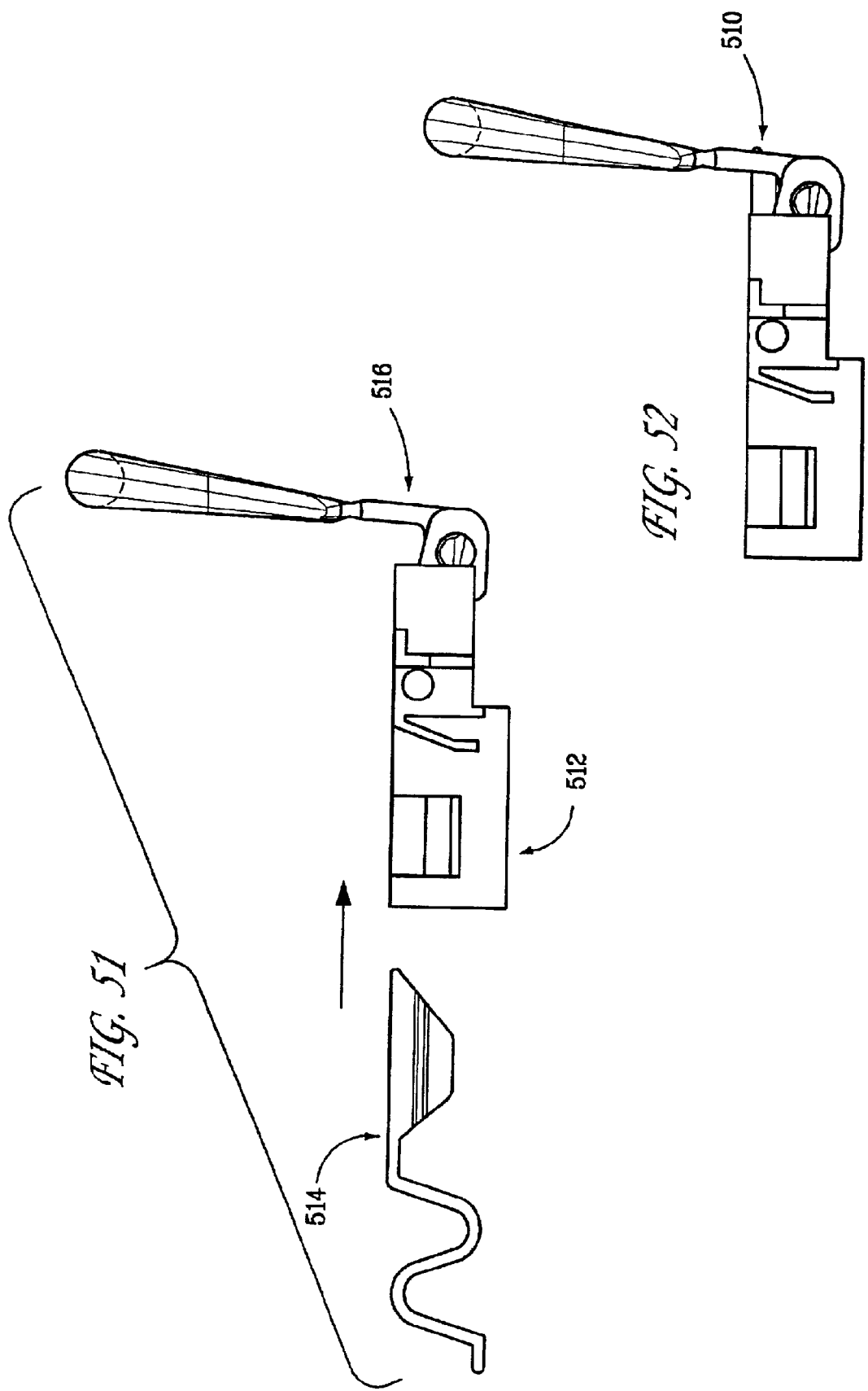

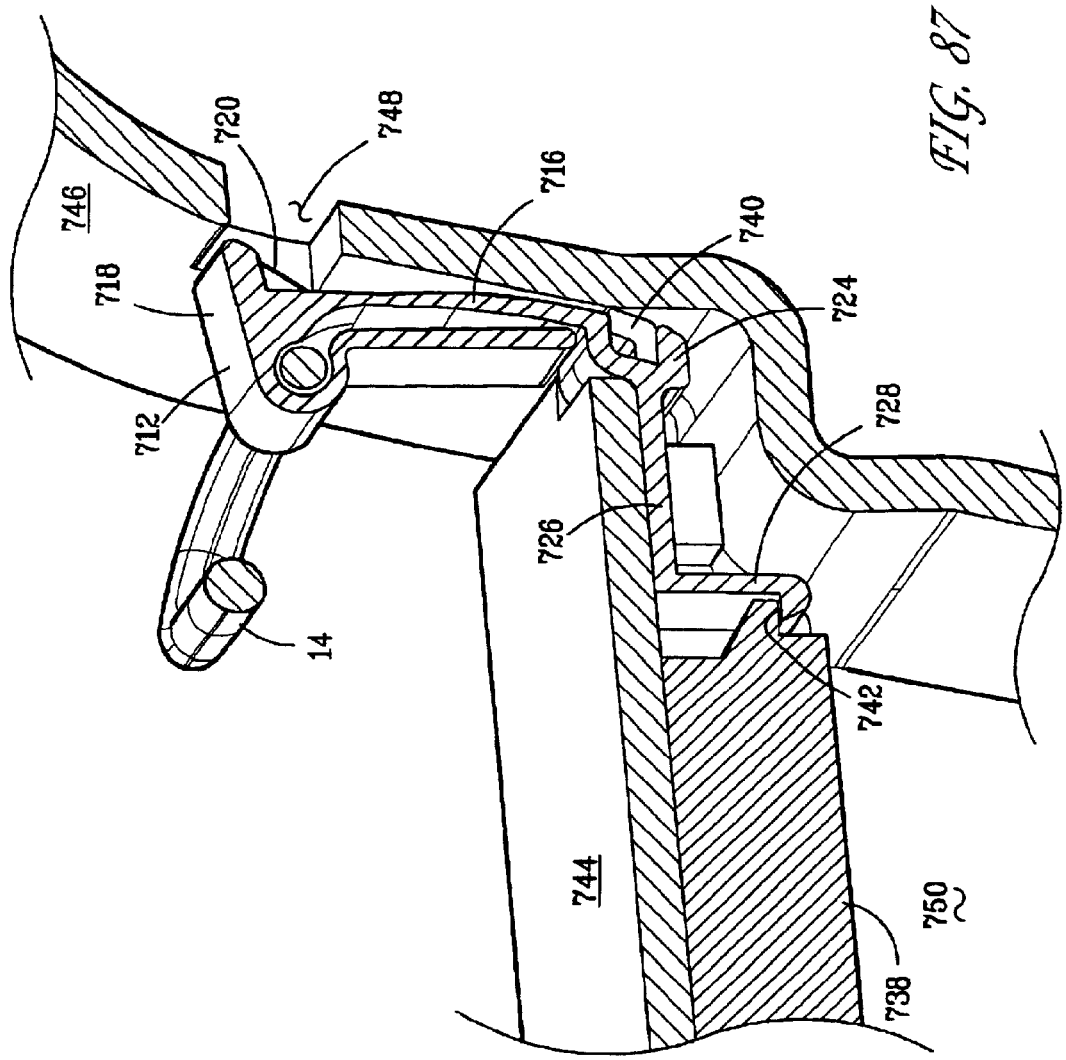

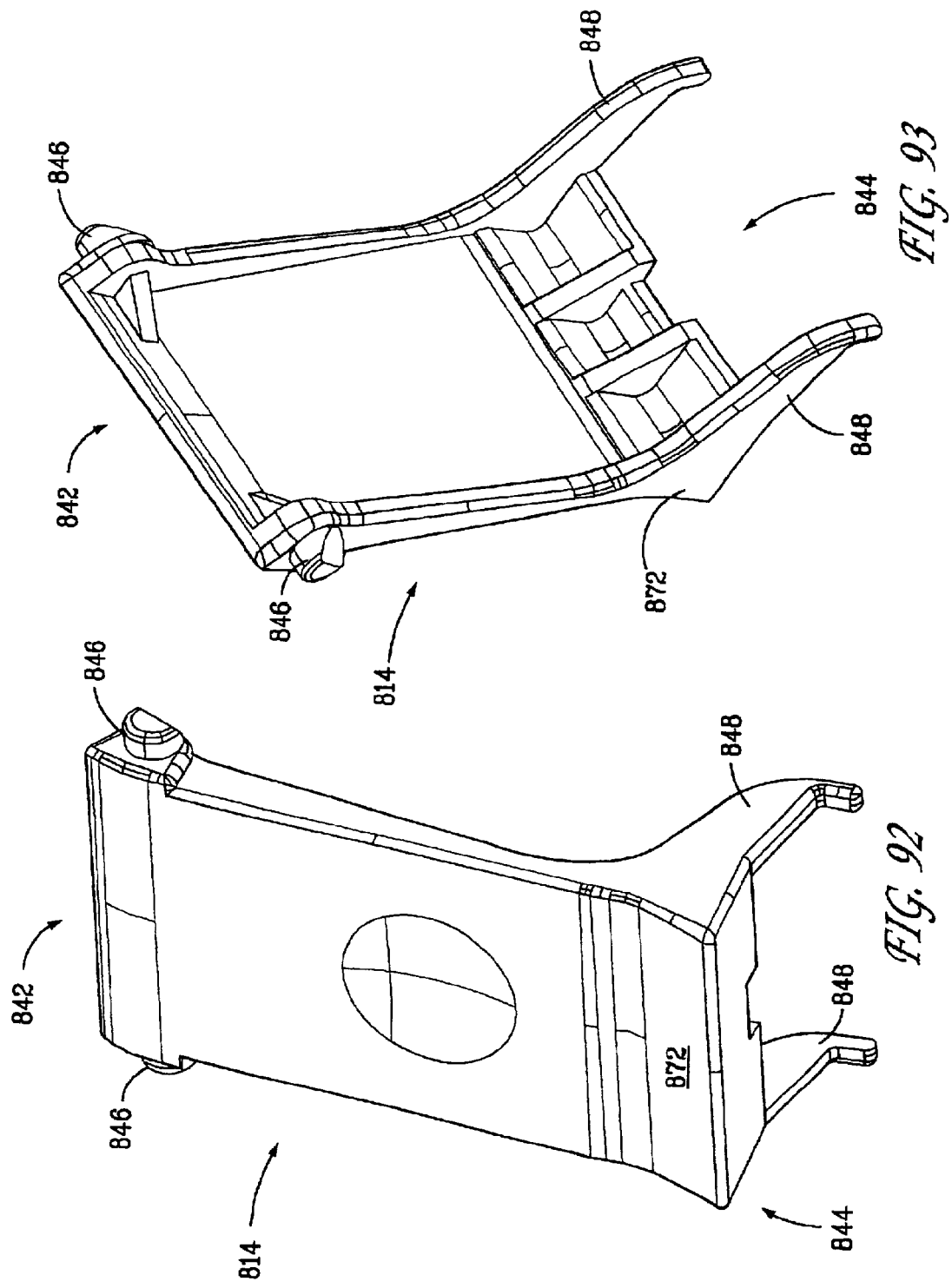

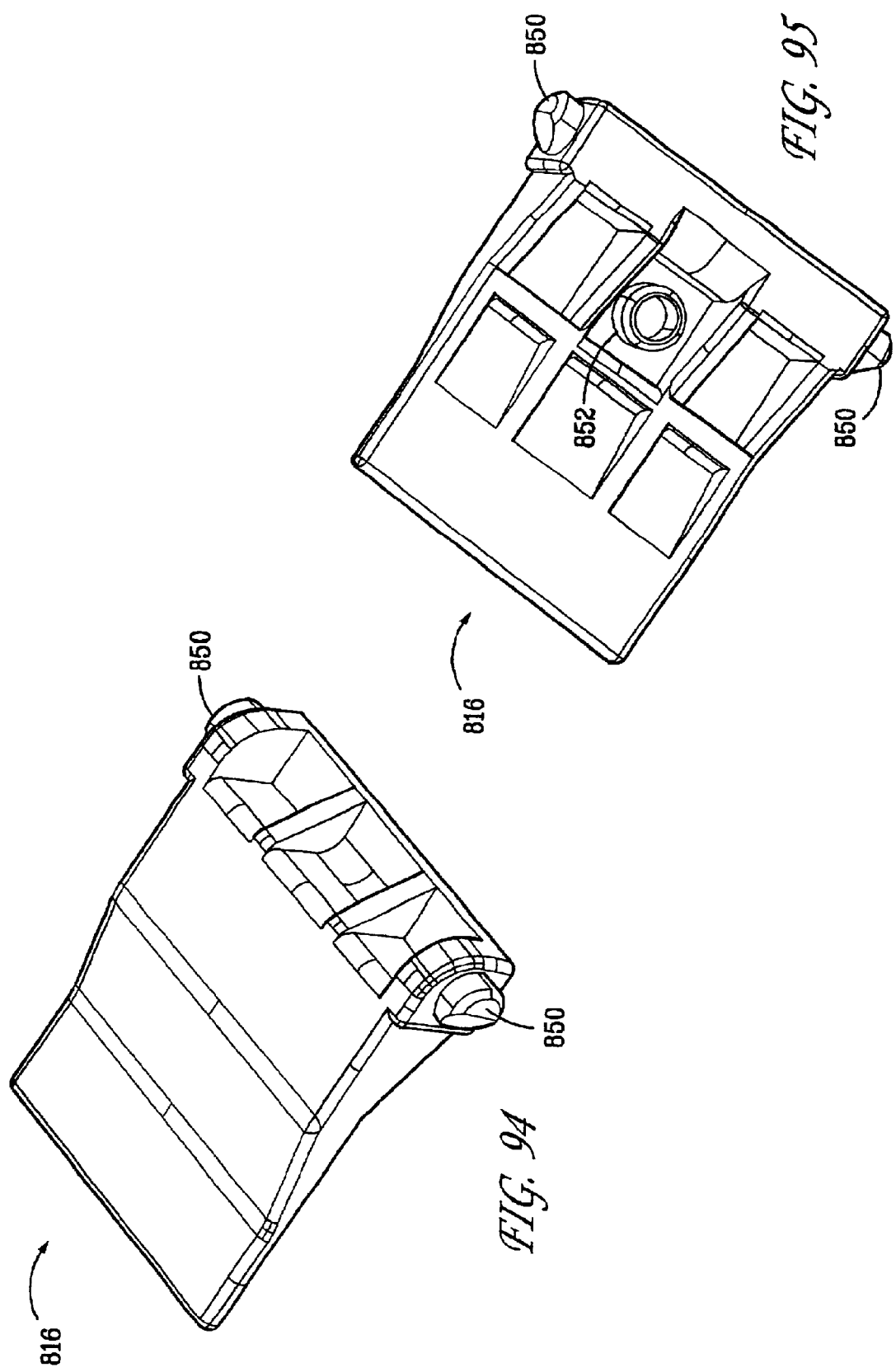

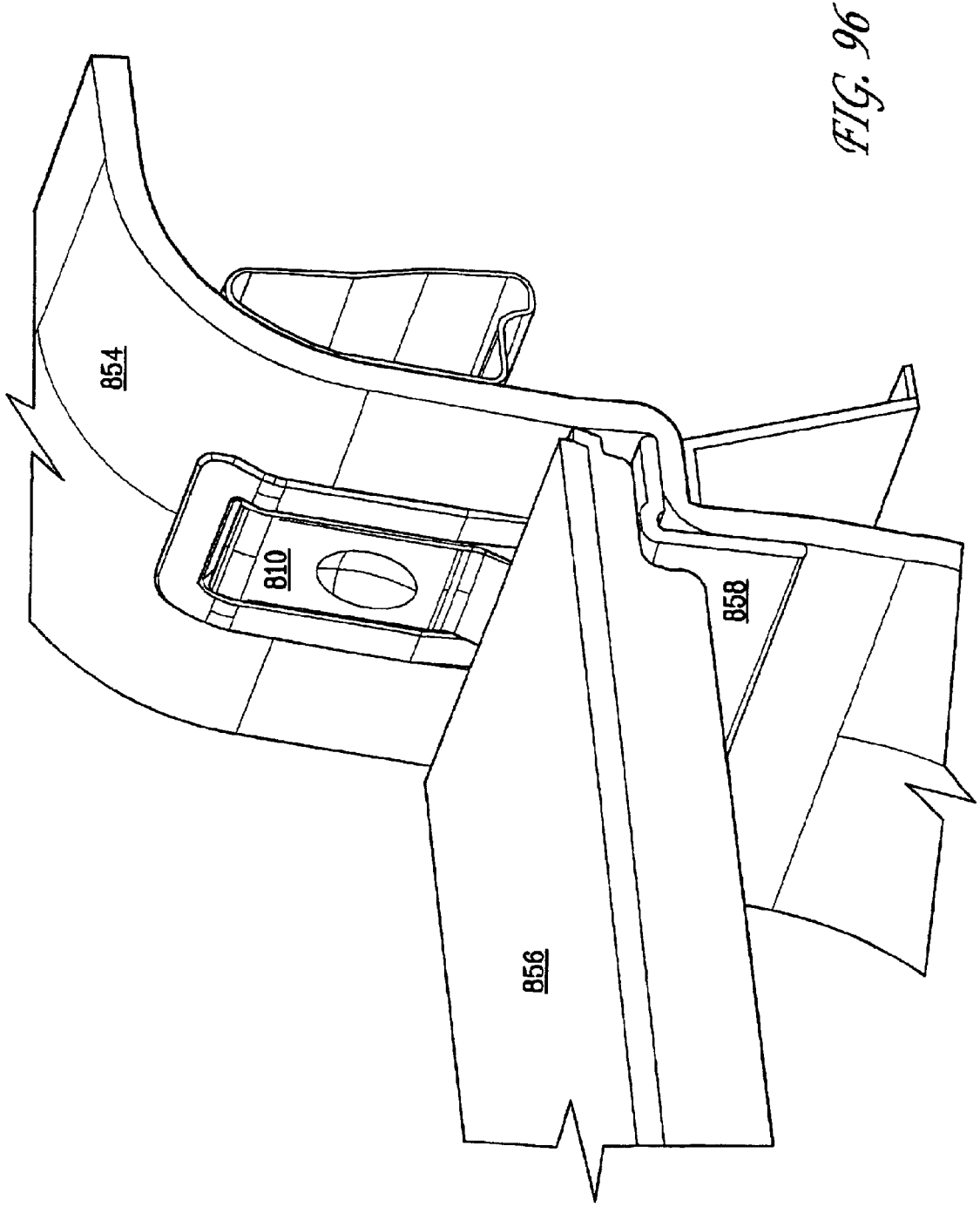

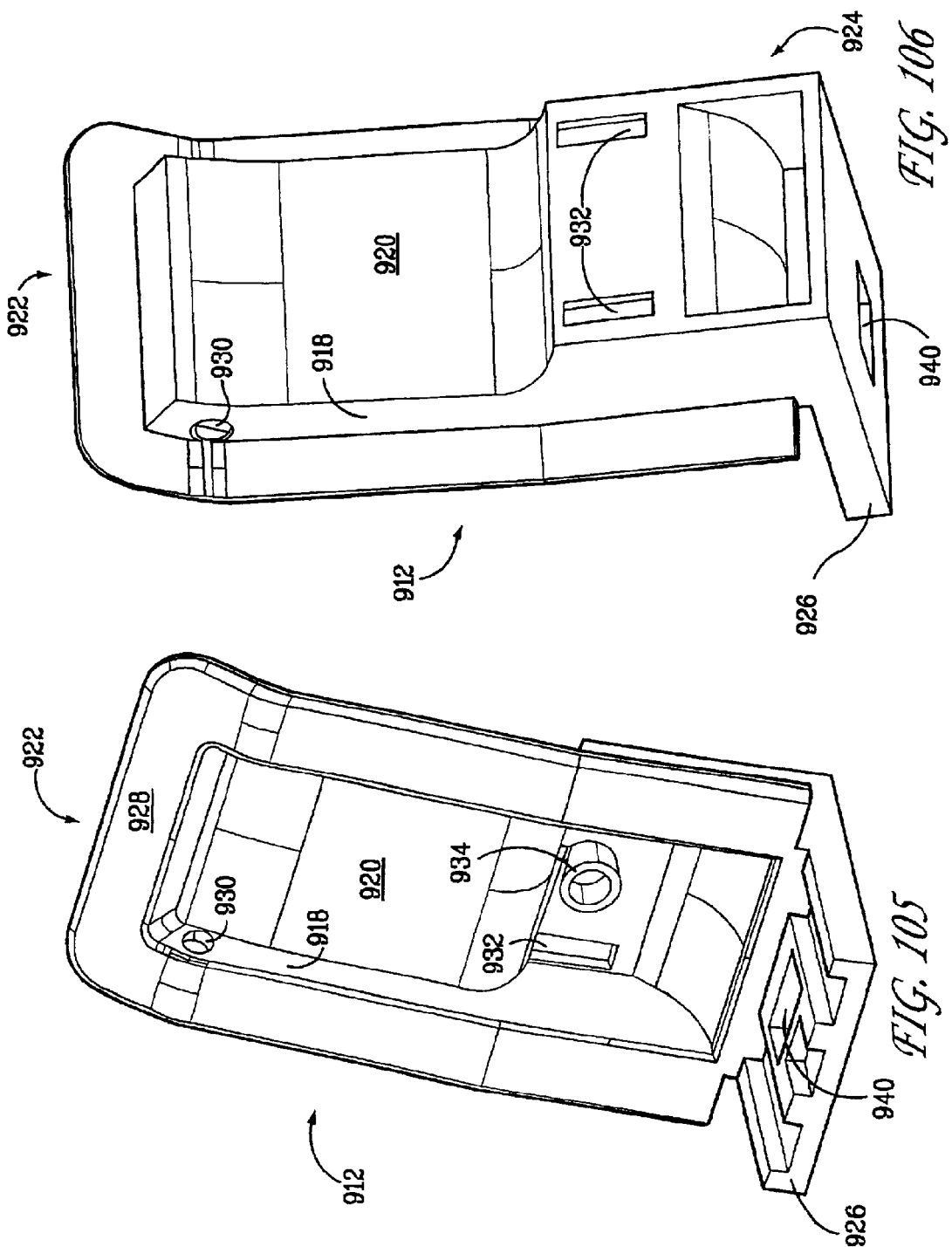

LOAD FLOOR LATCH

CROSS REFERENCE TO RELATED APPLICATIONS

This application claims priority to U.S. Provisional Application No. 60/211,150, filed Jun. 13, 2000 and U.S. Provisional Application No. 60/214,068, filed Jun. 26, 2000 and U.S. Provisional Application No. 60/219,923, filed Jul. 21, 2000 and U.S. Provisional Application No. 60/229,786, filed Sep. 1, 2000 and U.S. Provisional Application No. 60/234,641, filed Sep. 22, 2000.

BACKGROUND OF THE INVENTION

1. Field of the Invention

The present invention is a load floor latch that is particularly useful inside a vehicle.

2. Description of the Related Art

Although many other inventors have proposed various ways of latching a lid to a frame, none is believed to offer the advantages of simplicity, strength, appearance, and keeping the actuating handle out of the way when not in use to the extent that the present invention offers these advantages. An example of a presently available latch is illustrated in Southco Handbook 2000, p. 122.

SUMMARY OF THE INVENTION

The present invention is a load floor latch for use in a vehicle. The present invention provides a load floor latch that is to be installed into a lid and provide for latching against a frame. While not limited to such use, such a latch is particularly useful for a load floor within a vehicle. It is therefore an object of the present invention to provide a load floor latch capable of being closed by slamming the lid closed.

It is a second object of the present invention to provide a load floor latch having snap-in installation.

It is a third object of the present invention to provide a load floor latch that will not interfere with the feet of anyone placing his or her feet on the load floor.

It is a fourth object of the present invention to provide a load floor latch accommodating different heights of carpet covering the load floor.

It is a fifth object of the present invention to provide a load floor latch with a hoop handle that rotates to be at a 180 degree angle with the lid so as to ensure the handle is not damaged when in the open position.

It is the sixth object of the present invention to provide a load floor latch that can eliminate the need for a housing, thereby attaching the combination of the handle and pawl member directly to the lid.

It is the seventh objective of the present invention to provide a load floor latch that can be removed without removing the lid cover.

These and other objects of the invention will become apparent through the following description and claims.

BRIEF DESCRIPTION OF THE DRAWINGS

FIG. 8 is a top perspective view of the pawl member for a load floor latch according to the present invention.

FIG. 9 is a bottom perspective view of the lid for a load floor latch according to the present invention FIG. 10 is a top perspective view of the lid cover for a load floor latch according to the present.

FIG. 49 is an exploded perspective view of a load floor latch according to the fifth embodiment of the present invention.

FIG. 50 is a partially exploded side view of a load floor latch according to the fifth embodiment of the present invention, illustrating the assembled relationship of the actuation assembly.

FIG. 51 is a partially exploded side view of a load floor latch according to the fifth embodiment of the present invention, illustrating the assembled relationship of the actuation assembly and the housing.

FIG. 52 is a side view of the assembled latch according to the fifth embodiment of the present invention.

FIG. 87 is a cutaway environmental, perspective view of a load floor latch according to the seventh embodiment of the present invention, showing the latch in its unlatched position.

FIG. 92 is a front perspective view of a button for a load floor latch according to the eight embodiment of the present invention present invention.

FIG. 93 is a rear perspective view of a button for a load floor latch according to the eight embodiment of the present invention present invention.

FIG. 94 is a top perspective view of an ejector for a load floor latch according to the eight embodiment of the present invention present invention.

FIG. 95 is bottom perspective view of an ejector for a load floor latch according to the eight embodiment of the present invention present invention.

FIG. 96 is a perspective view of a load floor latch according to the eight embodiment of the present invention present invention, showing the latch installed in a frame for securing a lid.

FIG. 105 is a front perspective view of a housing for s ninth embodiment of a load floor latch according to the present invention.

FIG. 106 is a rear perspective view of a housing for s ninth embodiment of a load floor latch according to the present invention.

DETAILED DESCRIPTION OF THE PREFERRED EMBODIMENTS

The preferred embodiments will be described wherein

Figure 1:
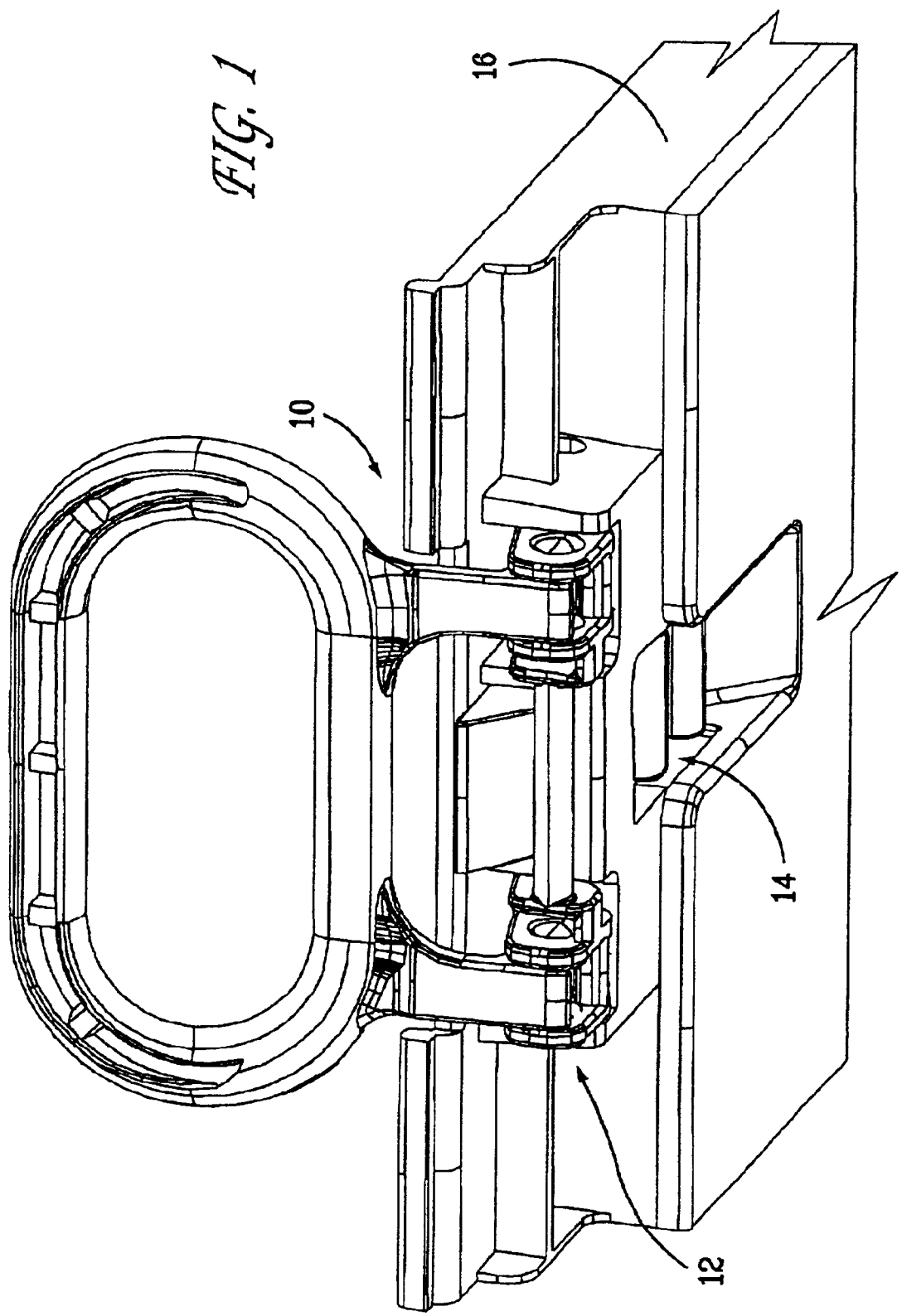
FIG. 1 is a front perspective view of the load floor latch installed in the lid with an attached lid cover according to the present invention.
Figure 2:
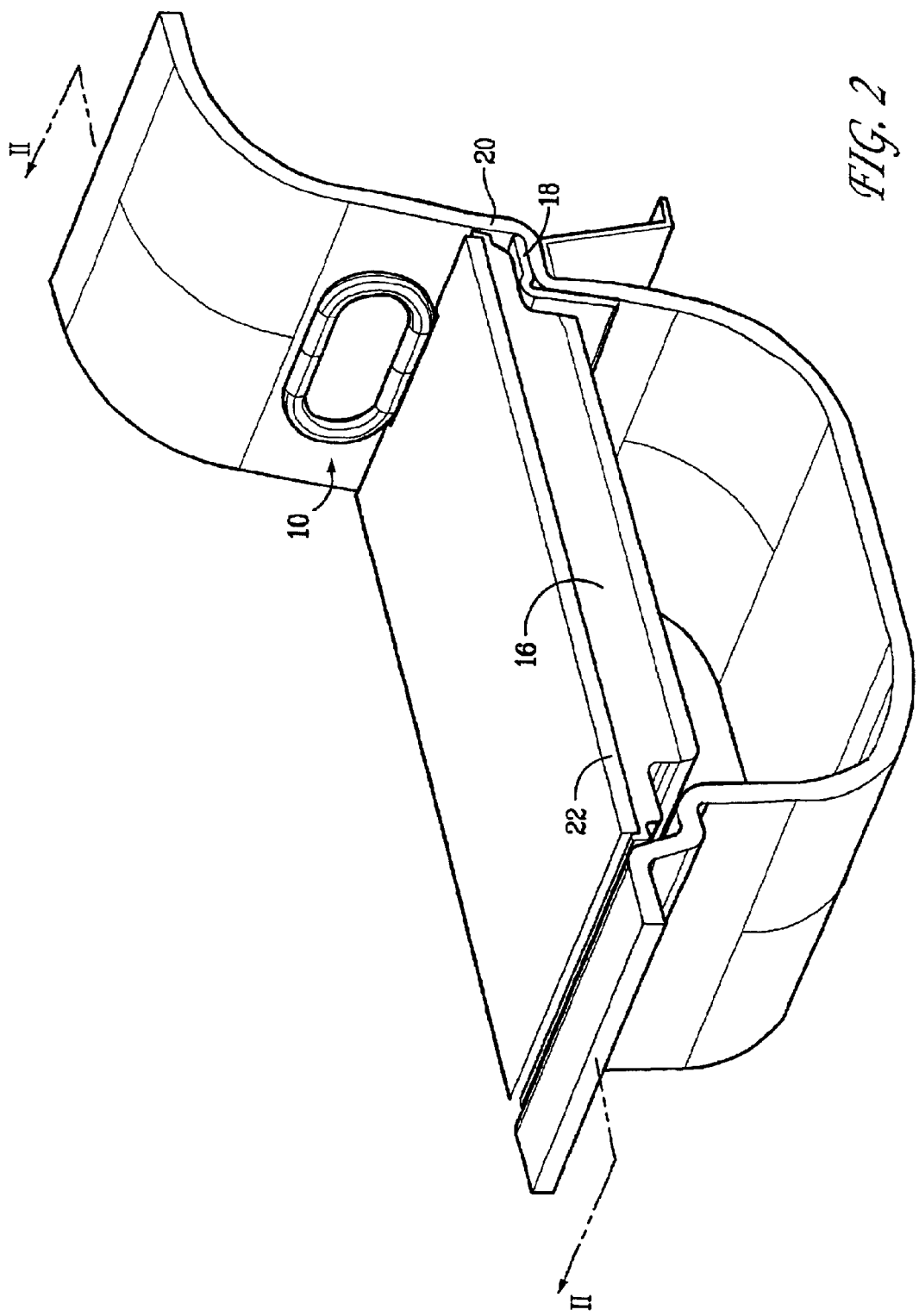
FIG. 2 is a side perspective environmental view of the load floor latch installed in the lid with an attached lid cover engaged with the vehicle frame according to the present invention.
Figure 3:
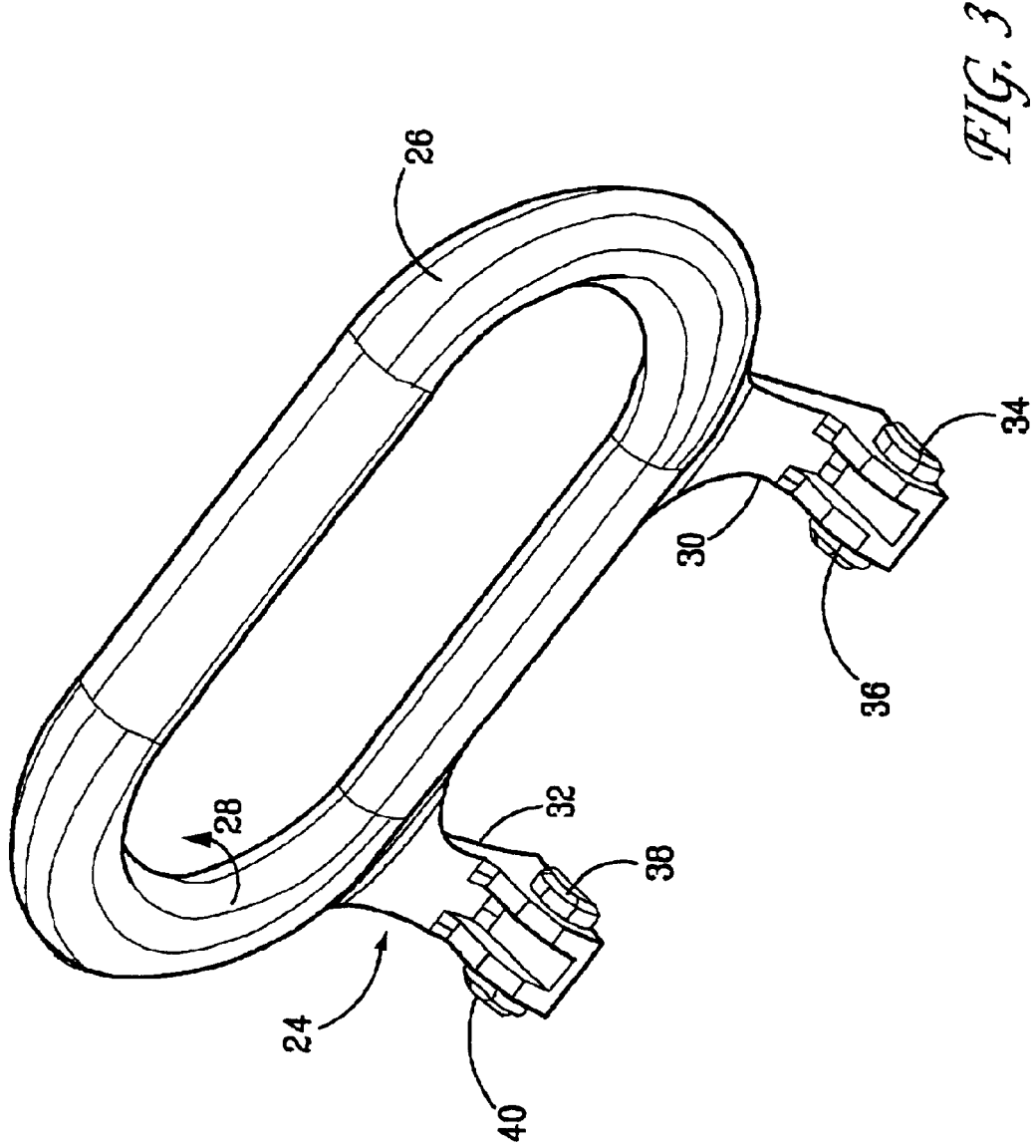
FIG. 3 is a top perspective view of the hoop actuation element of the hoop actuation means of the present invention.
Figure 4:
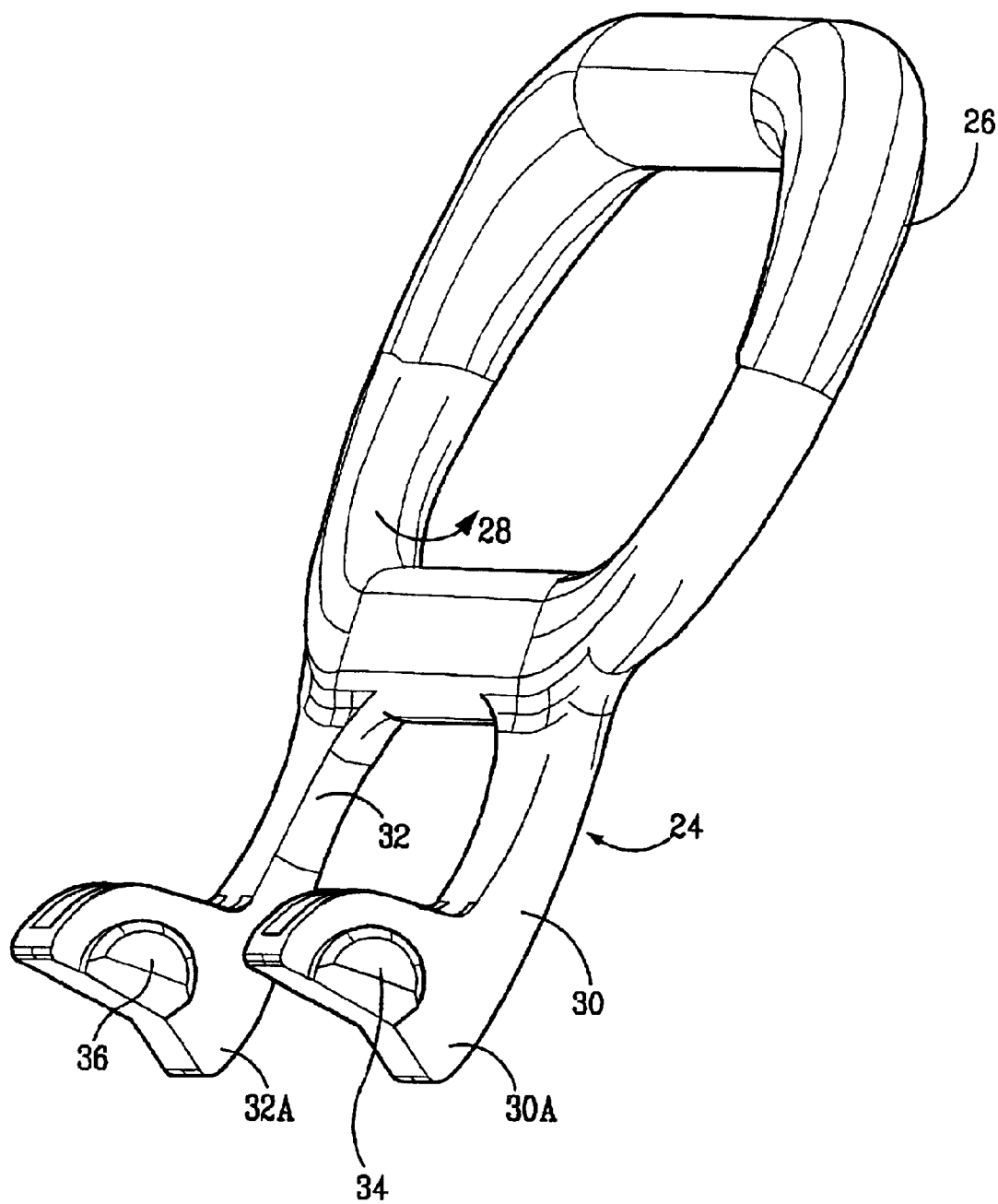
FIG. 4 is a side perspective view of the hoop actuation element of the hoop actuation means of the present invention.
Figure 5:
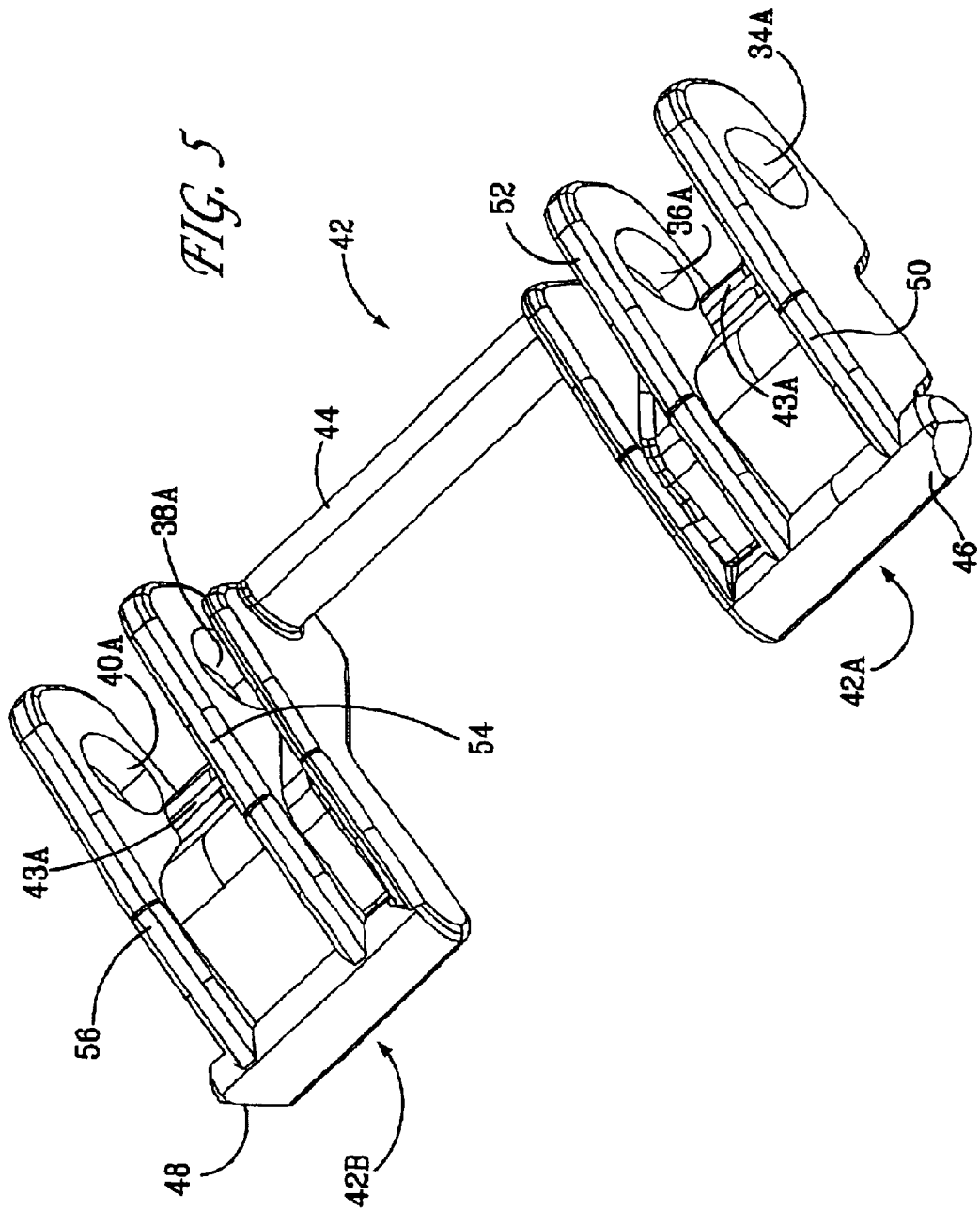
FIG. 5 is a top view of the hoop legs element of the hoop actuation means of the latch of the present invention.
Figure 6:
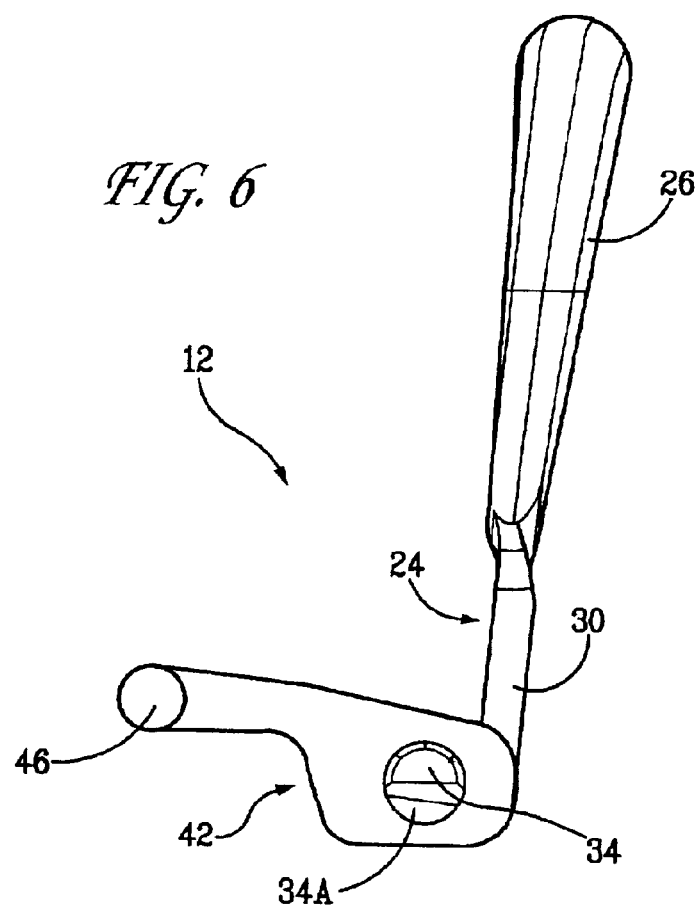
FIG. 6 is a side view of the hoop actuation means of the present invention in the closed position.
Figure 7:
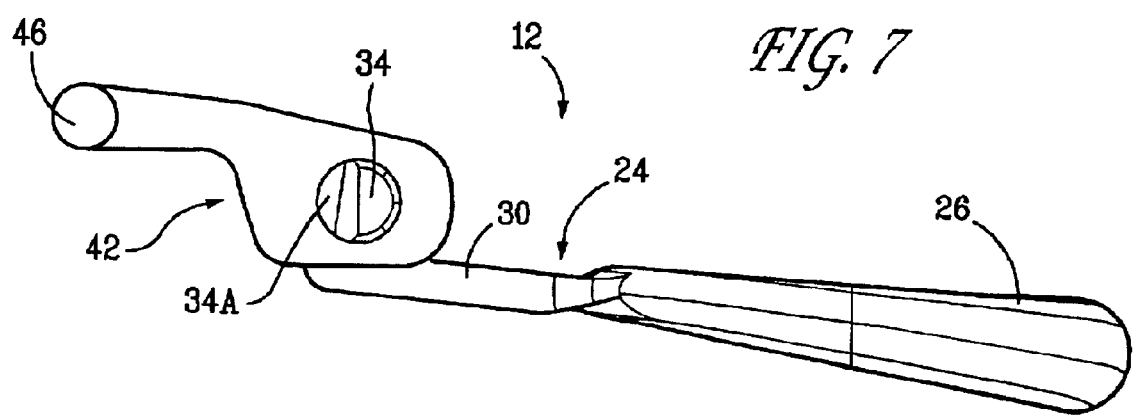
FIG. 7 is a side view of the hoop actuation element of the hoop actuation means of the present invention rotated 90 degrees in the open position.
Figure 11:
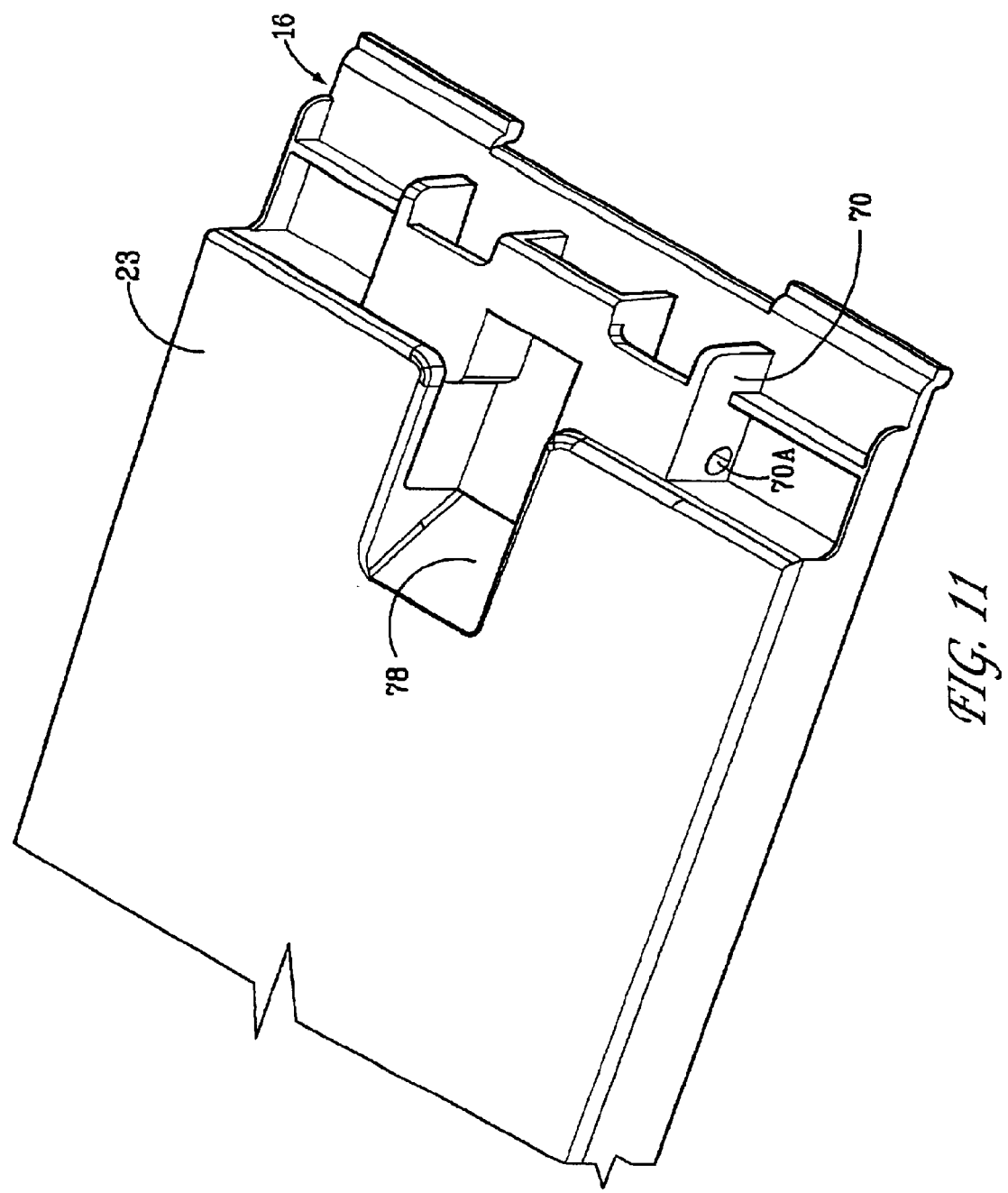
FIG. 11 is a bottom perspective view of the lid for a load floor latch, according to the present invention with lid cover attached.
Figure 12:
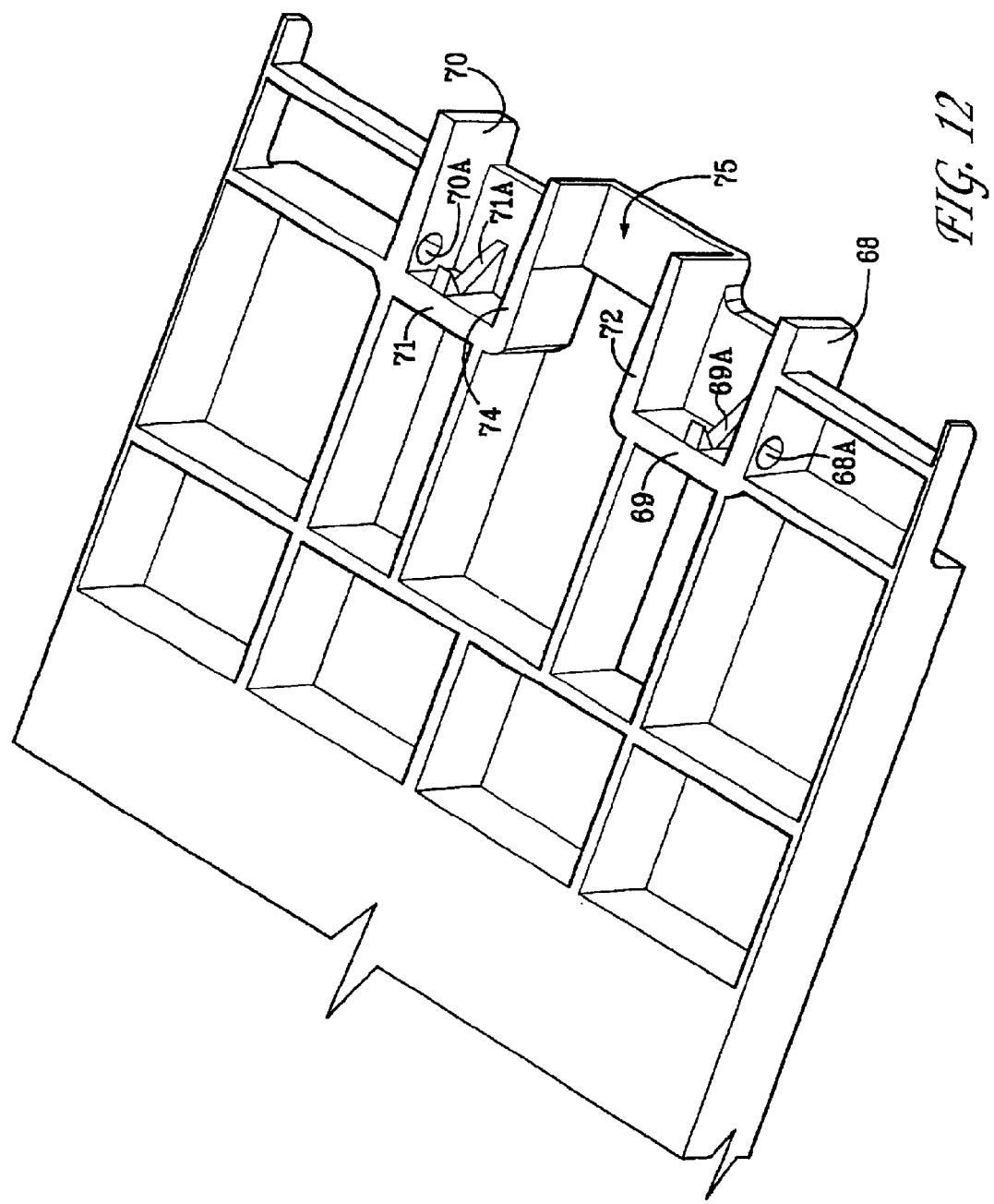
FIG. 12 is a top perspective view of the lid for a load floor latch with the top skin removed according to the present invention.
Figure 13:
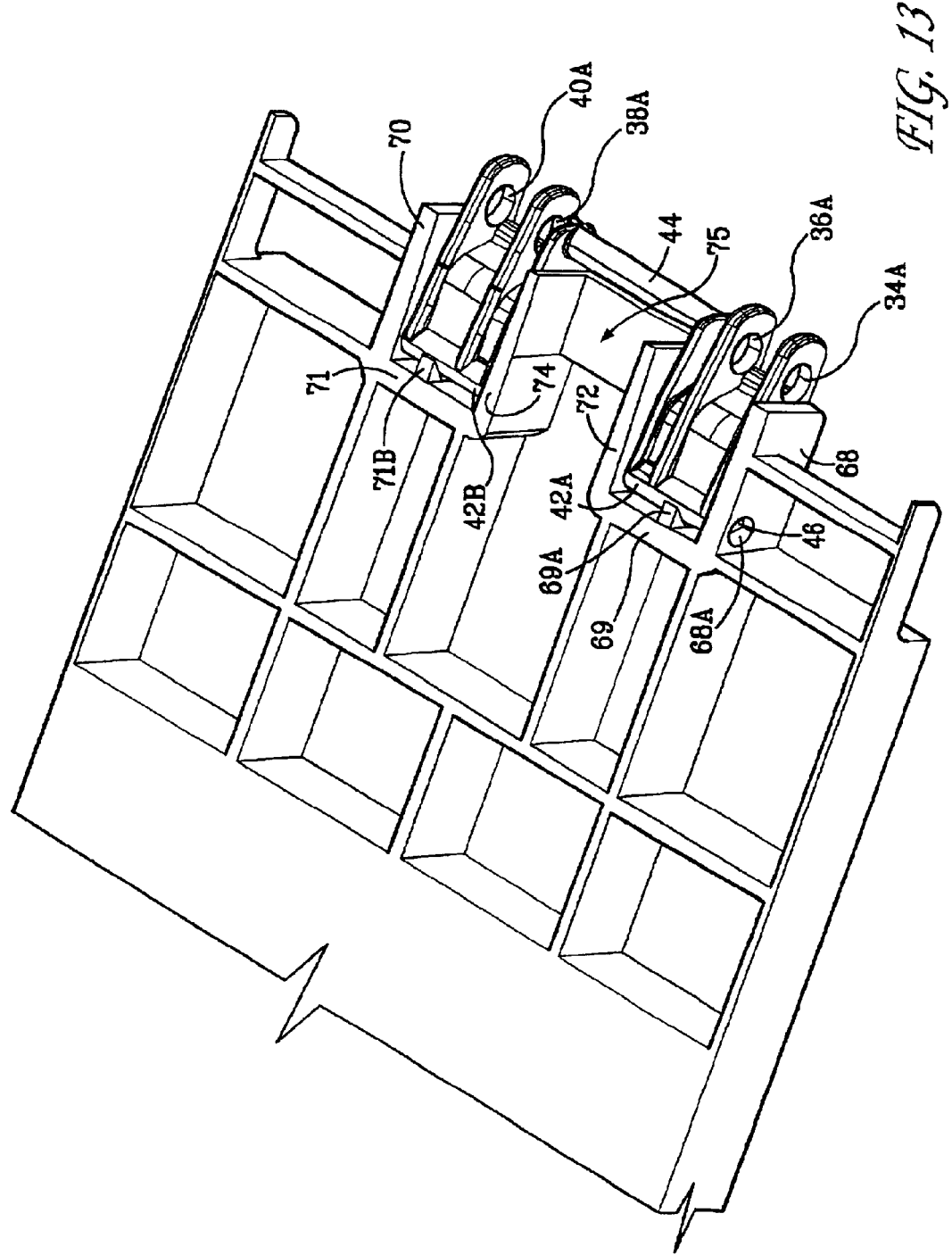
FIG. 13 is a top perspective view of the lid for a load floor latch with the top skin removed according to the present invention illustrating the attached hoop legs element of the hoop actuation means.
Figure 14:
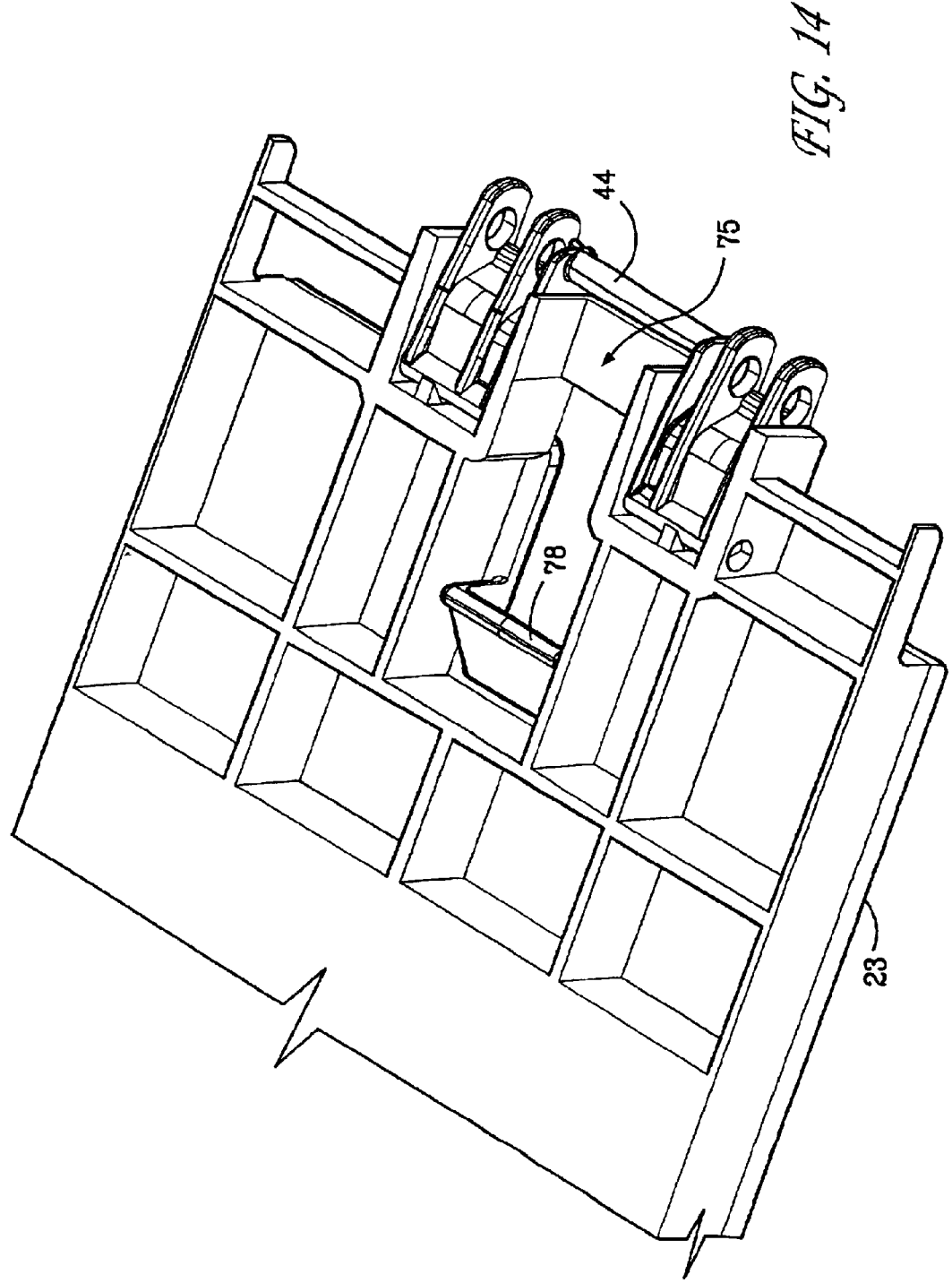
FIG. 14 is a top perspective view of the lid for a load floor latch with the top skin removed according to the present invention illustrating the attached lid cover and hoop legs element of the hoop actuation means.
Figure 15:
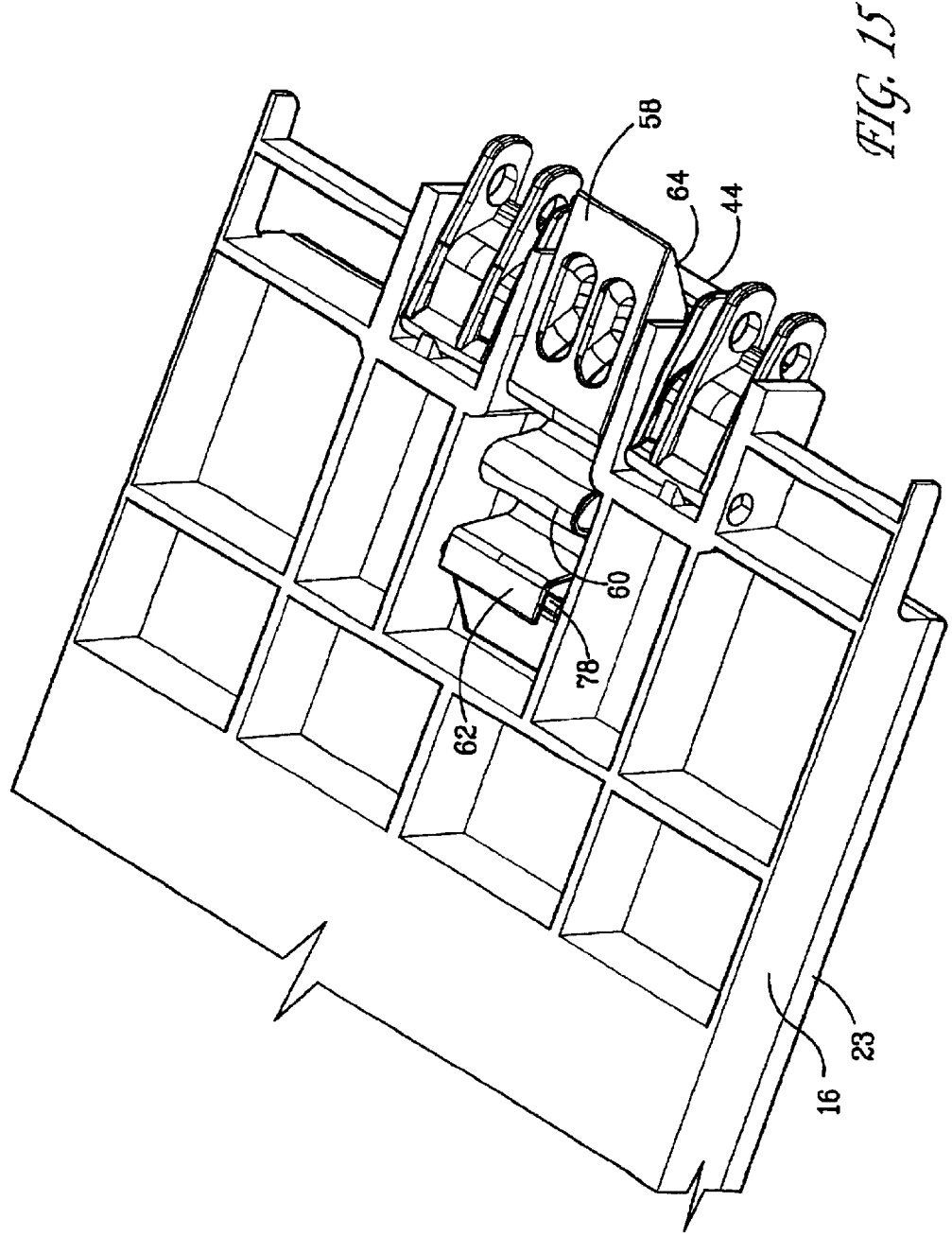
FIG. 15 is a top perspective view of the lid for a load floor latch with the top skin removed according to the present invention illustrating the attached lid cover, pawl member and hoop legs element of the hoop actuation means.
Figure 16:
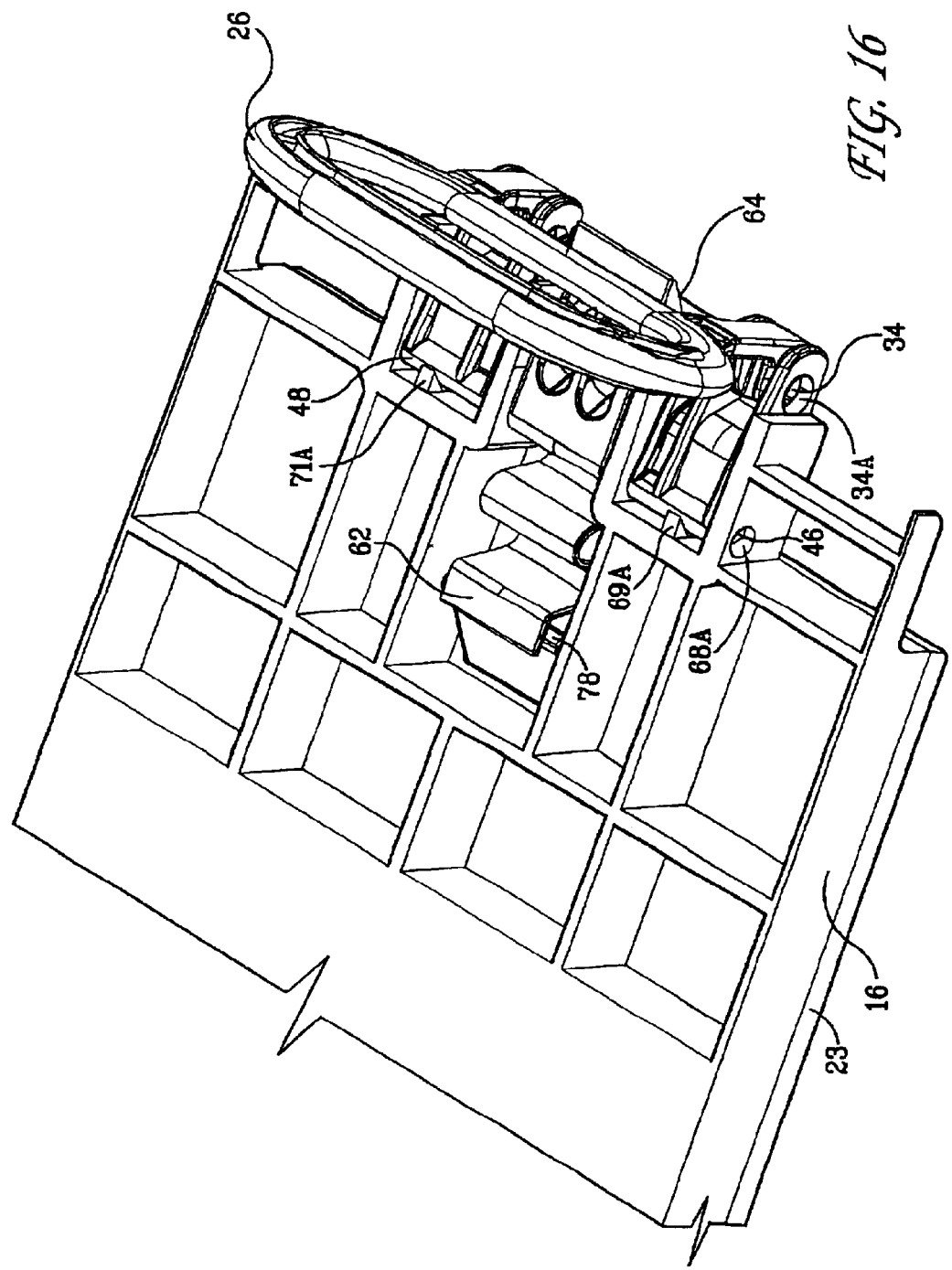
FIG. 16 is a top perspective view of the lid for a load floor latch with the top skin removed according to the present invention illustrating attached lid cover and latch.
Figure 17:
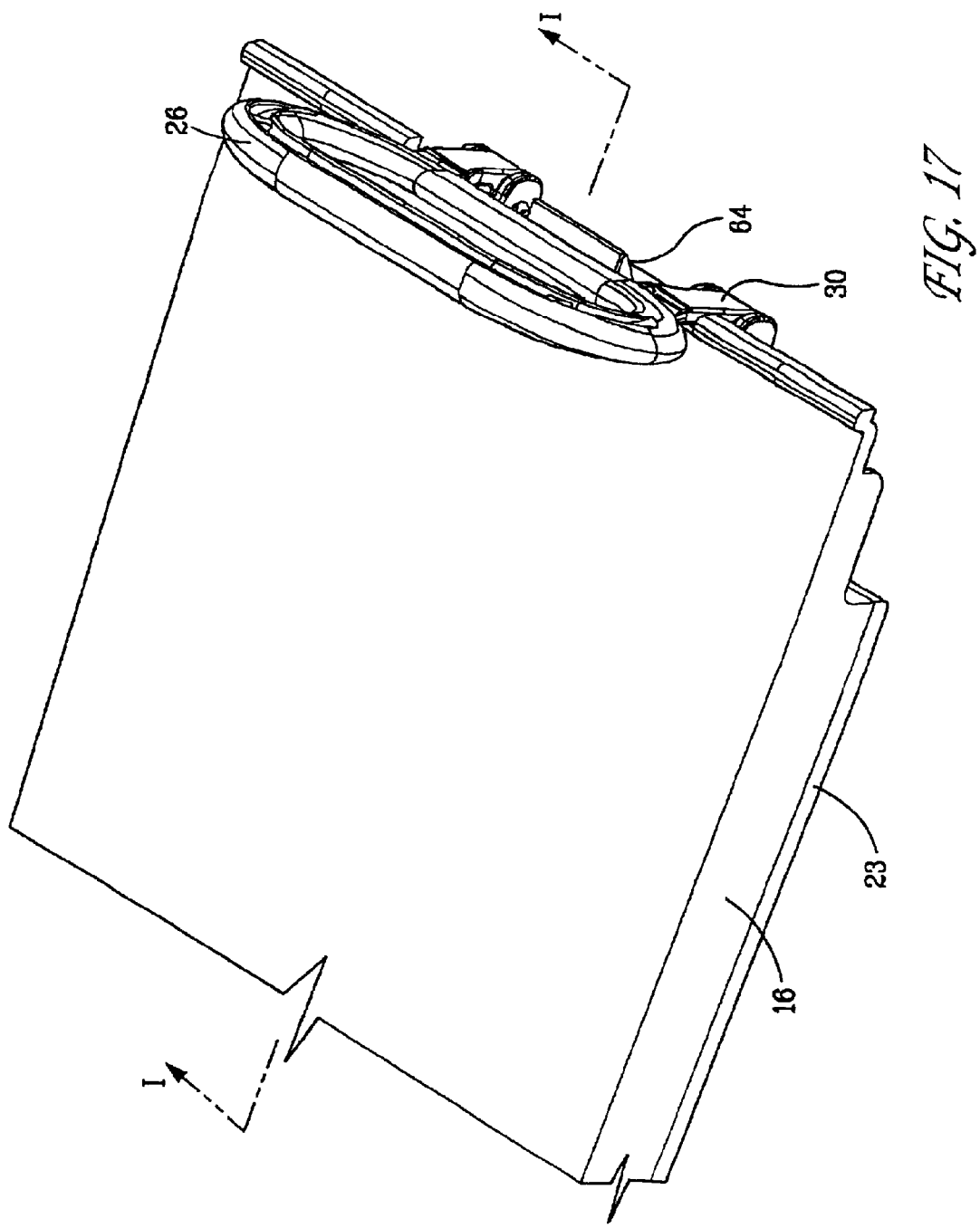
FIG. 17 is a top perspective view of the lid for a load floor latch according to the present invention illustrating the attached lid cover and latch.
Figure 18:
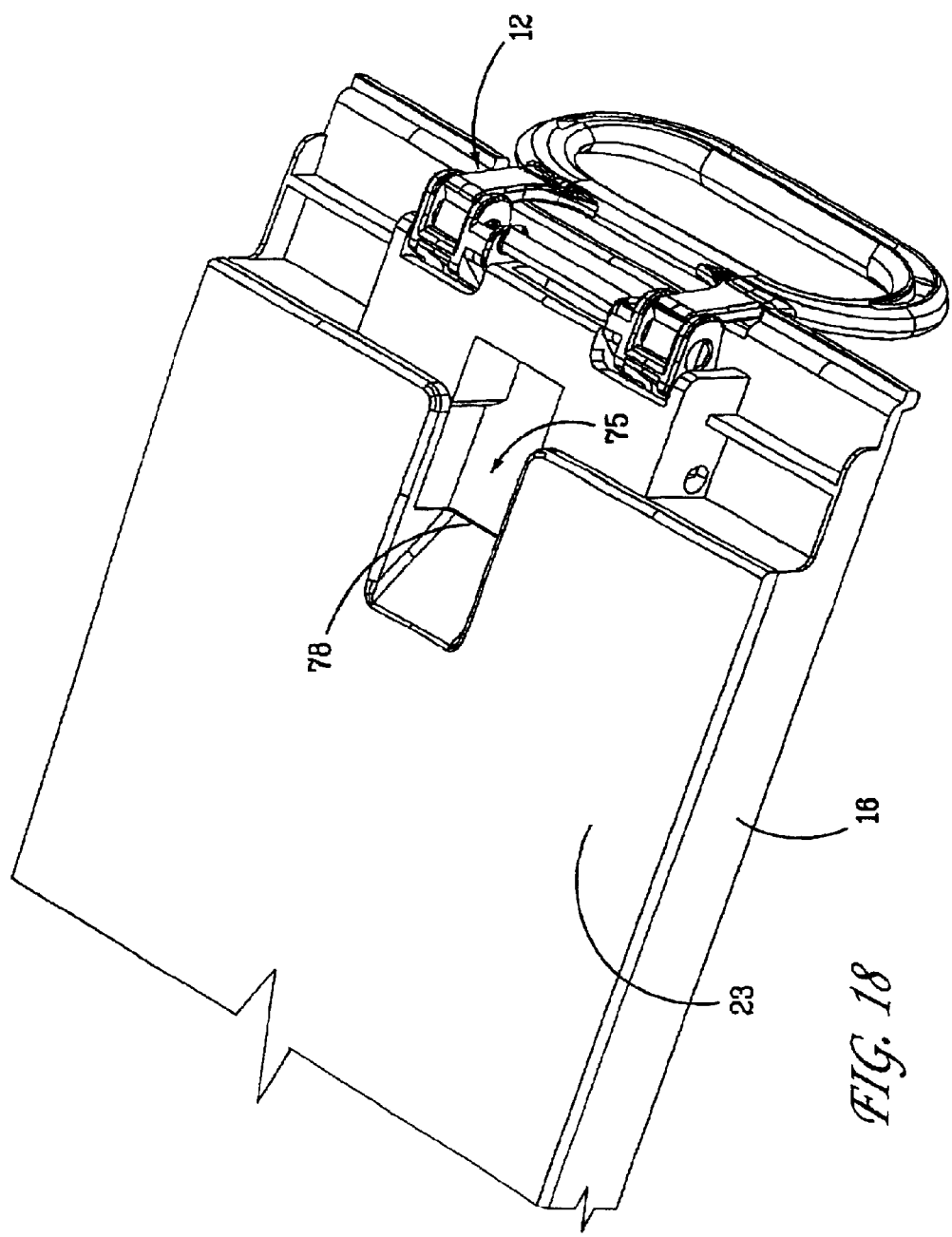
FIG. 18 is a bottom perspective view of the lid for a load floor latch according to the present invention illustrating attached lid cover and hoop actuation means.
Figure 19:
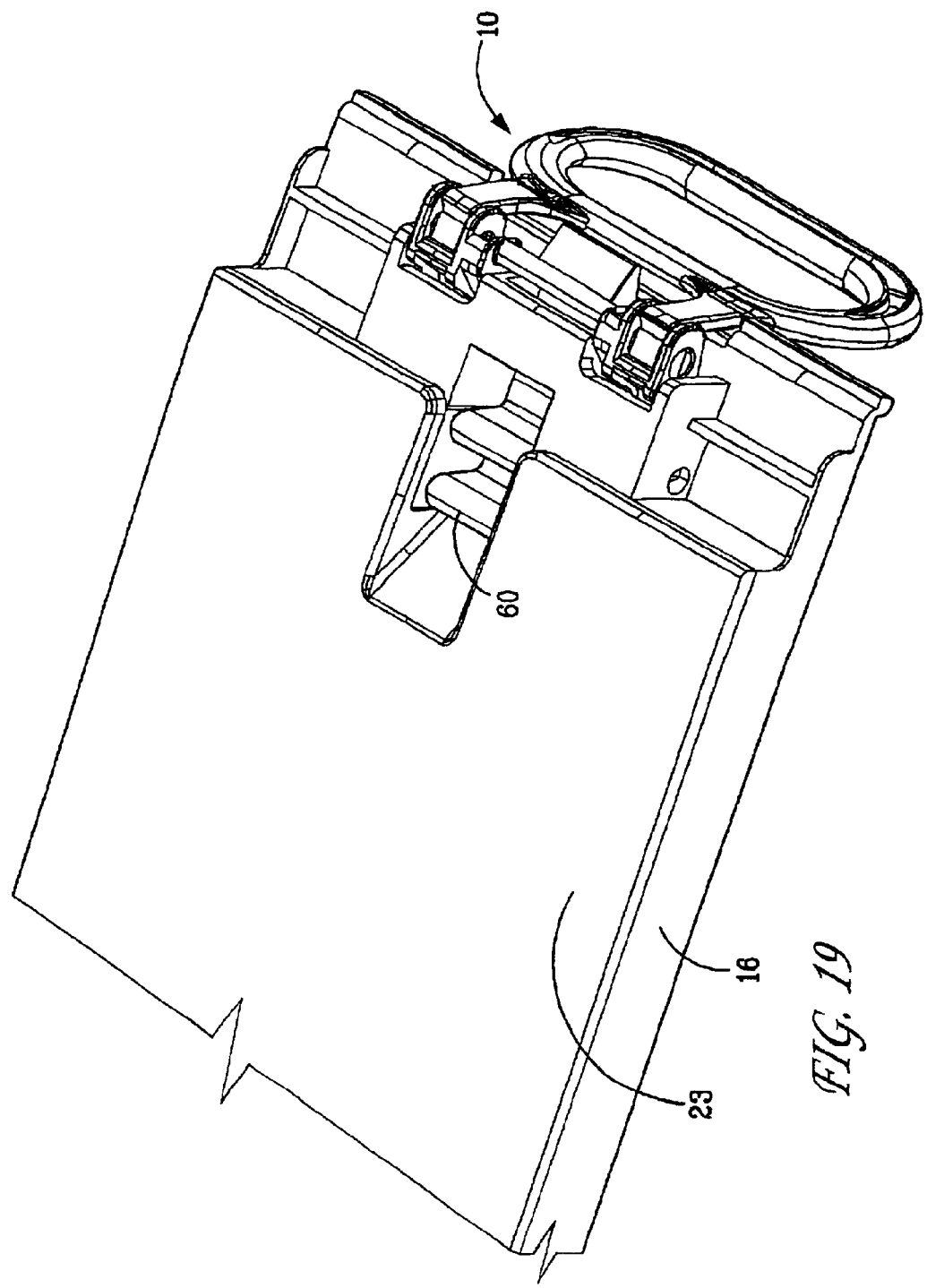
FIG. 19 is a bottom perspective view of the lid for a load floor latch according to the present invention illustrating attached lid cover and latch.
Figure 20:
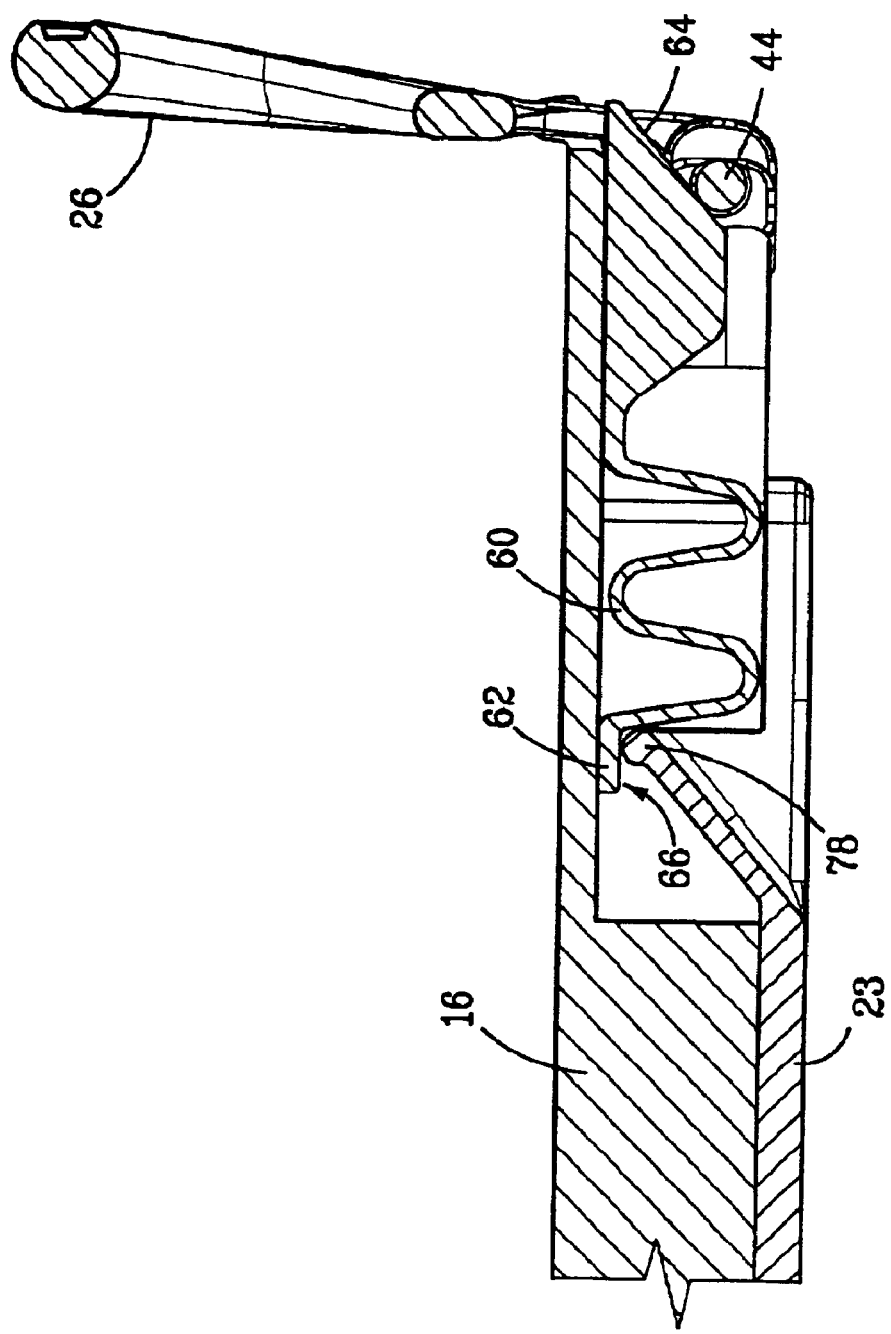
FIG. 20 is a sectional view taken along the line of I—I of FIG. 17 of the load floor latch according to the present invention illustrating the latch attached to the lid and lid cover.
Figure 21:
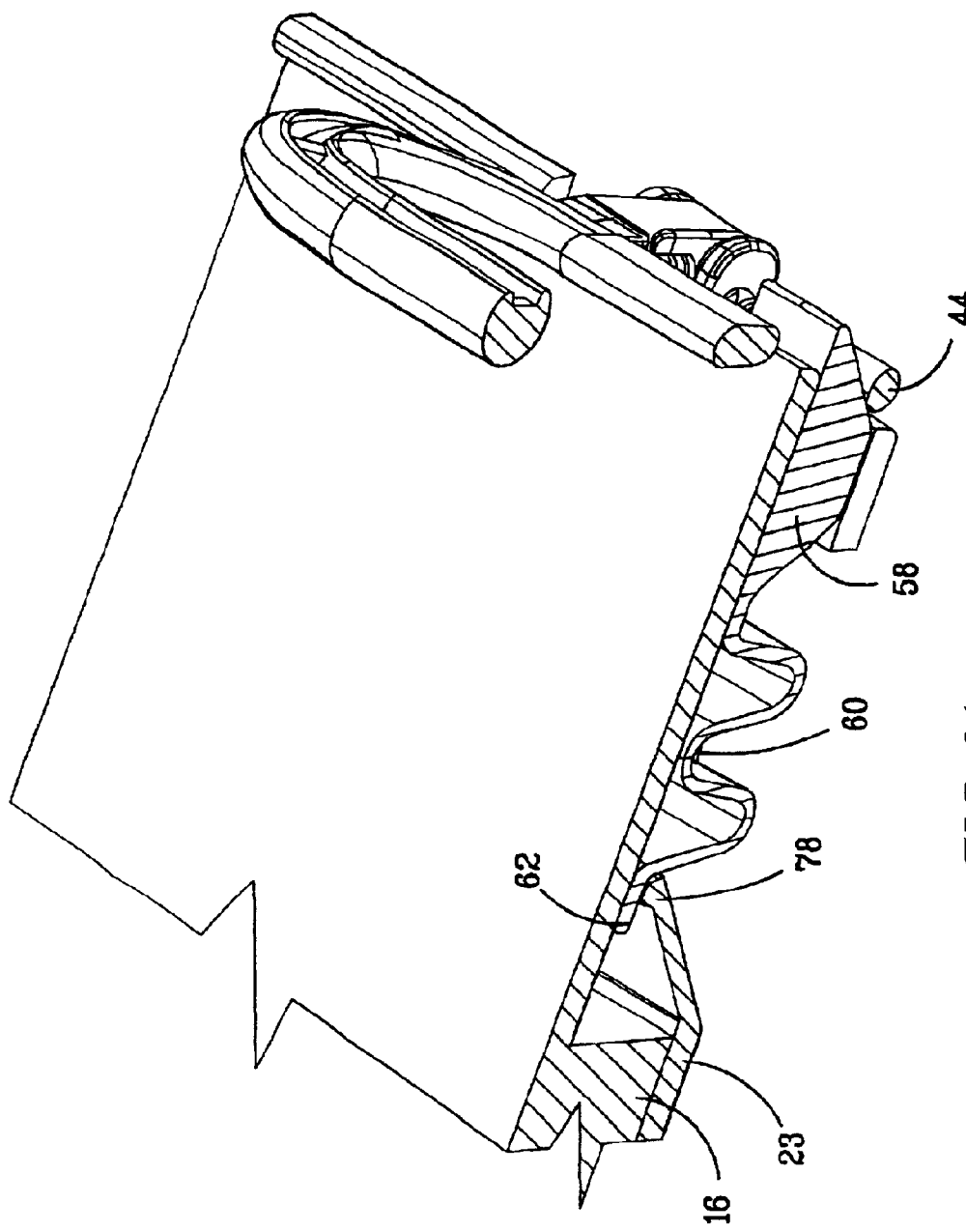
FIG. 21 is a perspective sectional view taken along the line I—I of FIG. 17 of the load floor latch according to the present invention illustrating the latch attached to the lid and lid cover.

The invention is a load floor latch. Referring to FIG. 1 and FIG. 2, the load floor latch 10 comprises a hoop actuation means 12 and a pawl member 14. The latch 10 is attached to the lid 16 and is engaged with the lid support 18. The lid 16 is supported by a frame 20 and is shown with an attached lid carpet 22.

The hoop actuation means 12 is best illustrated in FIGS. 3 through 7. The hoop actuation means 12 is comprised of a hoop actuation element 24, having a hoop handle 26 with an aperture 28 integrally attached to the proximal end of L-shaped arms 30,32. The L-shaped arms 30,32 have detent features 34,36,38,40 on their outer sides that snap into recesses 34A,36A,38A, and 40A on the hoop legs element 42. The hoop legs element 42 comprises two identical sections 42A,42B connected by a center shaft 44. Each section 42A,42B of the hoop legs element 42 terminates into a pair of snap-in shafts 46,48 positioned parallel with shaft 44 which allows for rotational movement of the hoop actuation means 12 when inserted into lid 16 (described below). The central area of the L-shaped arms comprise stops 30A,32A which limit the rotation of the hoop actuator element 12 to 90 degrees when the latch 10 and lid 16 are detached from the frame 20 (not shown) in the open position. The stops 30A,30B abut the camming surfaces 43A, 43B on the hoop legs element 42. Strength ribs 50,52,54,56 located on the topside of each section 42A,42B of the hoop legs element 42 are in contact with the lid 16 during actuation of the latch (described below).

The pawl member 14 is best illustrated in FIG. 8. The pawl member 14 comprises a pawl body portion 58 integral at one end with a living spring 60 terminating with a pawl tail 62, and a slam action ramped element 64 on the opposite end. The living spring 60 flexes during opening and (slam action) closing of the latch 10 based on the displacement of the slam action ramped element 64 (described below). The pawl tail 62 fits into the pawl tail slot 66 (not shown) located between the lid 16 and lid cover 23 to resist movement of the latch 10 when engaged (described below).

The lid 16 and lid cover 23 are best illustrated in FIGS. 9, 10, 11 and 12. The lid 16 is prepared with sidewalls 68,70 having recesses 68A and 70A for insertion of the snap-in shafts 46,48 of the hoop legs element 42. Positioning tab sidewalls 69,71 perpendicular to the recess sidewalls 68,70 have attached v-shaped self positioning tabs 69A 71A to align the snap-in shafts 46,48 for insertion into recesses 68A,70A in the lid 16. The central sidewalls 72,74 are substantially perpendicular to the positioning tab sidewalls 69,71 and form a slot 75 for the pawl member 14.

The lid cover 23 is one piece having a pawl tail aperture 76 and a diagonal camming surface 78 for use as a camming means for the living spring 60 of the pawl member 14 (described below). The diagonal camming surface 78 protrudes upward from the top side 23A of the lid cover 23. The lid cover 23 is attached to the lid 16 by a variety of means such as welding or fixing prior to attachment of the latch 10.

The assembly of the latch and attachment of the latch to the lid is best illustrated in FIGS. 13 through 21. The hoop legs element 42 is attached to the lid 16 by inserting the snap-in shafts 46,48 located on the identical hoop legs element 42A,42B in the recesses 68A,70A on sidewalls 68,70. The snap-in shafts 46,48 flex inward as they slide along sidewalls 68,70 of the lid 16 and are guided into the recesses 68A,70A by the positioning tabs 69A,71A. Once in place, the snap in shafts 46,48 are free to rotate in the recesses 68A,70A.

After the installation of the hoop actuation element, the pawl member 14 is installed by sliding the pawl body 58 along the bottom side 16A of the lid 16 until the slam action ramped element 64 contacts the shaft 44 of the hoop actuator means 12, thereafter inserting the pawl tail 62 into the pawl tail slot 66 formed between the lid 16 and the diagonal camming surface 78. Thus, the pawl member 14 is maintained in place between the shaft 44 and the diagonal camming surface 78 of the lid cover 23. When the latch 10 is installed into the lid 16 and the lid cover 23, the shaft 44 of the actuation assembly 12 is positioned at the base of the slam action ramped element 64 in the closed and engaged position with the lid support 18 (not shown). In the engaged position, the hoop handle 26 is substantially perpendicular to the lid 16. After disengagement, the hoop actuation element 28 can be rotated 90 degrees and become substantially parallel, positioned 180 degrees, to the lid 16. This will ensure that the hoop handle 26 will not be broken or stepped on when in the open position detached from the frame 20 (not shown).

Figure 22:
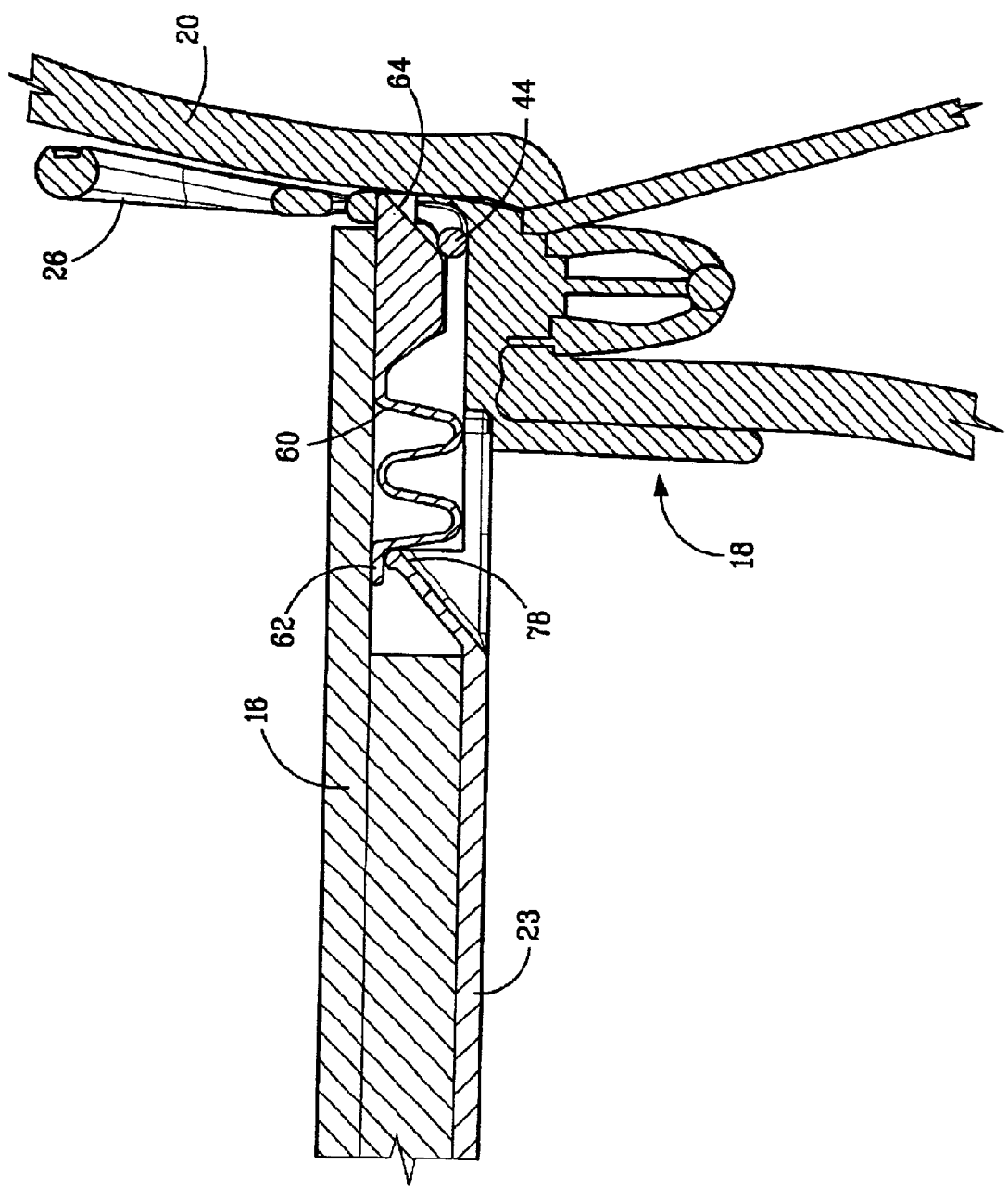
FIG. 22 is a sectional view taken along the line of II—II of FIG. 2 of a load floor latch according to the present invention, showing the pawl member of the latch engaging the lid support, in the closed position.

Referring to FIG. 22, the latch 10 is in the closed position and engaged with the lid support 18 by the slam action ramped element 64. In the closed position, the hoop shaft 44 remains at the bottom of the slam action element 64 of the pawl member 14. The snap in shafts 46,48 remain extended in the lid recesses 68A,70A of the lid 16. The living spring 60 of the pawl member 14 is in the relaxed position.

Figure 23:
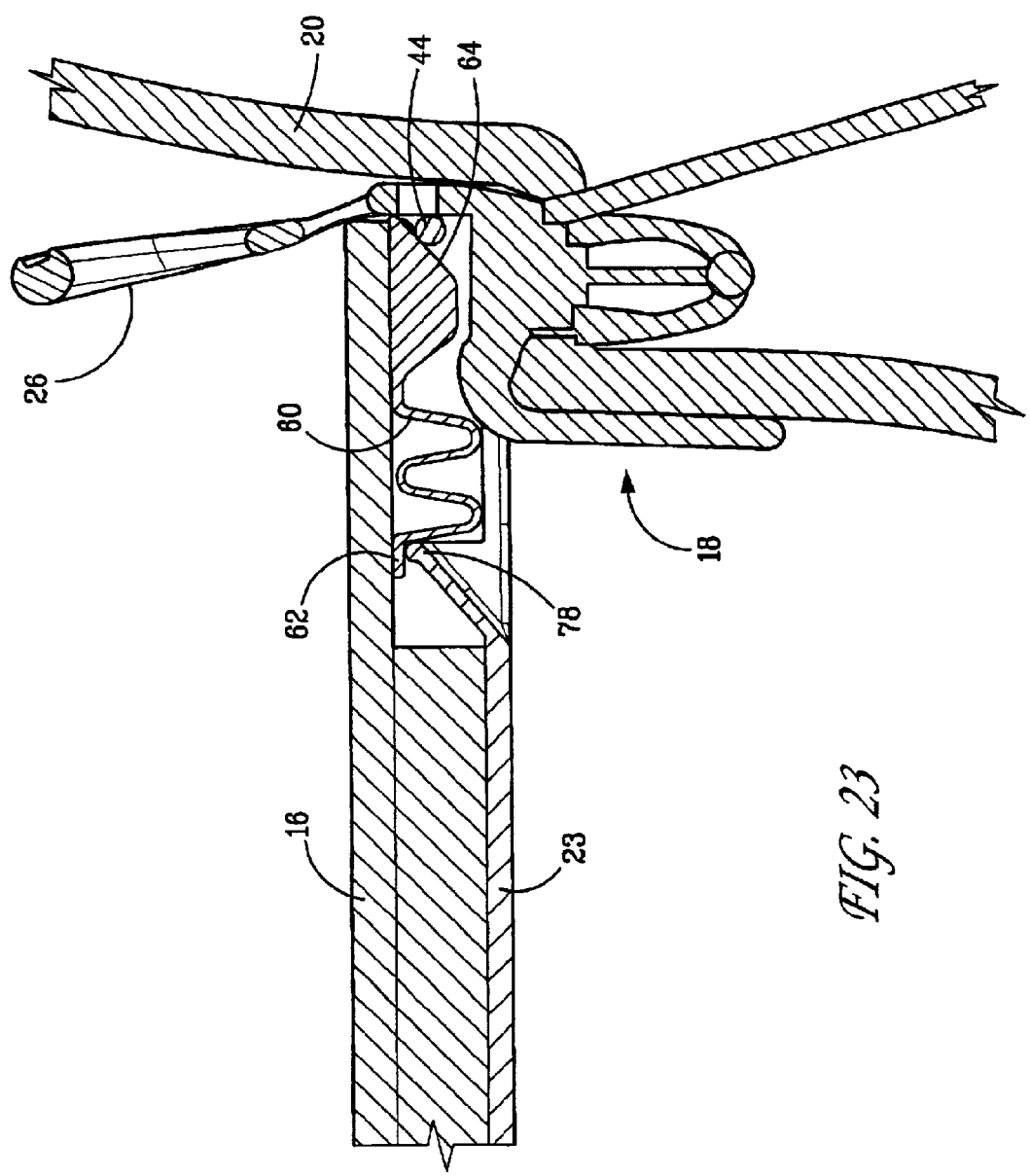
FIG. 23 is a sectional view taken along the line of II—II of FIG. 2 of a load floor latch according to the present invention, showing the pawl member of the latch disengaged from the lid support and the hoop actuator means of the latch slightly rotated.

The latch 10 in the activated position is best illustrated in FIG. 23. Activation of the latch 10 is accomplished by pulling the hoop handle 26 upward which forces the hoop shaft 44 to slide upward along the slam action ramped element 64 thereby forcing the pawl member 14 backward, thus forcing the living spring 60 to flex, allowing the slam action ramped element 64 of pawl member 14 to disengage from the lid support 18. As the hoop handle 26 is pulled upward, it rotates slightly backward, thereby causing the hoop legs element to contact the bottom lid surface 16A thereby limiting the rotation of the hoop handle 26.

Figure 24:
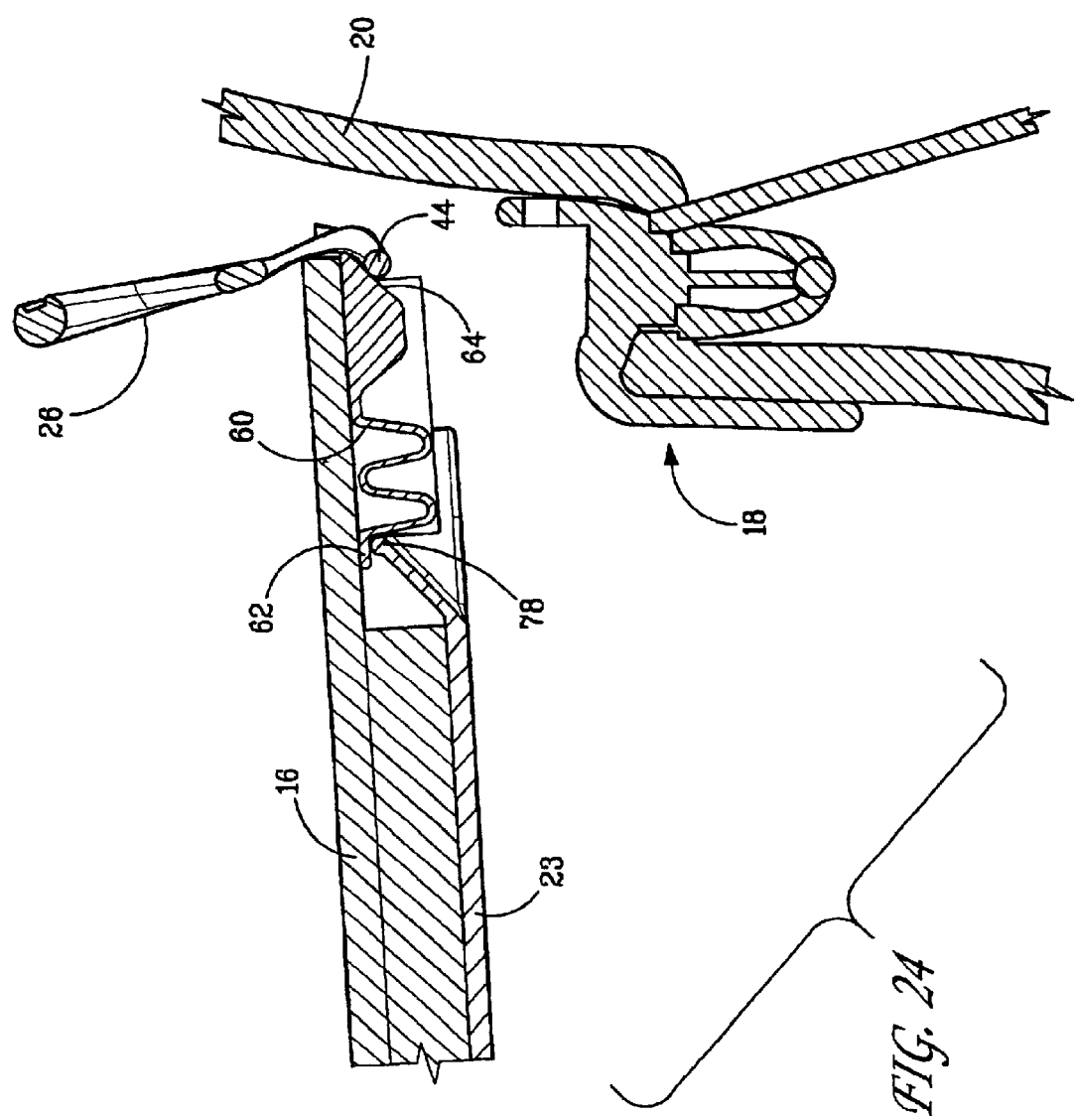
FIG. 24 is a sectional view taken along the line of II—II of FIG. 2 of a load floor latch according to the present invention in the open position with the lid raised, illustrating the pawl member of the latch disengaged from the lid support and the hoop actuator means of the latch slightly rotated.
Figure 25:
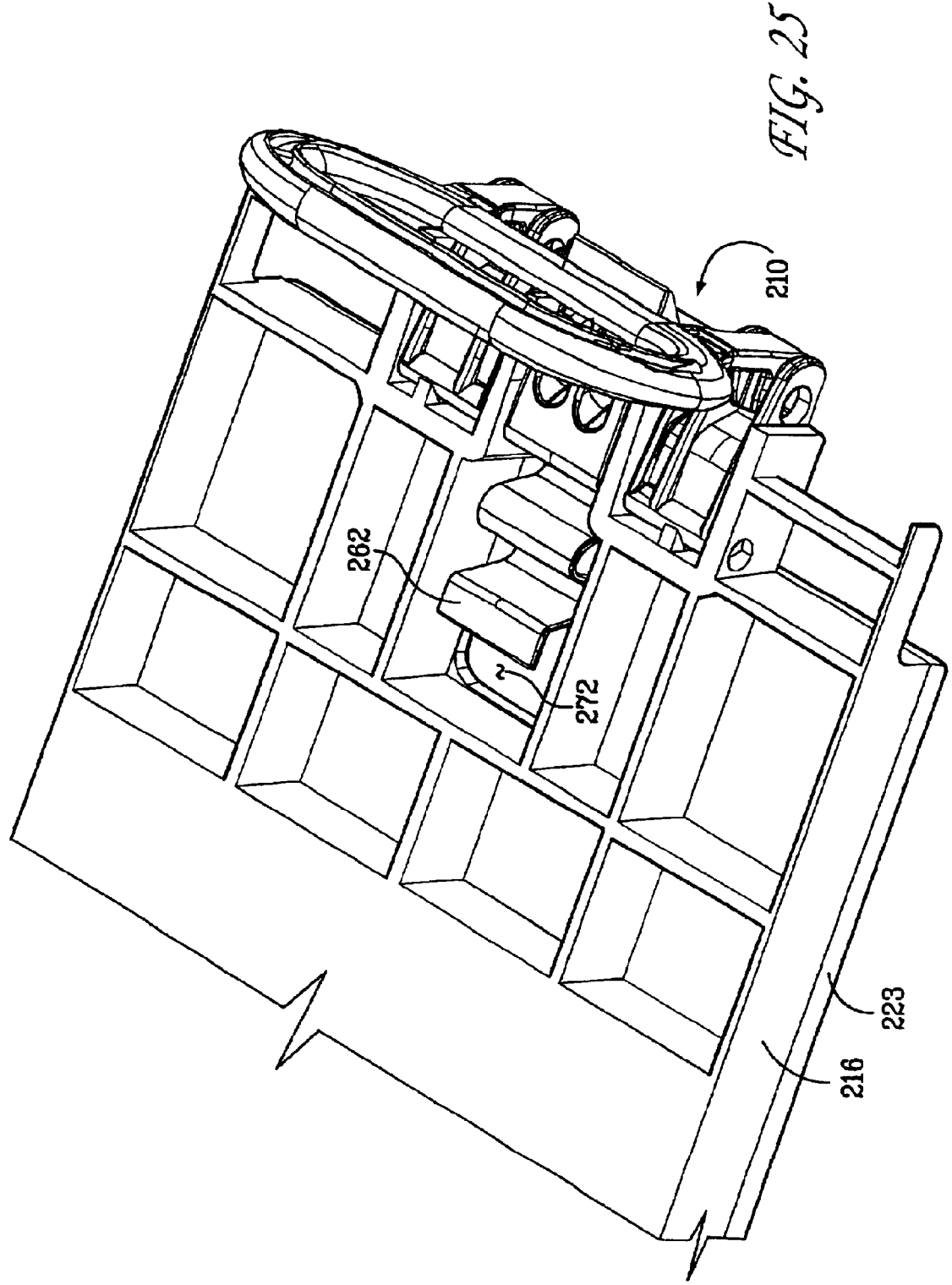
FIG. 25 is a top perspective view of the second embodiment of the lid for a load floor latch with the top skin removed according to the present invention illustrating attached lid cover and latch.
Figure 26:
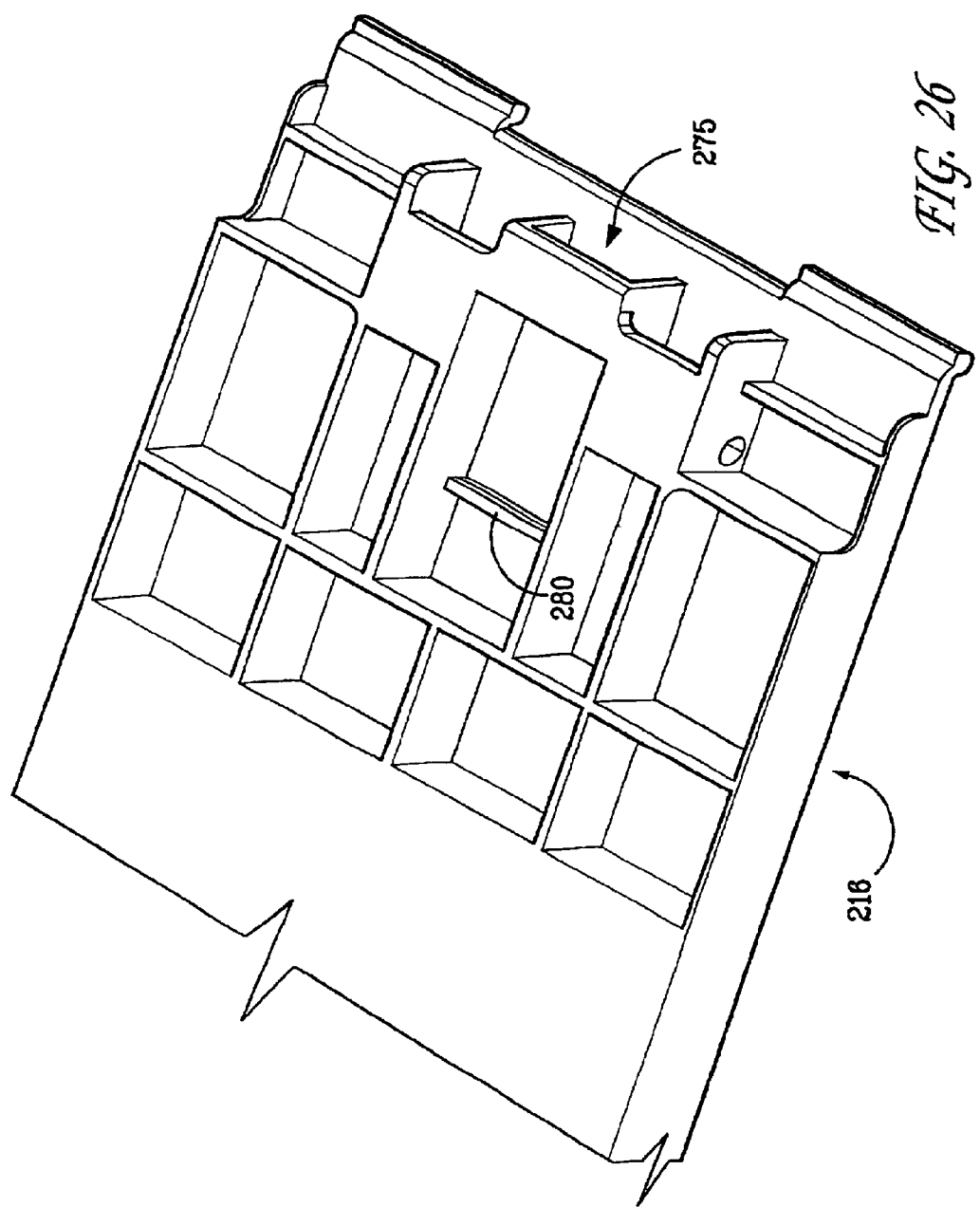
FIG. 26 is a bottom perspective view of the second embodiment of the lid for a load floor latch according to the present invention
Figure 27:
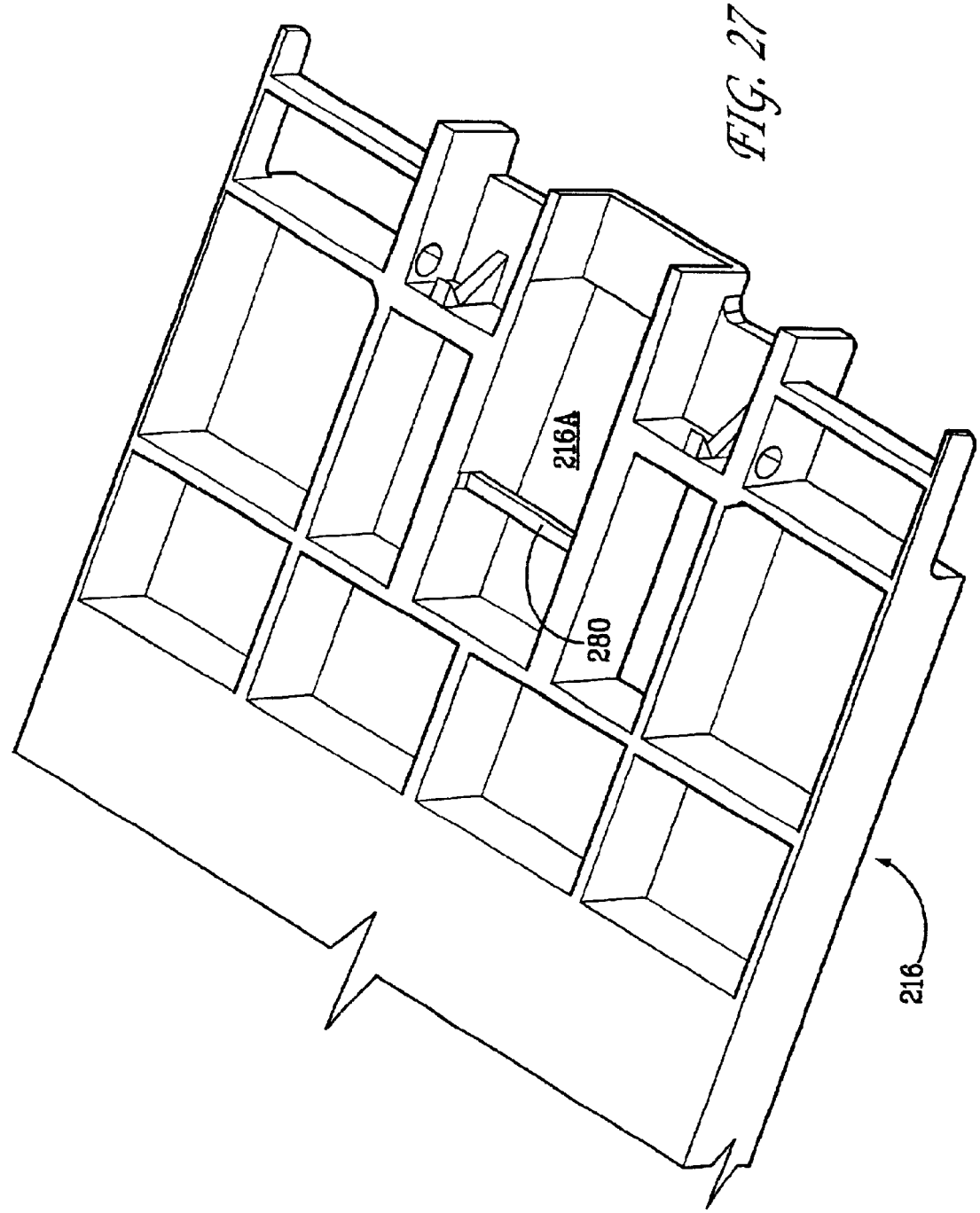
FIG. 27 is a top perspective view of the second embodiment of the lid for a load floor latch with the top skin removed according to the present invention.
Figure 28:
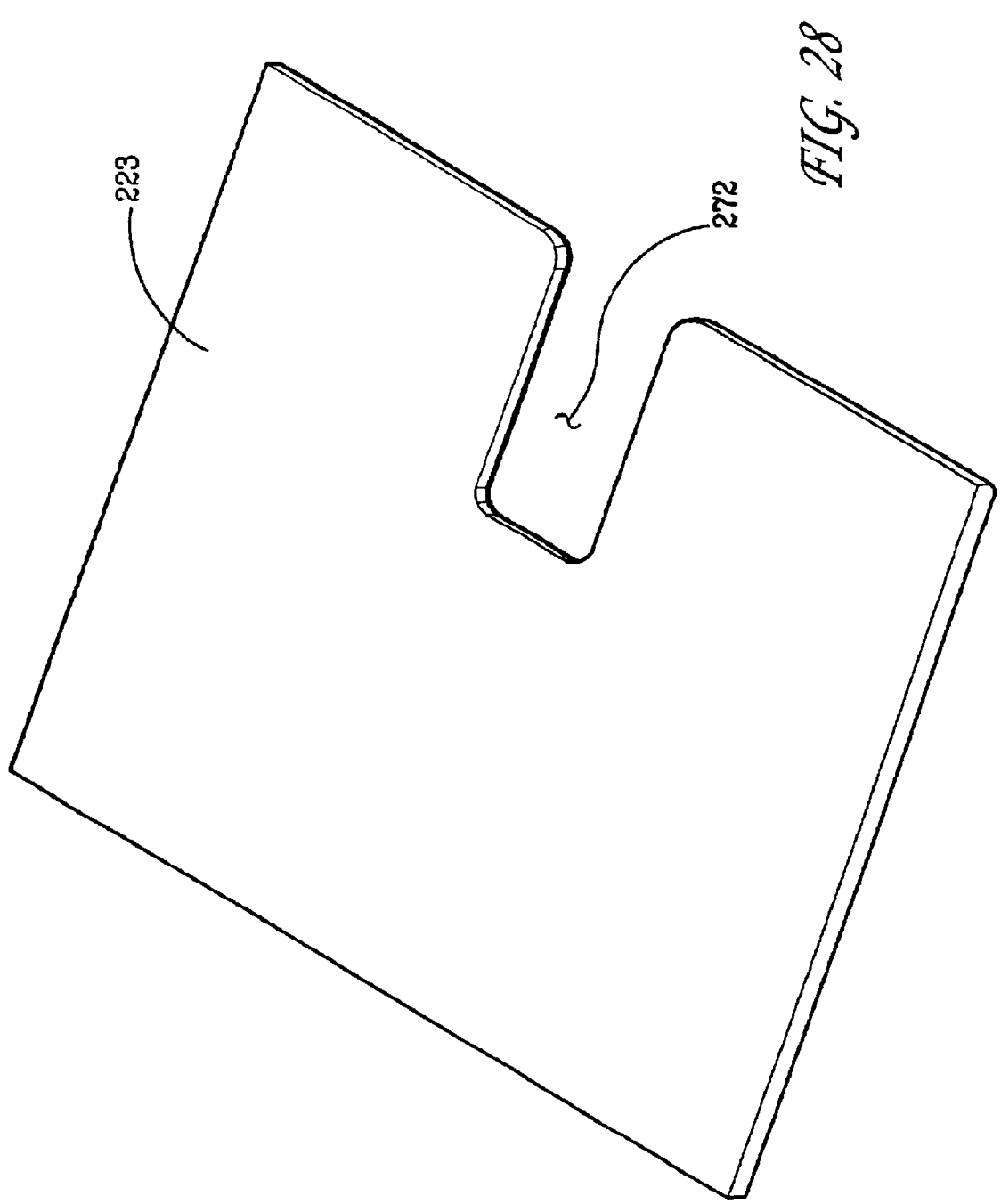
FIG. 28 is a top perspective view of the second embodiment of the lid cover for a load floor latch according to the present.
Figure 29:
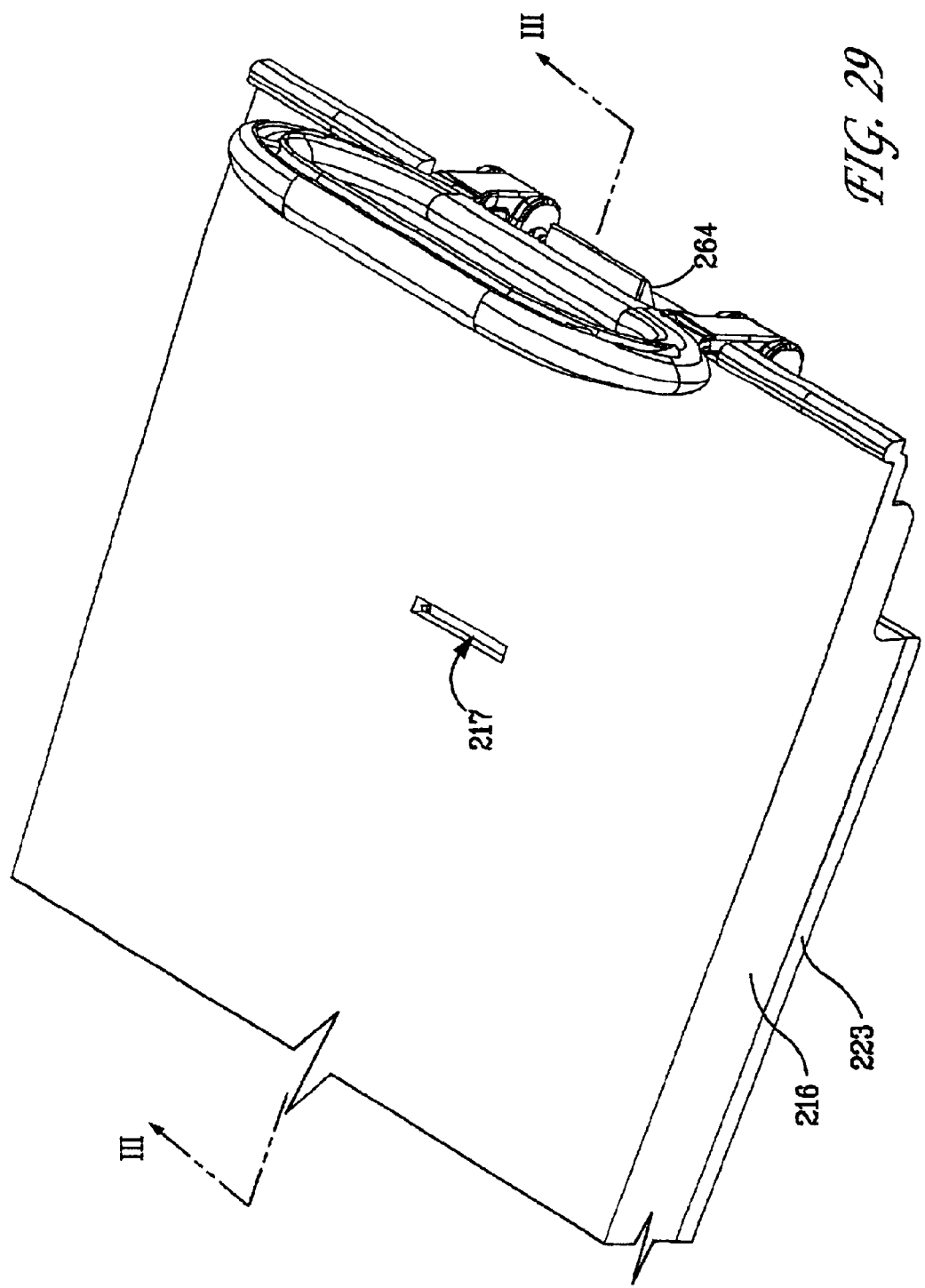
FIG. 29 is a top perspective view of the second embodiment of the lid for a load floor latch according to the present invention illustrating the attached lid cover and latch.
Figure 30:
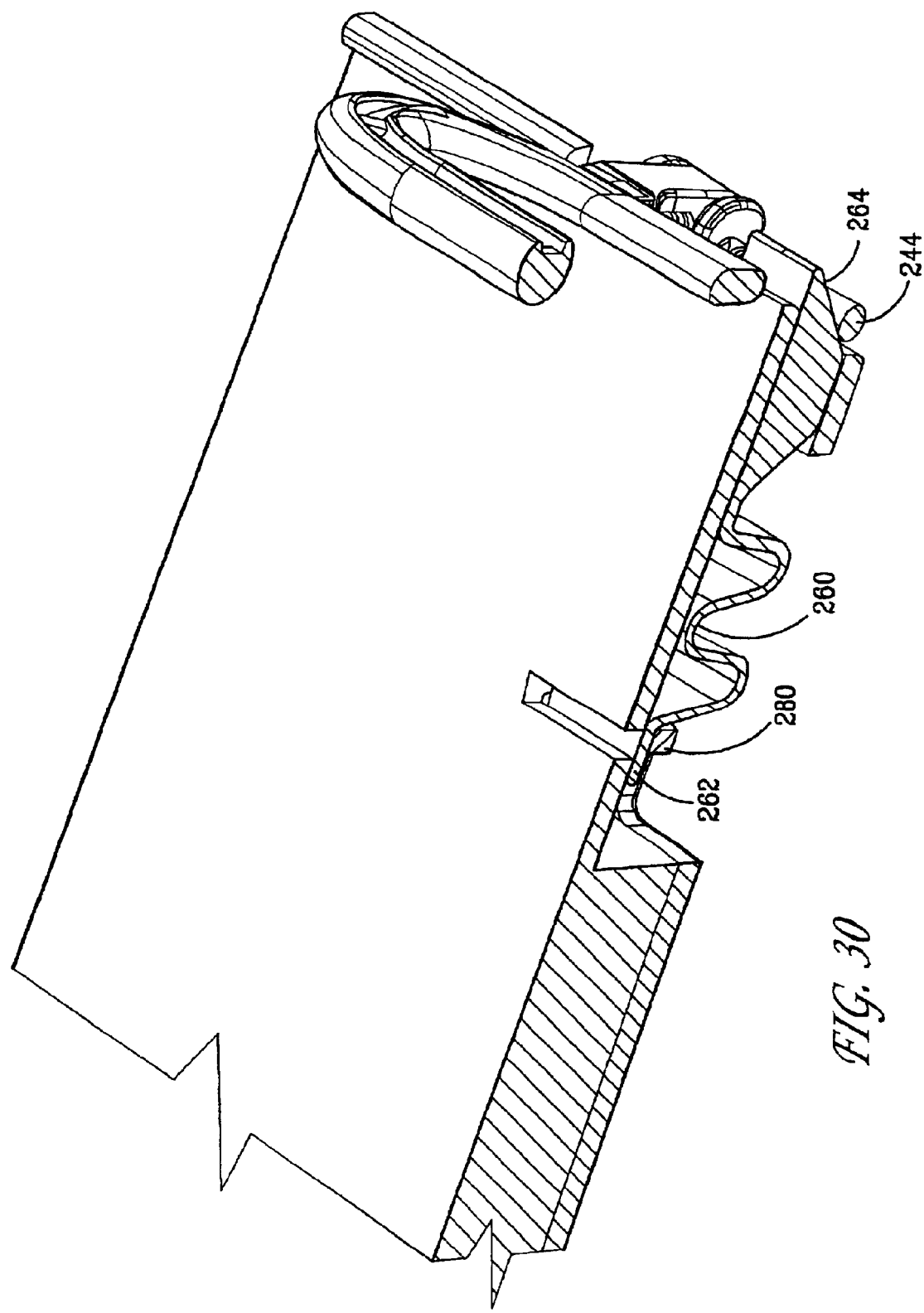
FIG. 30 is a perspective sectional view taken along the line III—III of FIG. 29 of the second embodiment of the load floor latch according to the present invention illustrating the latch attached to the lid and lid cover.
Figure 31:
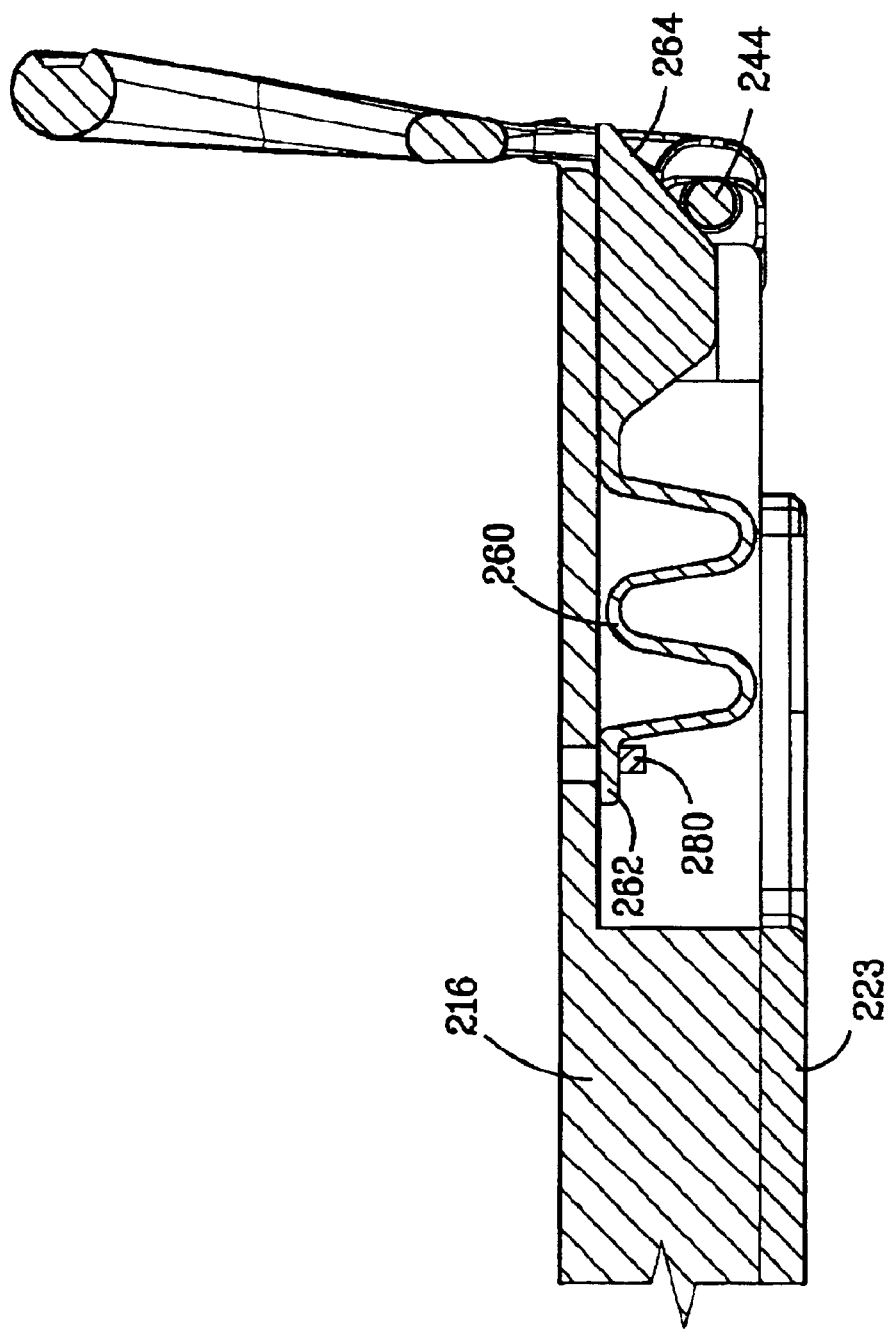
FIG. 31 is a sectional view taken along the line of III—III of FIG. 29 of the second embodiment of the load floor latch according to the present invention illustrating the latch attached to the lid and lid cover.
Figure 32:
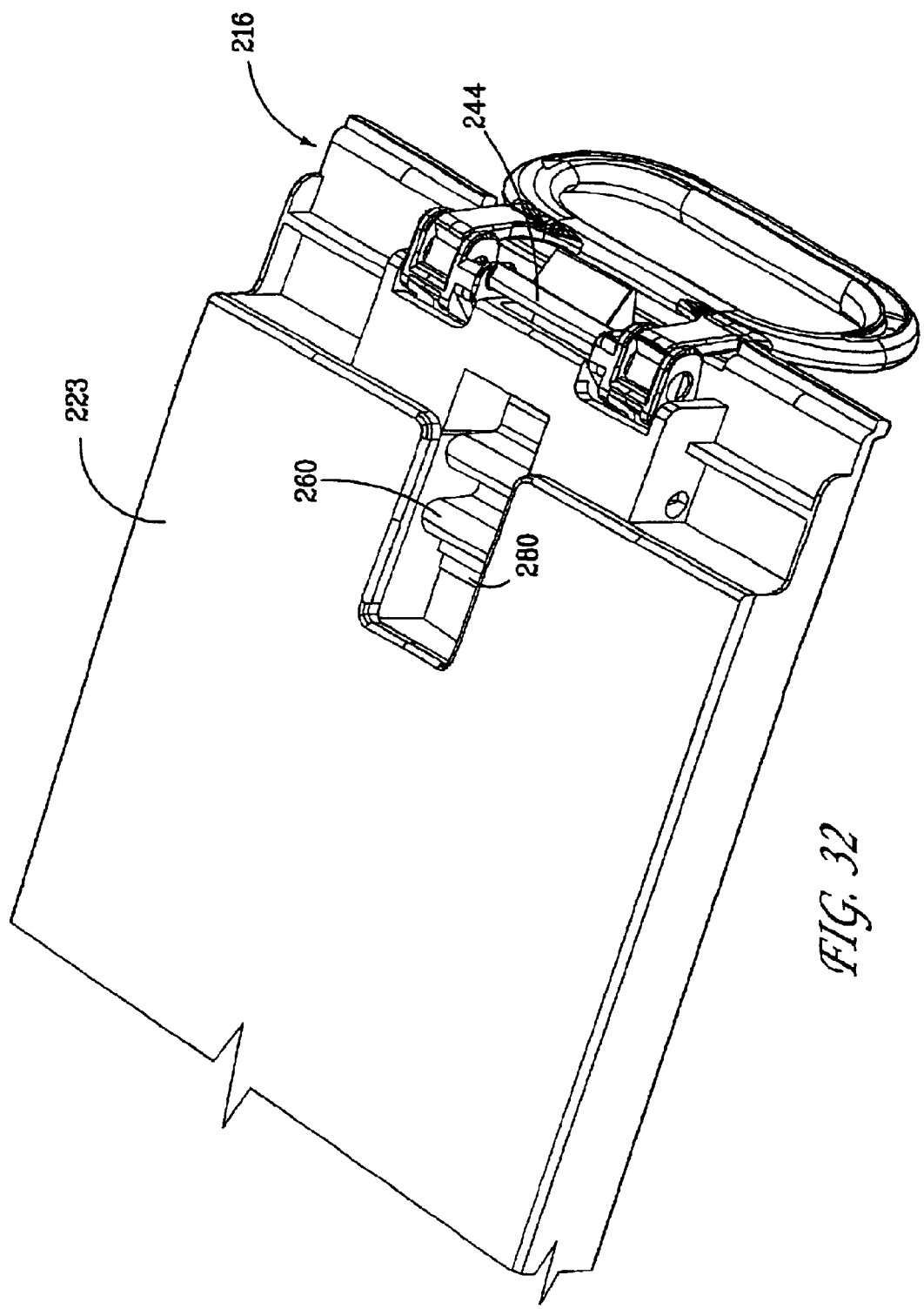
FIG. 32 is a bottom perspective view of the second embodiment of the lid for a load floor latch according to the present invention illustrating attached lid cover and latch.
Figure 33:
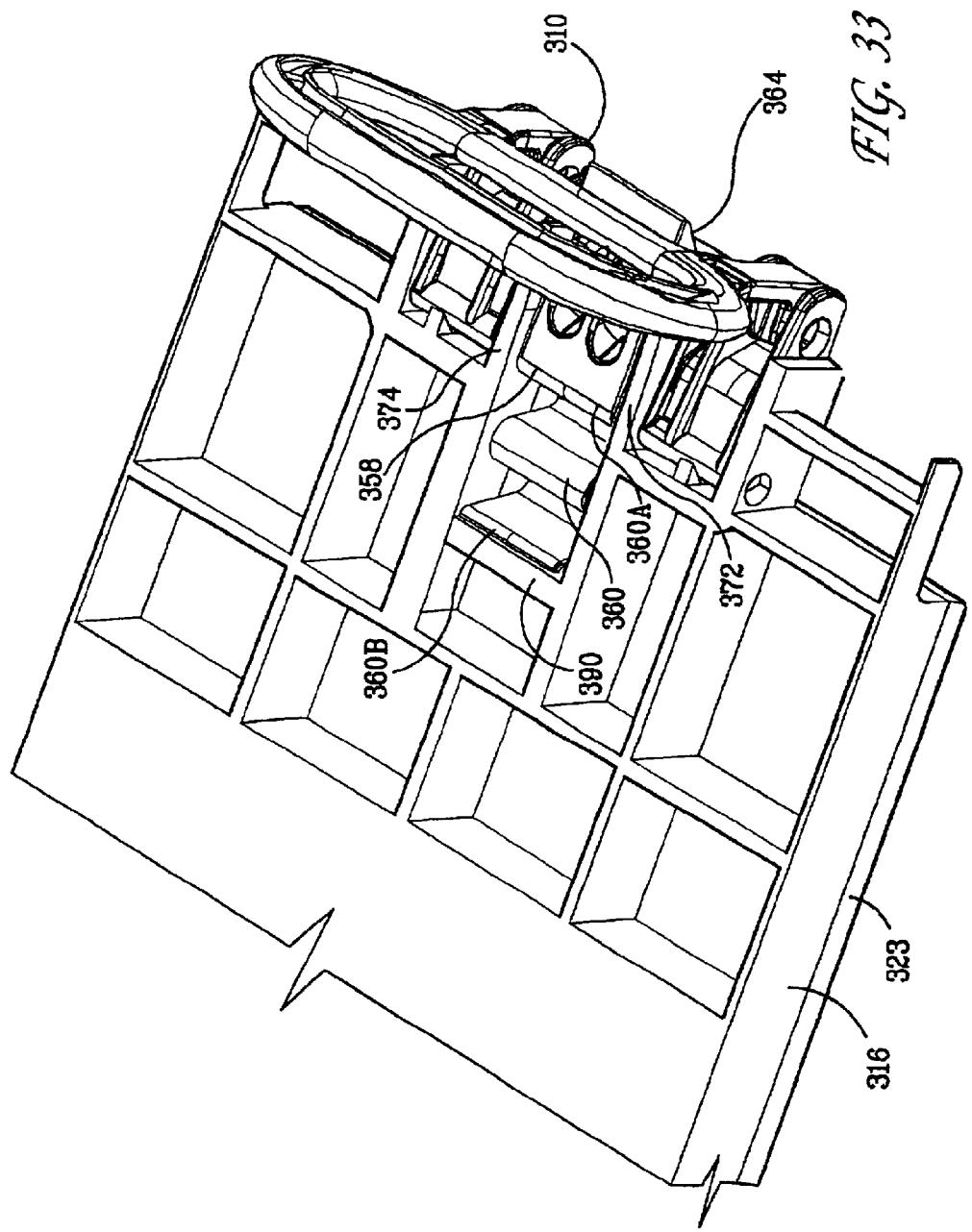
FIG. 33 is a top perspective view of the third embodiment of the lid for a load floor latch with the top skin removed according to the present invention illustrating attached lid cover and latch.
Figure 34:
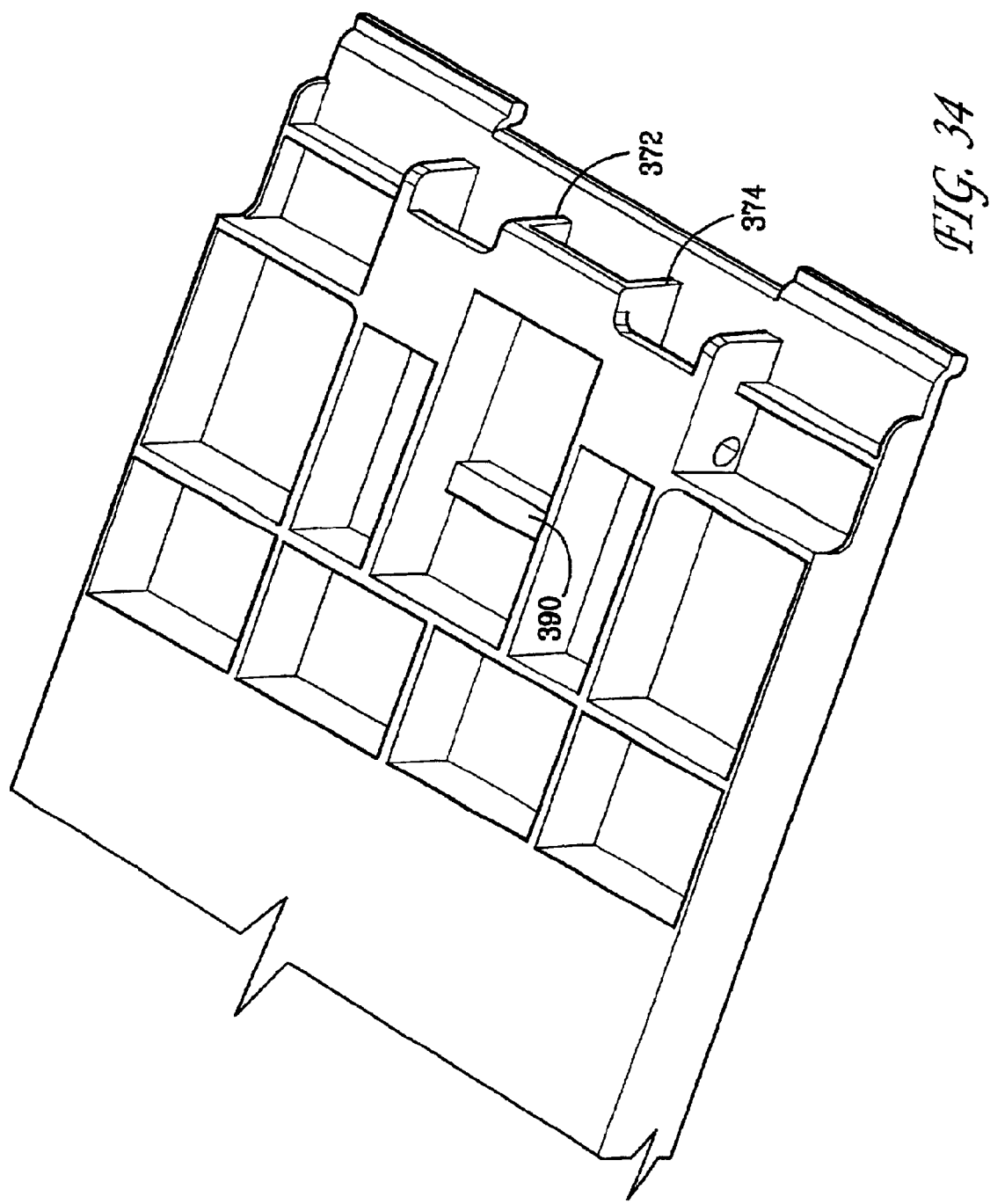
FIG. 34 is a bottom perspective view of the third embodiment of the lid for a load floor latch according to the present invention
Figure 35:
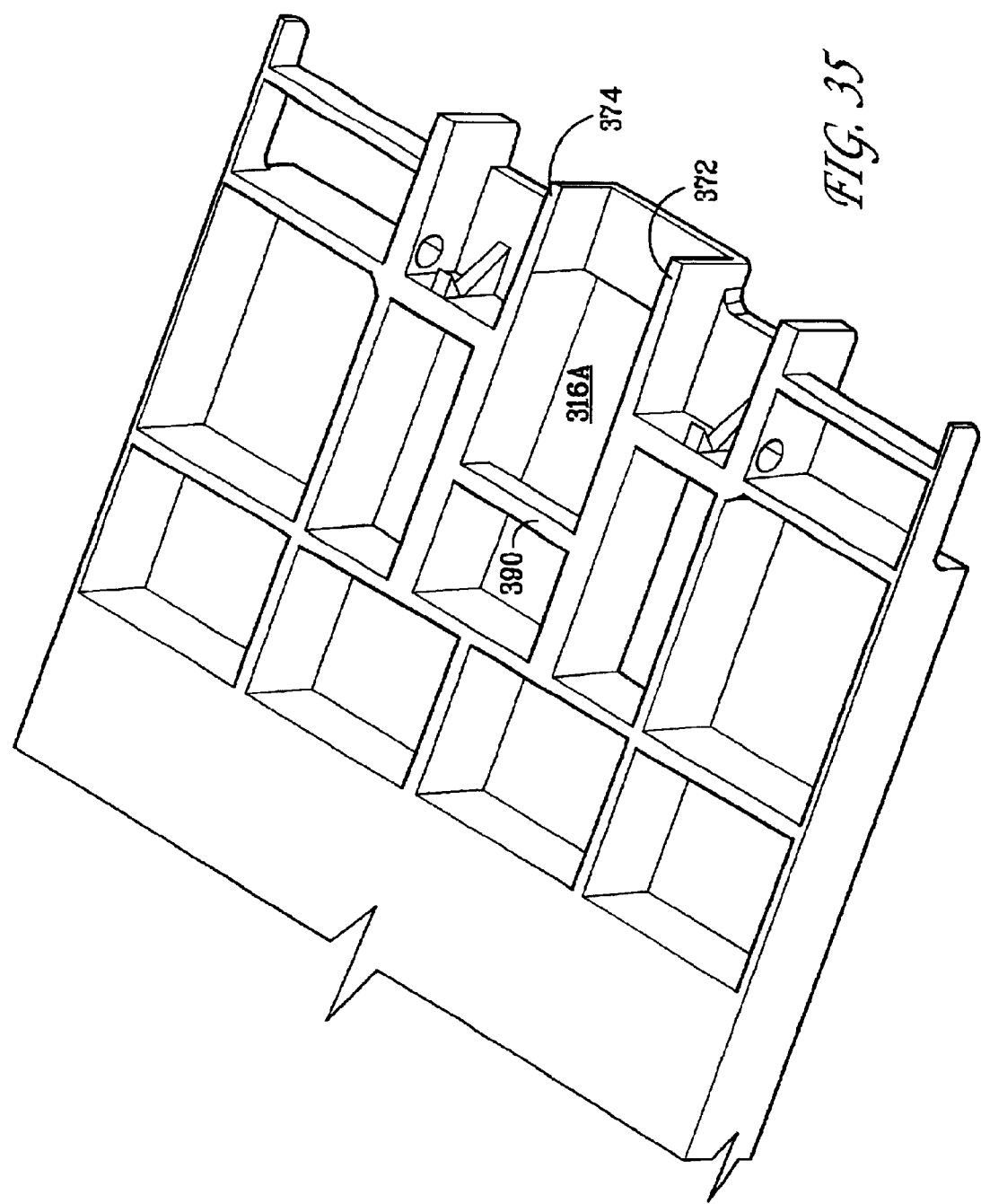
FIG. 35 is a top perspective view of the third embodiment of the lid for a load floor latch with the top skin removed according to the present invention.
Figure 36:
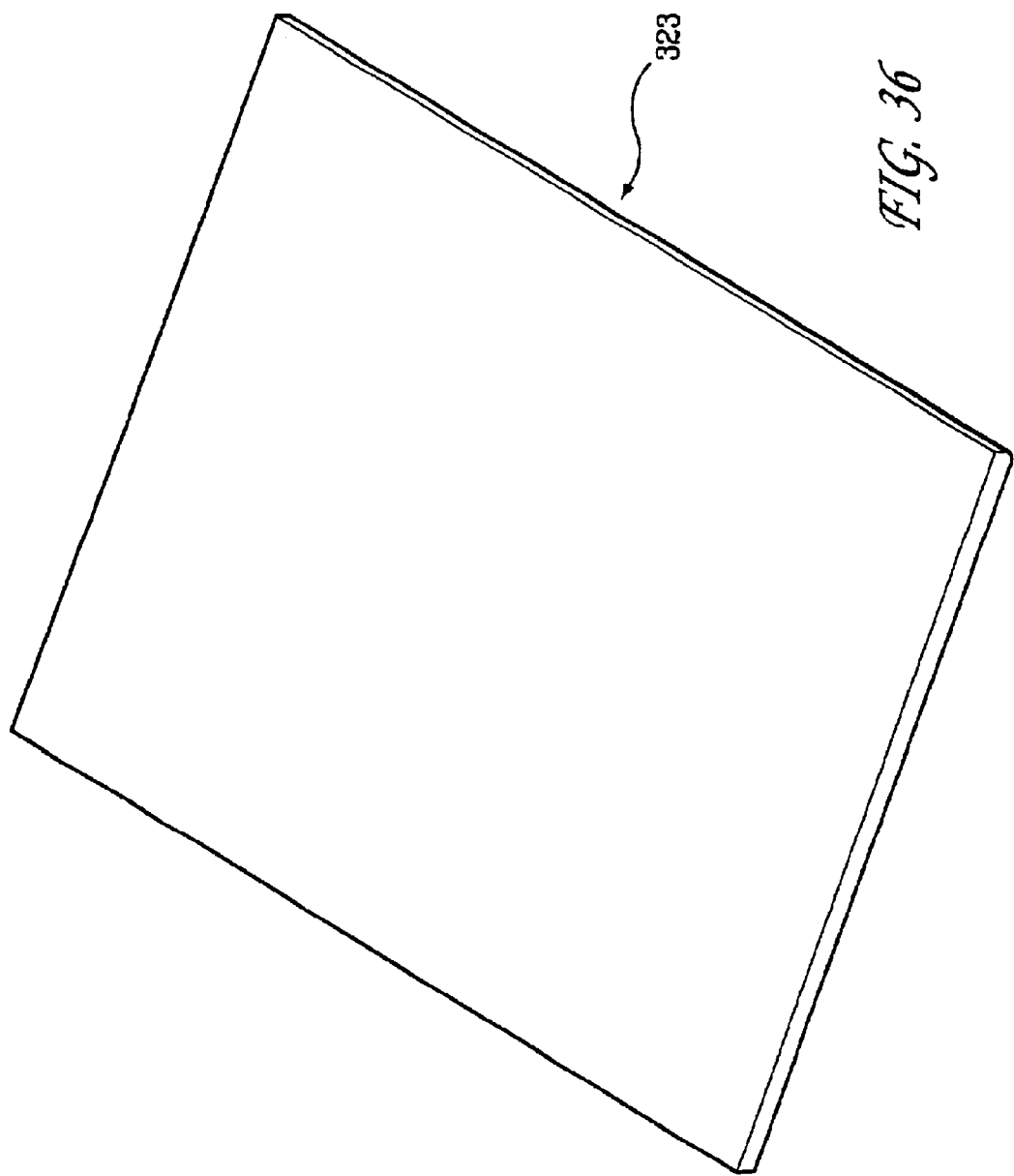
FIG. 36 is a top perspective view of the third embodiment of the lid cover for a load floor latch according to the present.
Figure 37:
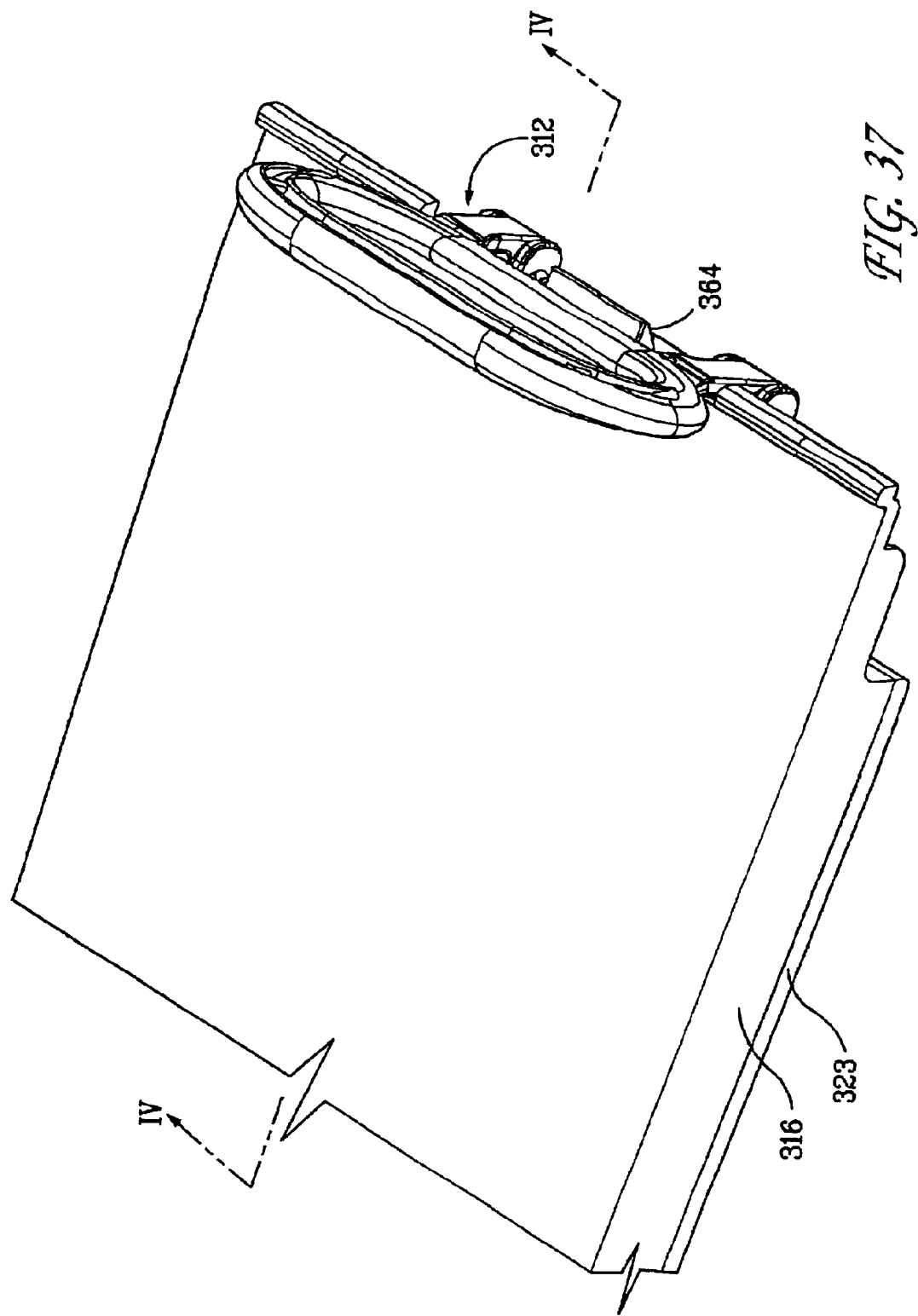
FIG. 37 is a top perspective view of the third embodiment of the lid for a load floor latch according to the present invention illustrating the attached lid cover and latch.
Figure 38:
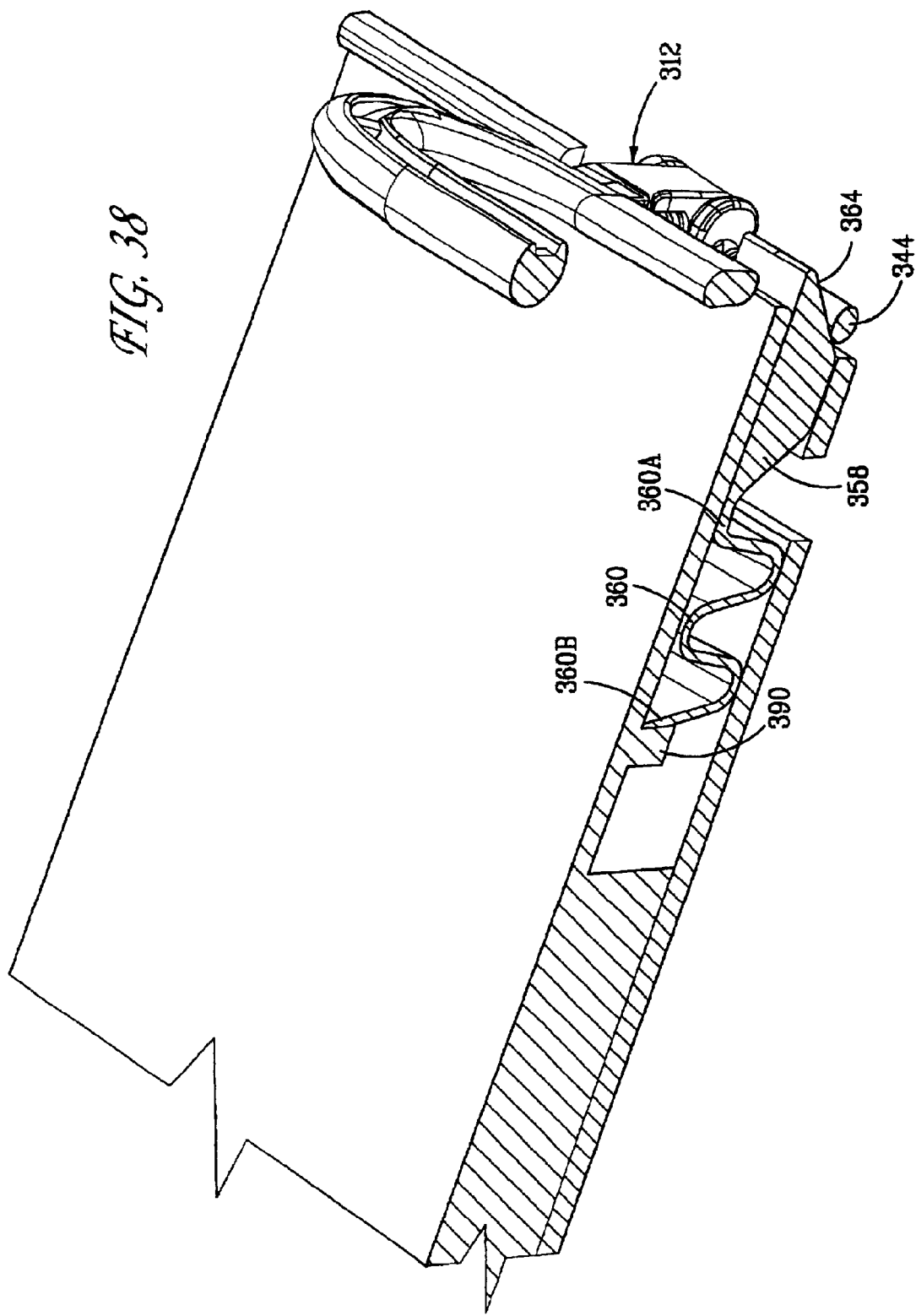
FIG. 38 is a perspective sectional view taken along the line IV—IV of FIG. 37 of the third embodiment of the load floor latch according to the present invention illustrating the latch attached to the lid and lid cover.
Figure 39:
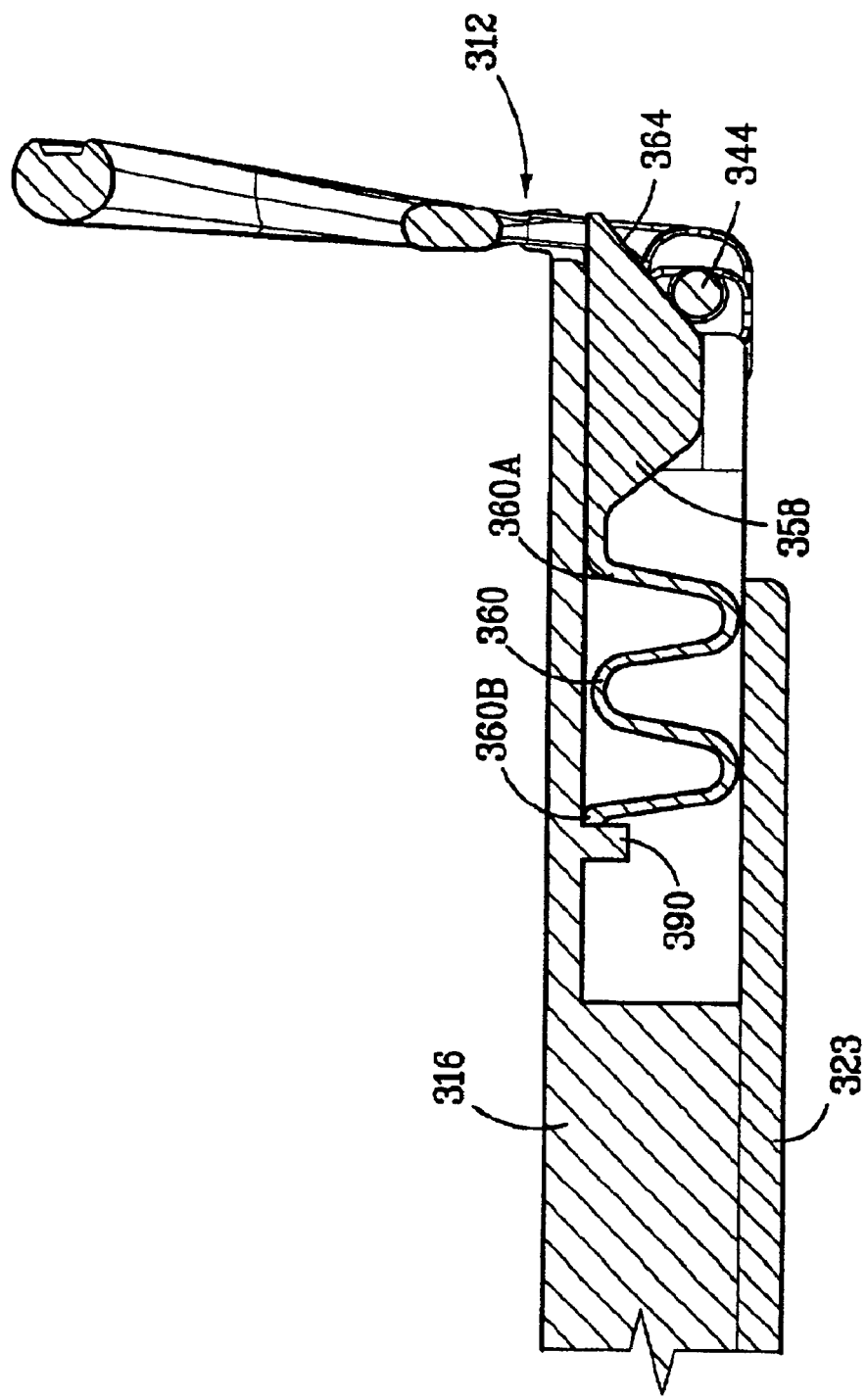
FIG. 39 is a sectional view taken along the line of IV—IV of FIG. 37 of the third embodiment of the load floor latch according to the present invention illustrating the latch attached to the lid and lid cover.

The raised disengaged latch 10 is best illustrated in FIG. 24. As the latch 10 is raised, the shaft 44 remains at the top of the slam action ramped element 64 of the pawl member 14 thereby causing continued force on the living spring 60 which is maintained in the flexed position. The snap in shafts 46,48 remain in contact with the lid 16 and the pull force is maintained against the lid 100 when lifted.

The latch 10 and attached lid 16 are closed by slam action of the pawl member 14. The latch 10 and lid 16 are aligned and forced downward, contacting the lid support 18 thereby forcing the pawl member 14 backward compressing the living spring 60. The backward movement of the pawl member 14 allows the slam action ramped element 64 to be displaced so as to pass the lid support 18 and then snap back engaging the lid support 18 in the closed position.

Another embodiment of the latch in accordance with the present invention is illustrated in FIGS. 25 through 32. The latch 210 in the present embodiment is similar in both structure and function to many of the features already described in detail with respect to the latch 10, and for this reason, only the differences in the latch 210 from the latch 10 will be described herein for the sake of brevity, Also, for ease of reference, portion in this embodiment similar to the latch 10 will describing using the same number designation except beginning with 210.

FIGS. 25–32 refer to the second embodiment of the present invention. The lid 216 of the second embodiment comprises a pawl holder 280 located between the central sidewalls 272,274 which form a slot 275 for the pawl member 214. The pawl holder 280 is designed to receive the pawl tail 262 of the pawl member 214. The top skin 216B of the lid 216 has a cutout 217 for access to the pawl tail 262. The lid cover 223 is flat with a pawl tail aperture 272.

The pawl member is attached to the lid 216 by sliding the pawl member 214 along the bottom side 216A of the lid 216 until the slam action ramped element 264 contacts the shaft 244 of the hoop actuator means 212, thereafter inserting the pawl tail 262 into the pawl tail holder 280, thus maintaining the pawl member 214 in place between the shaft 244 and the pawl tail holder 280 in the relaxed position. During activation and (slam action) closing of the latch 210, the pawl tail holder 280 is used as a camming means for the flexed movement of the living spring 260 of the pawl member 214.

Another embodiment of the latch in accordance with the present invention is illustrated in FIGS. 34 through 40. The latch 310 in the present embodiment is similar in both structure and function to many of the features already described in detail with respect to the latch 10, and for this reason, only the differences in the latch 310 from the latch 10 will be described herein for the sake of brevity, Also, for ease of reference, portion in this embodiment similar to the latch 10 will describing using the same number designation except beginning with 310.

FIGS. 34–41 refer to the third embodiment of the present invention. A lid 316 is shown for use with the third embodiment of the invention. The lid 316 comprises a pawl camming bar 390 located between the central sidewalls 372,374 which form a slot for the pawl member 314. The pawl camming bar 390 is designed to maintain the pawl member 314 in position when the living spring 360 is in the relaxed position and as a camming means when the living spring 360 is in the flexed position. The lid cover 323 is flat and compliments the shape of the lid 316.

Figure 40:
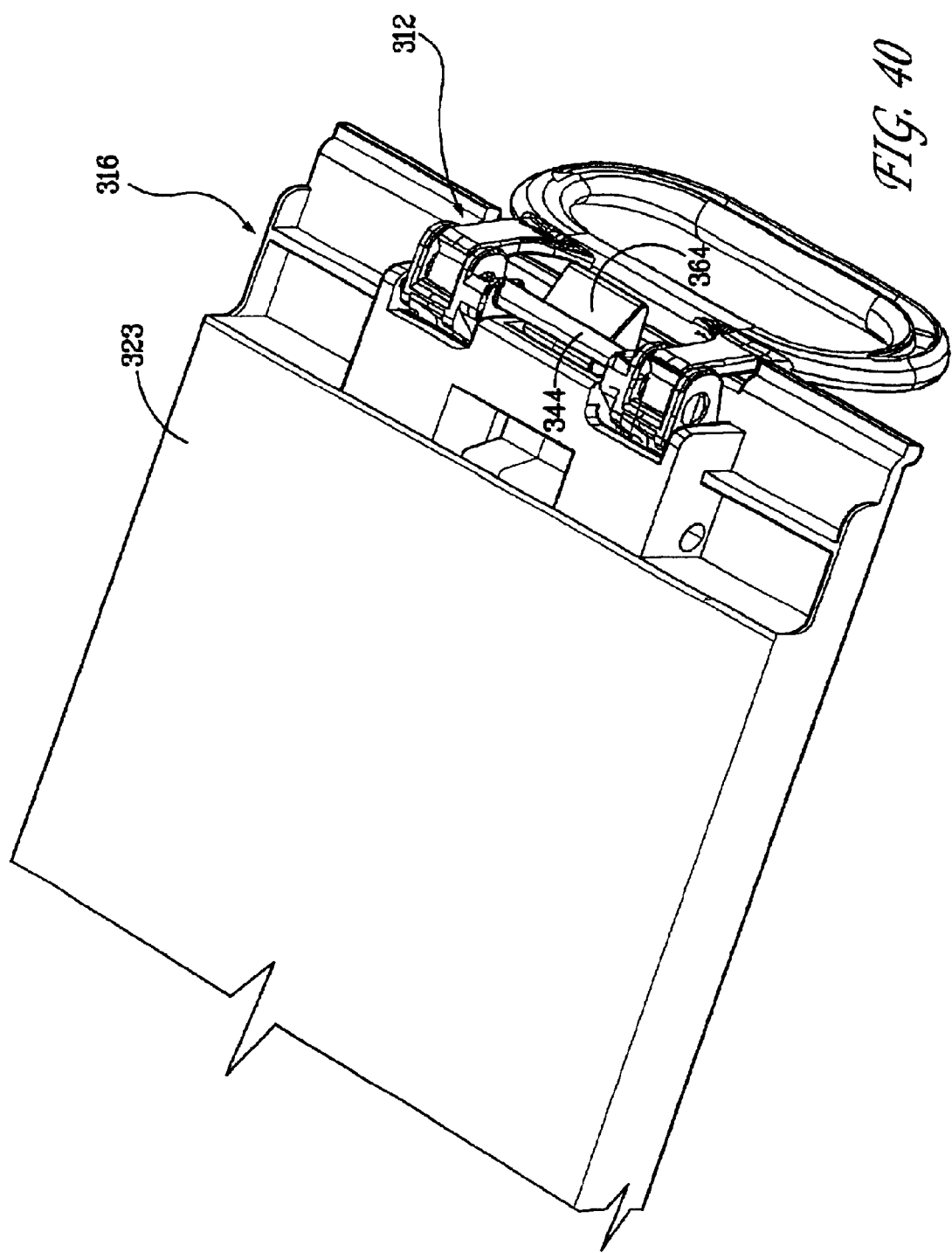
FIG. 40 is a bottom perspective view of the third embodiment of the lid for a load floor latch according to the present invention illustrating attached lid cover and latch.
Figure 41:
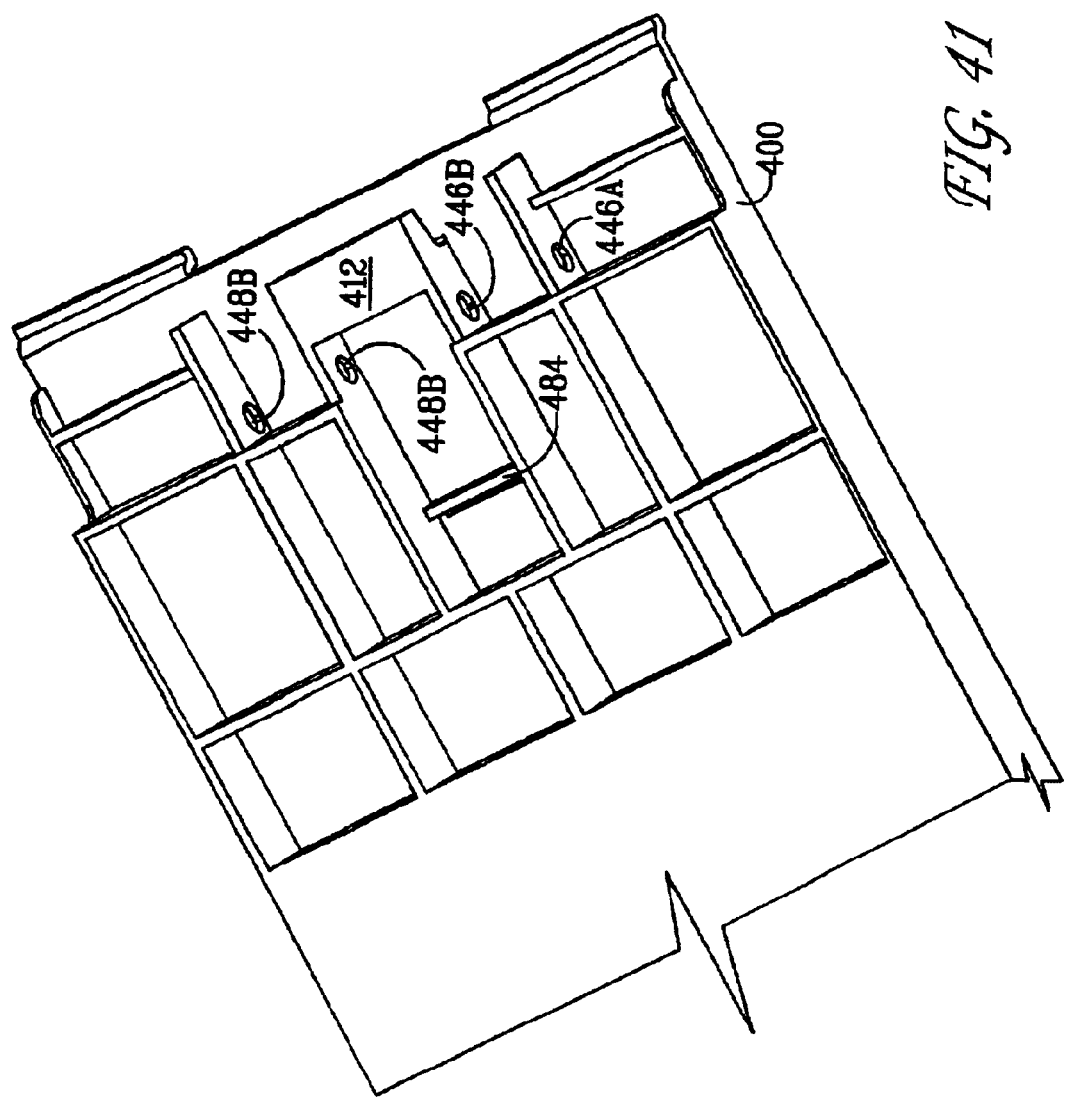
FIG. 41 is a bottom perspective view of the lid of the panel for the fourth embodiment of the load floor latch according to the present invention
Figure 42:
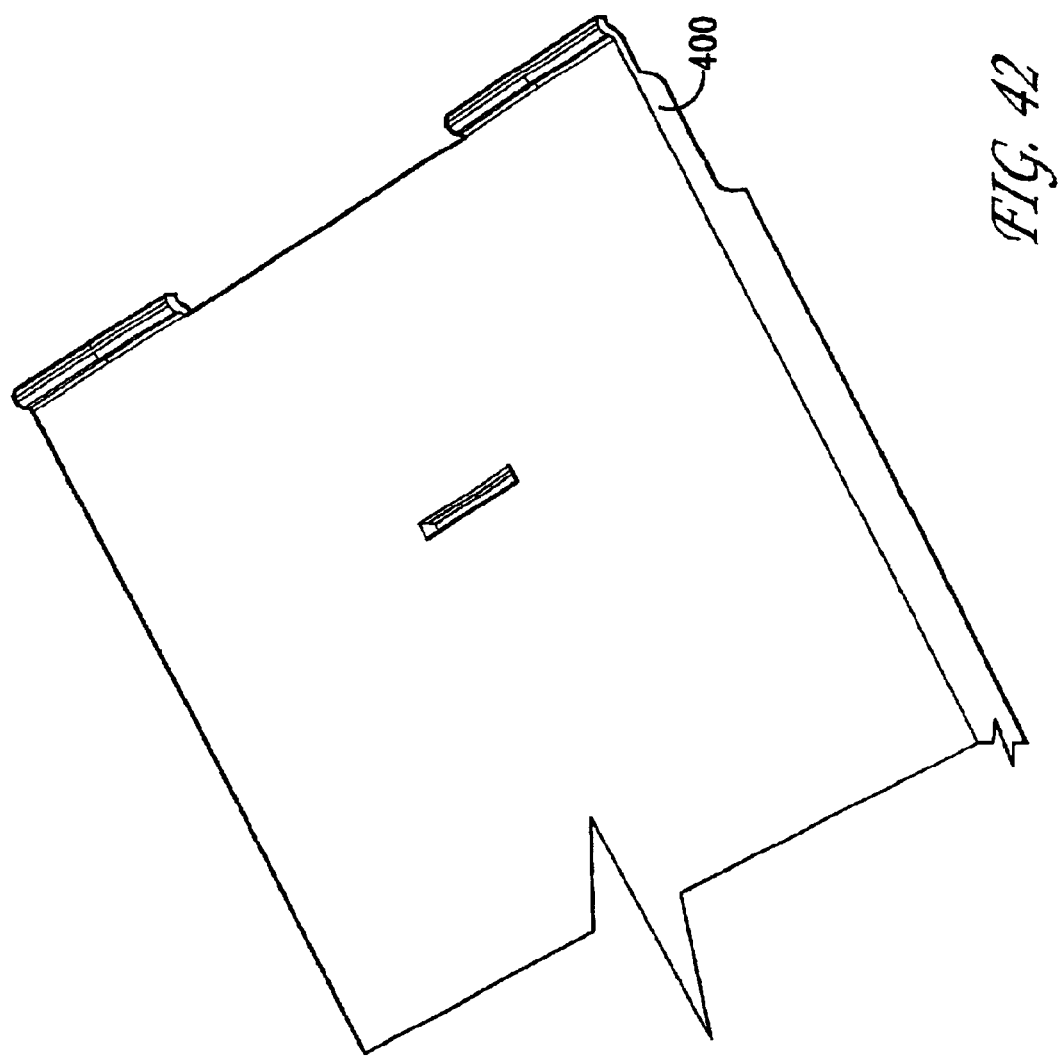
FIG. 42 is a top perspective view of the lid of the panel for the fourth embodiment of the load floor latch according to the present invention
Figure 43:
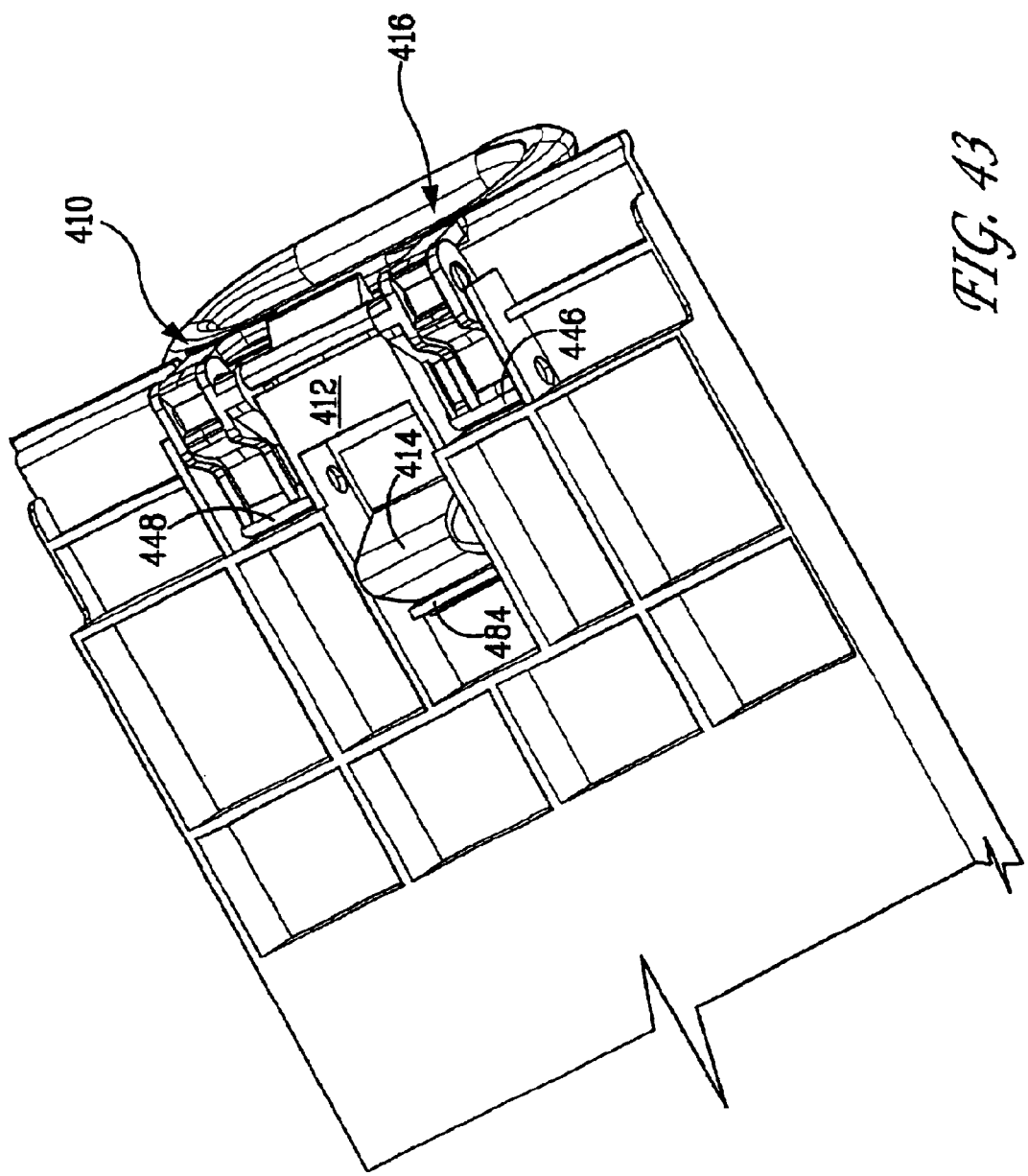
FIG. 43 is a bottom perspective view of the fourth embodiment of the load floor latch according to the present invention.
Figure 44:
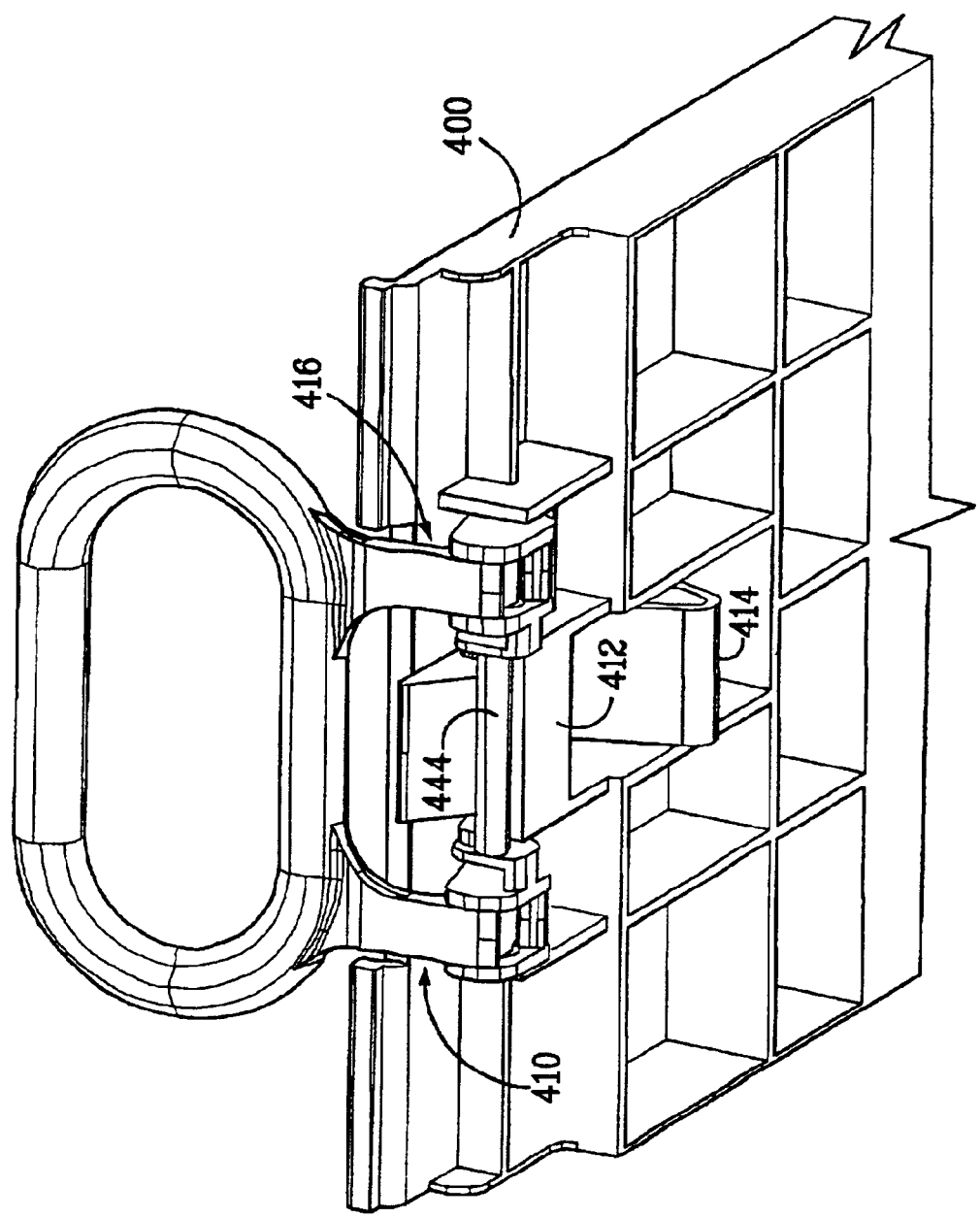
FIG. 44 is a front perspective view of the fourth embodiment of the load floor latch according to the present invention.

The pawl member 314 is best illustrated in FIG. 40. The pawl member 314 comprises a pawl body portion 358 integral at one end with proximal end of a living spring 360A and a slam action ramped element 364 on the opposite end. The living spring 360 flexes during opening and (slam action) closing of the latch 310 based on the displacement of the slam action ramped element 364. The distal end 360B of the living spring contacts the camming bar 390 attached to the central sidewalls 372,374 of the lid 316. The pawl member is attached to the lid 316 by sliding the pawl member 314 along the bottom side 316A of the lid 316 until the slam action ramped element 364 contacts the shaft 344 of the hoop actuator means 312, thereafter positioning the distal end 360B of the living spring 360 against the camming bar 390, thus maintaining the pawl member 314 in place between the shaft 344 and the camming bar 390 in the relaxed position. During activation and (slam action) closing of the latch 310 the camming bar 390 is used as a camming means for the flexed movement of the living spring 360 of the pawl member 314.

Another embodiment of the latch in accordance with the present invention is illustrated in FIGS. 41 through 44. The latch 410 in the present embodiment is similar in both structure and function to many of the features already described in detail with respect to the latch 10, and for this reason, only the differences in the latch 410 from the latch 10 will be described herein for the sake of brevity, Also, for ease of reference, portion in this embodiment similar to the latch 10 will describing using the same number designation except beginning with 410.

FIGS. 41 through 44 refer to the fourth embodiment of the present invention. A lid 400 is shown for use with the second embodiment of the invention. The latch 410 comprises the pawl member 414 and the actuator assembly 416. The latch 410 is attached to the lid 400 comprising recess 446A,446B, 448A,448B, which receive the snap in shafts 446,448 of the actuation assembly 416 of the second embodiment of the invention. Thereafter, the pawl member 414 is attached to the lid 400 containing a pawl holder 484 designed to receive the pawl tail 490, and a support bar 412 which supports a pawl member 414 as it is slid forward to engage the shaft of the actuator assembly 444.

Another embodiment of the latch in accordance with the present invention is illustrated in FIGS. 45 through 57. The latch 510 in the present embodiment is similar in both structure and function to many of the features already described in detail with respect to the latch 10, and for this reason, only the differences in the latch 50 from the latch 10 will be described herein for the sake of brevity, Also, for ease of reference, portion in this embodiment similar to the latch 10 will describing using the same number designation except beginning with 510.

Figure 45:
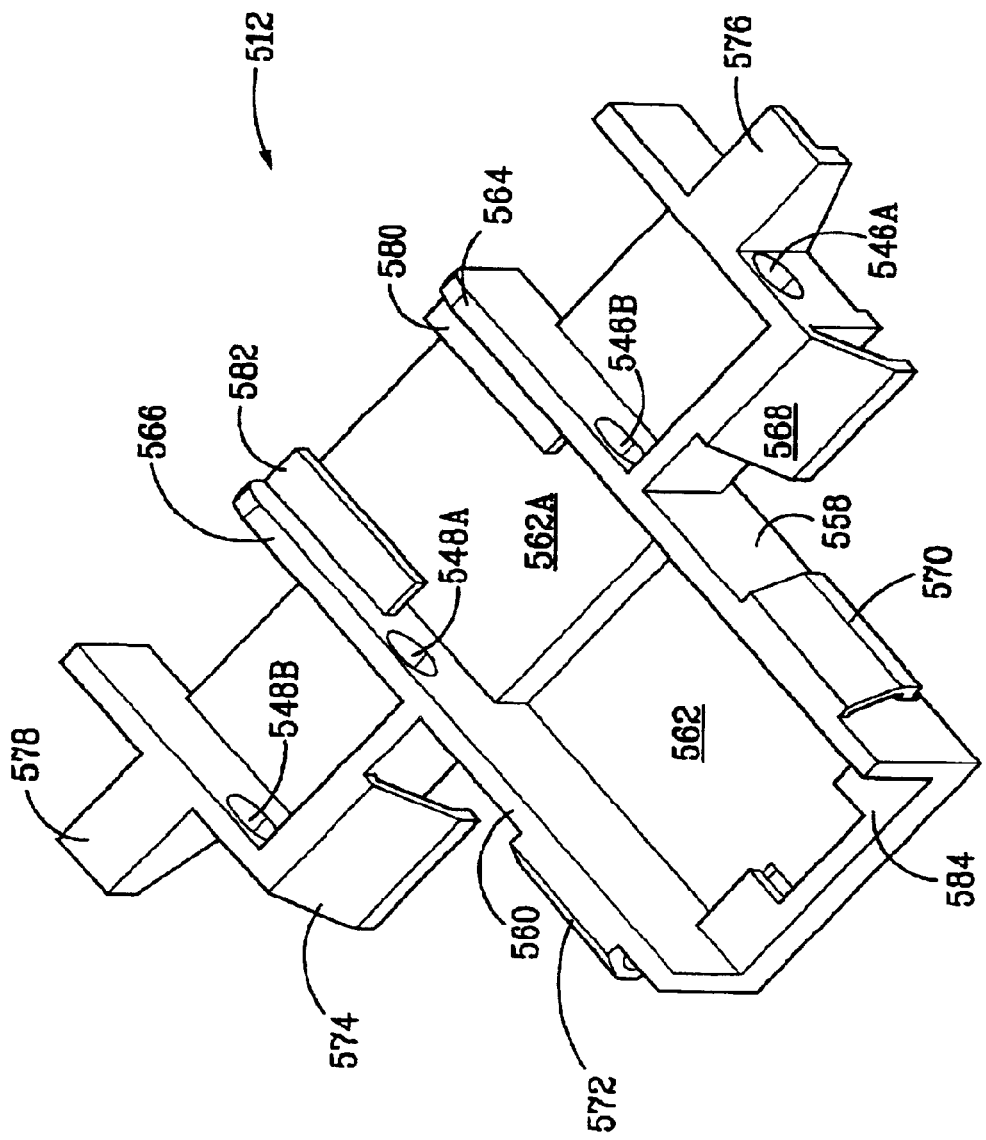
FIG. 45 is a top perspective view of a housing for a load floor latch according to the fifth embodiment of the present invention.
Figure 46:
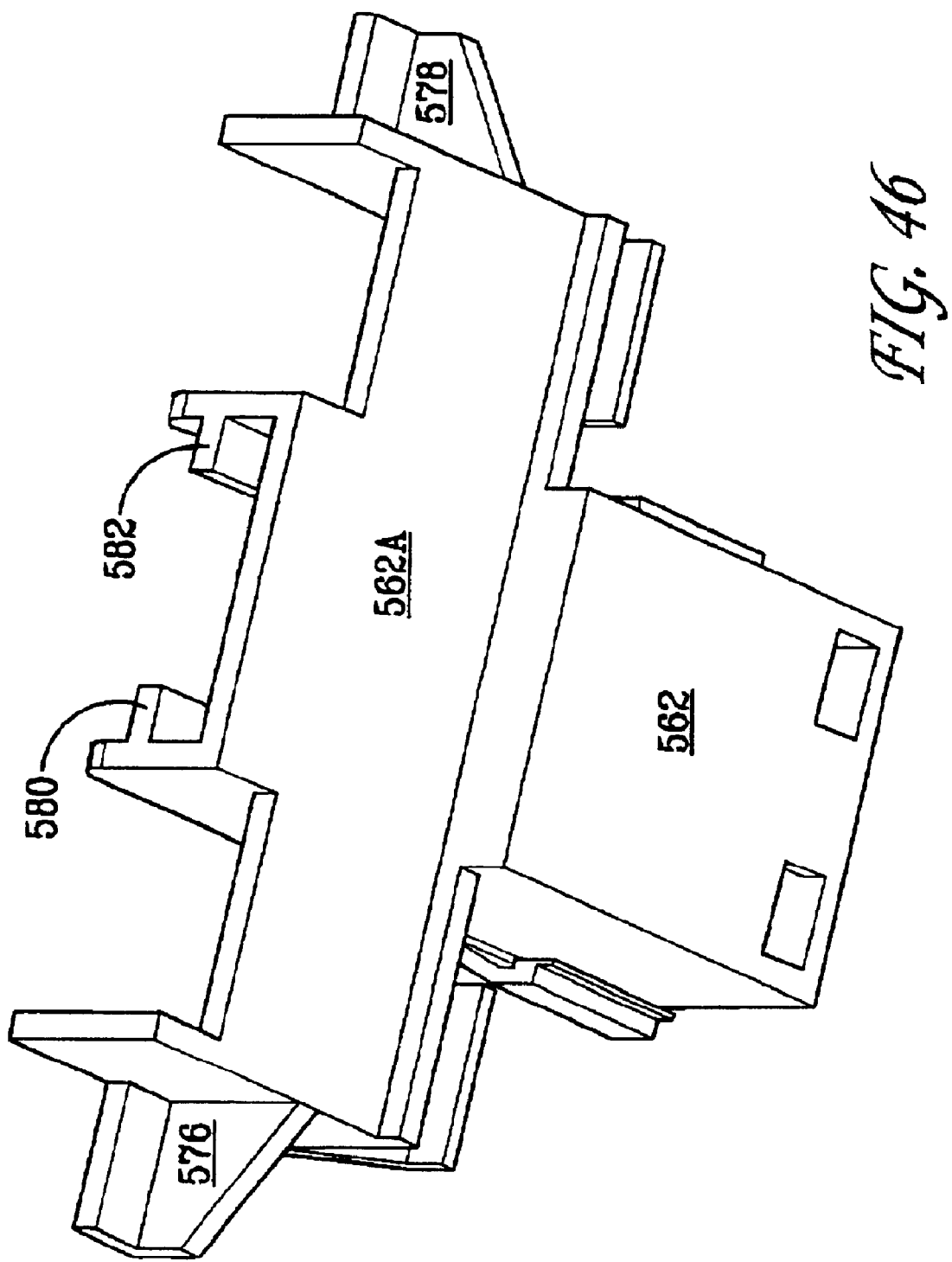
FIG. 46 is a bottom perspective view of a housing for a load floor latch. according to the fifth embodiment of the the present invention.

The T-shaped housing 512 is best illustrated in FIGS. 45 and 46. The housing 512 includes side walls 558,560, a bottom portion 562 and integral center portion walls 564, 566. The side walls 558,560 have snap legs 568,570,572,574 for attachment into a lid 100 and contact hinges 576,578 which contact the lid 100.e side walls 558,560 includes recess means 546A,548B and the center walls 564,566 includes recess means 546B,548A for insertion of snap in shafts 546,548 for rotation of the hoop legs element 542 (described below). The center walls 564,566 include pawl sliding hinges 580,582 located proximal to the guide bottom 562A for attachment of the pawl member 514 (described below). The bottom 562 includes a pawl tail slot 584 which is used to maintain the pawl member 514 when flexed during closing and opening of the latch 510 (described below).

Figure 47:
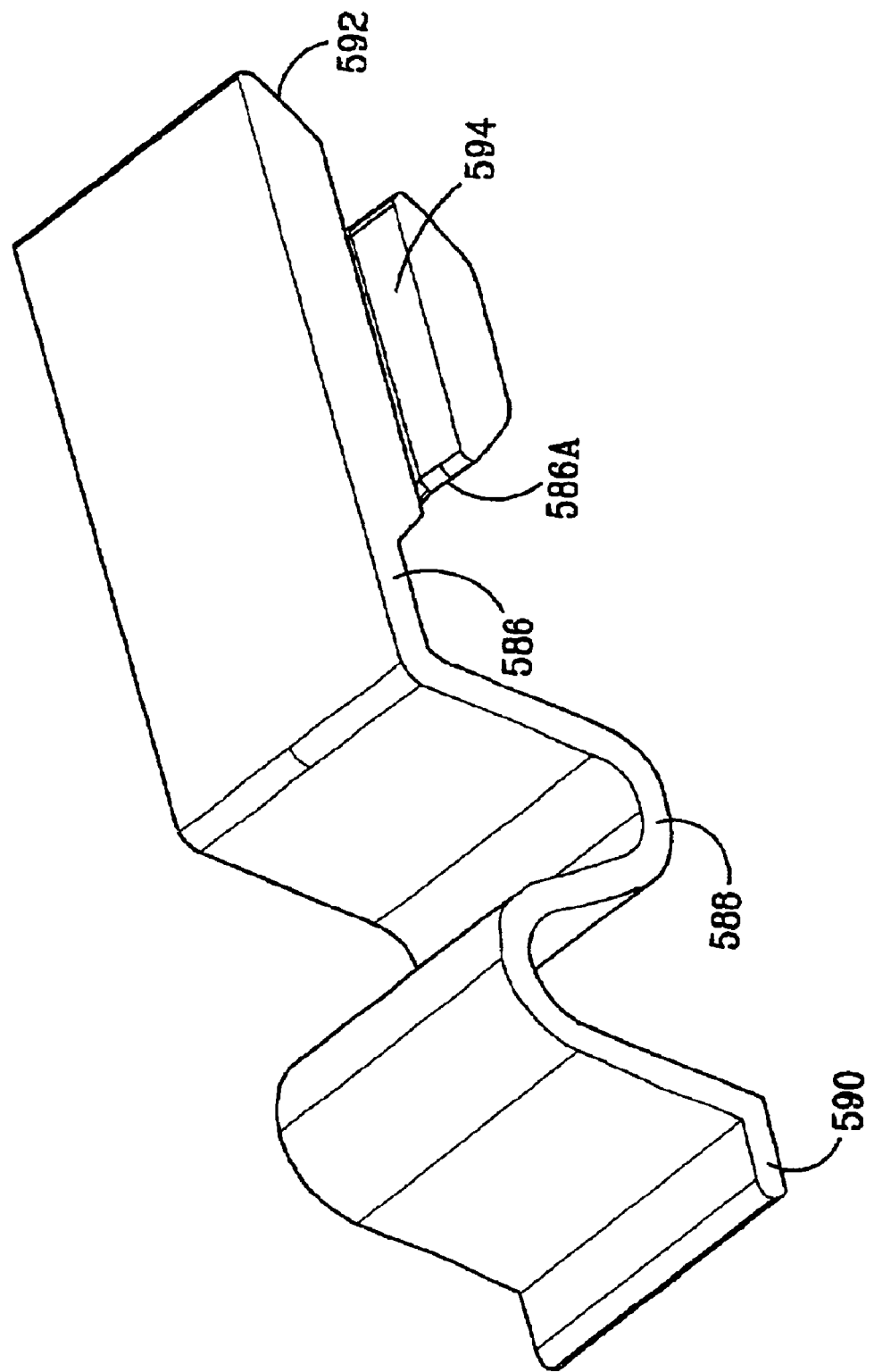
FIG. 47 is a top perspective view of the pawl member for a load floor latch according to the fifth embodiment of the the present invention.
Figure 48:
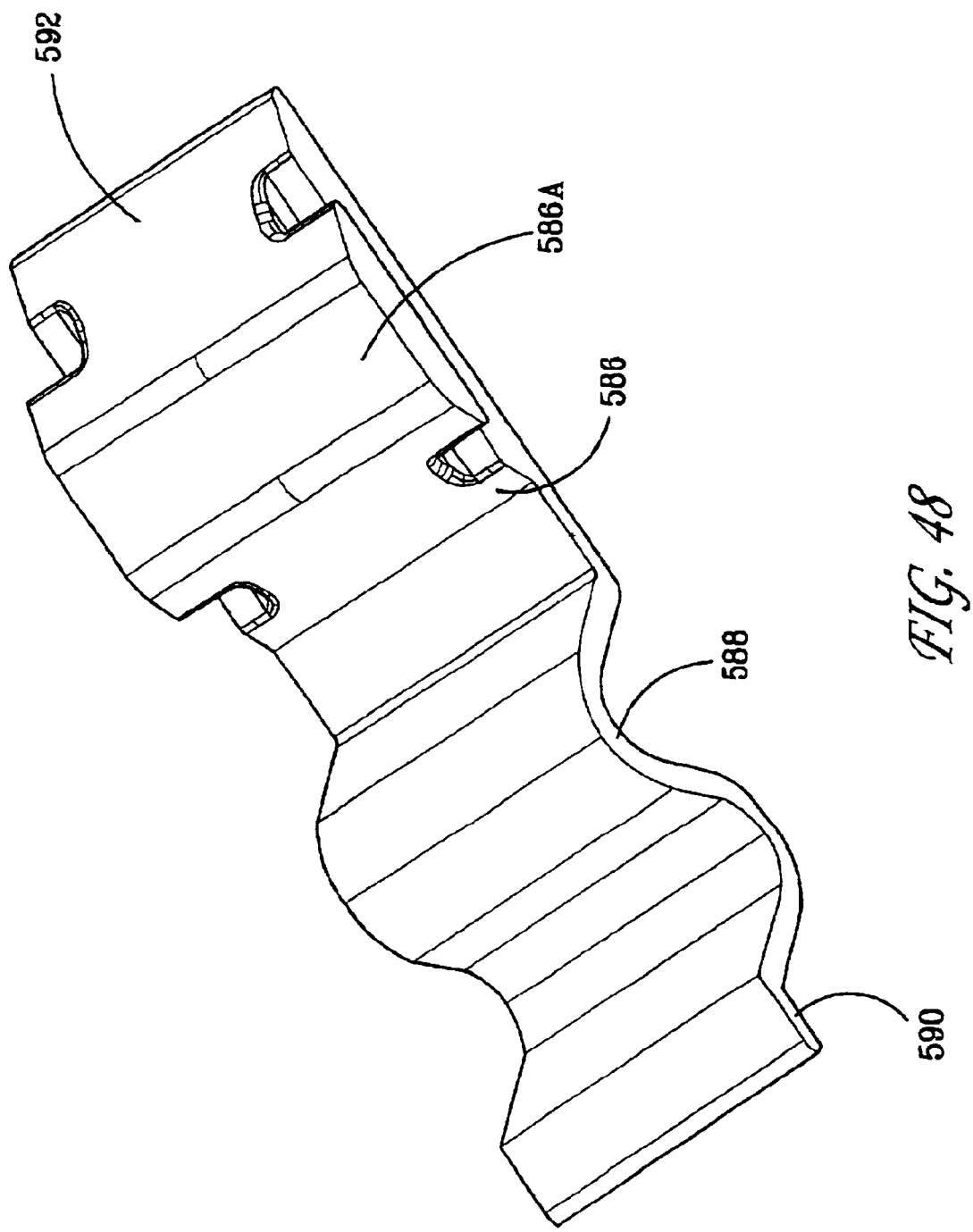
FIG. 48 is a bottom perspective view of the pawl member for a load floor latch according to the fifth embodiment of the present invention.
Figure 53:
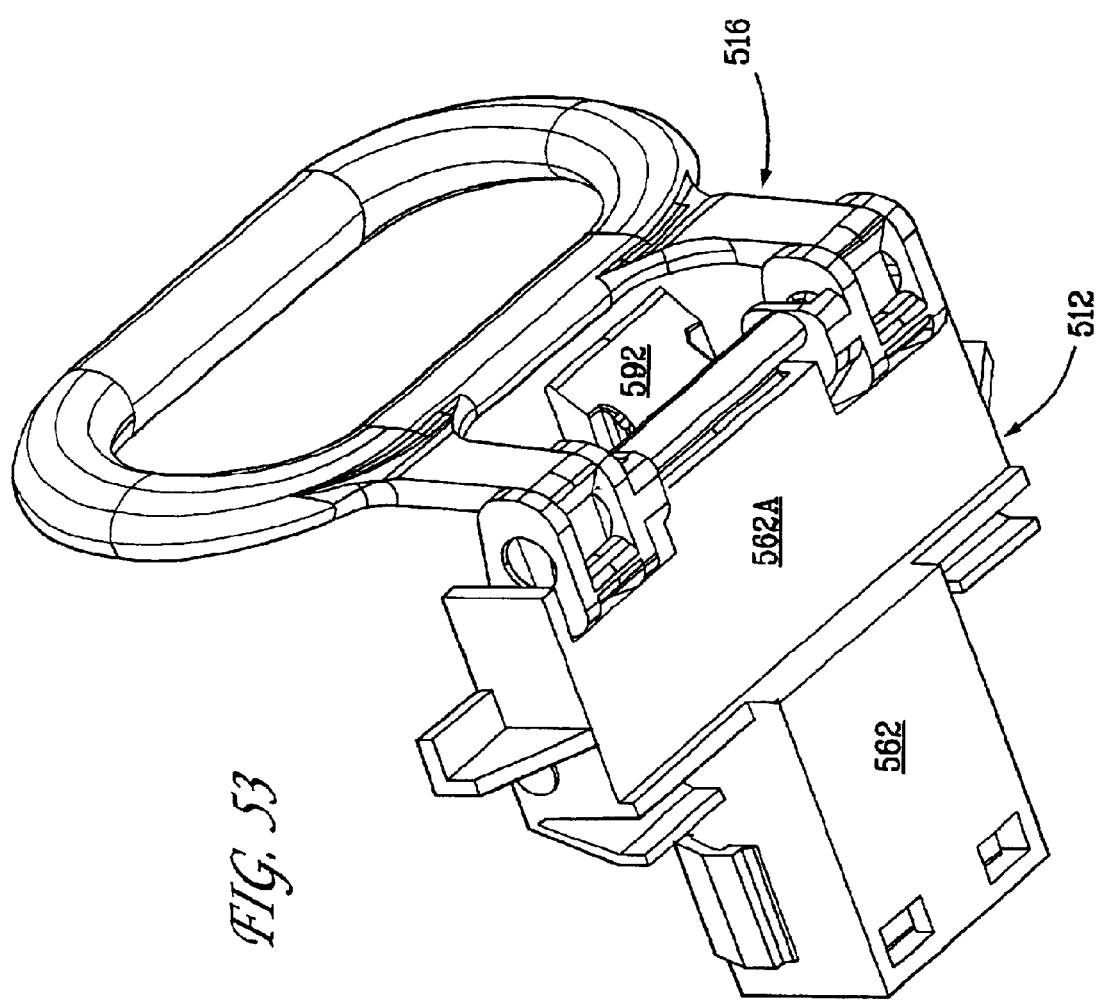
FIG. 53 is a bottom perspective view of the load floor latch according to the fifth embodiment of the present invention.
Figure 54:
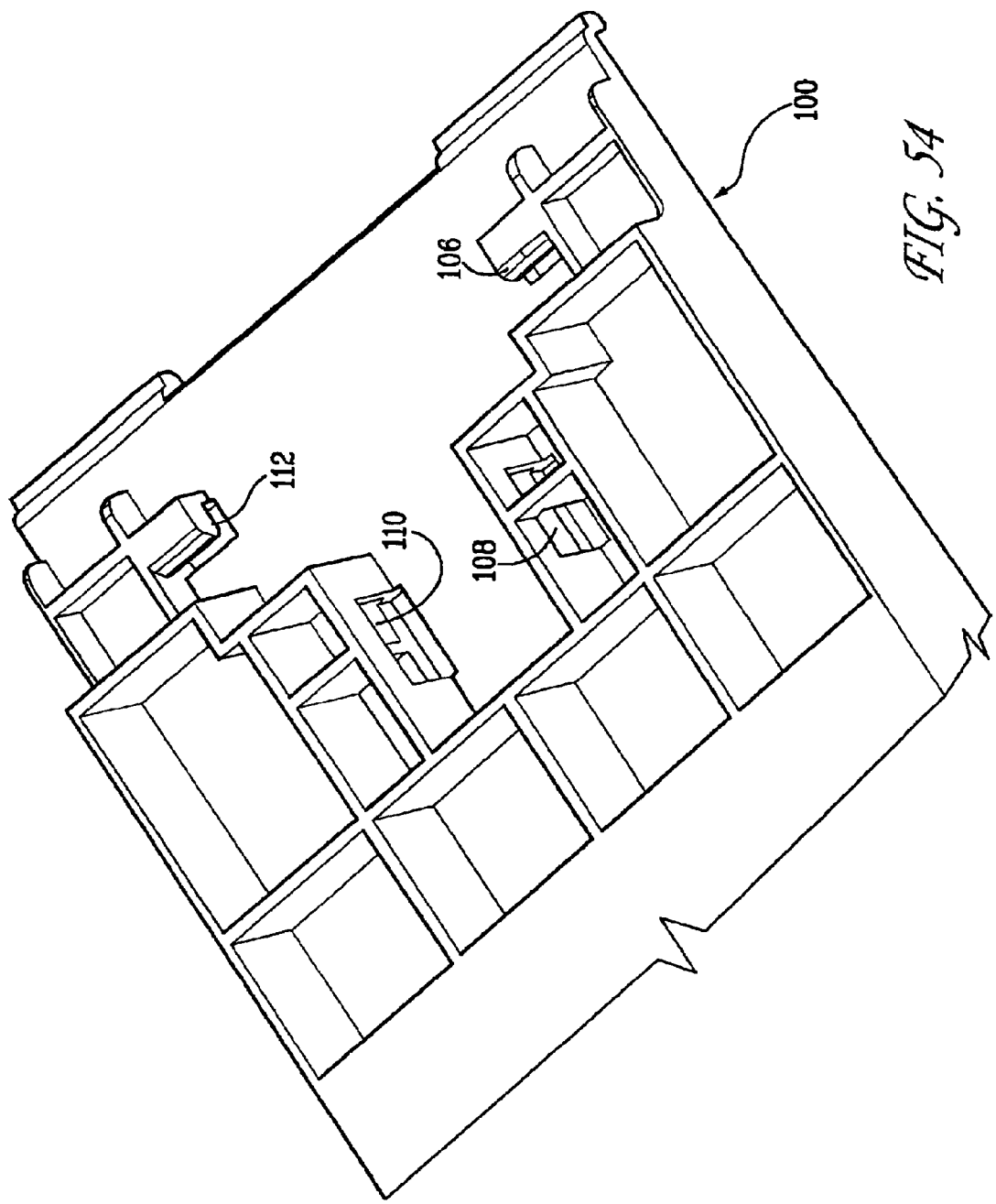
FIG. 54 is a bottom perspective view of the lid for a load floor latch according to the fifth embodiment of the present invention
Figure 55:
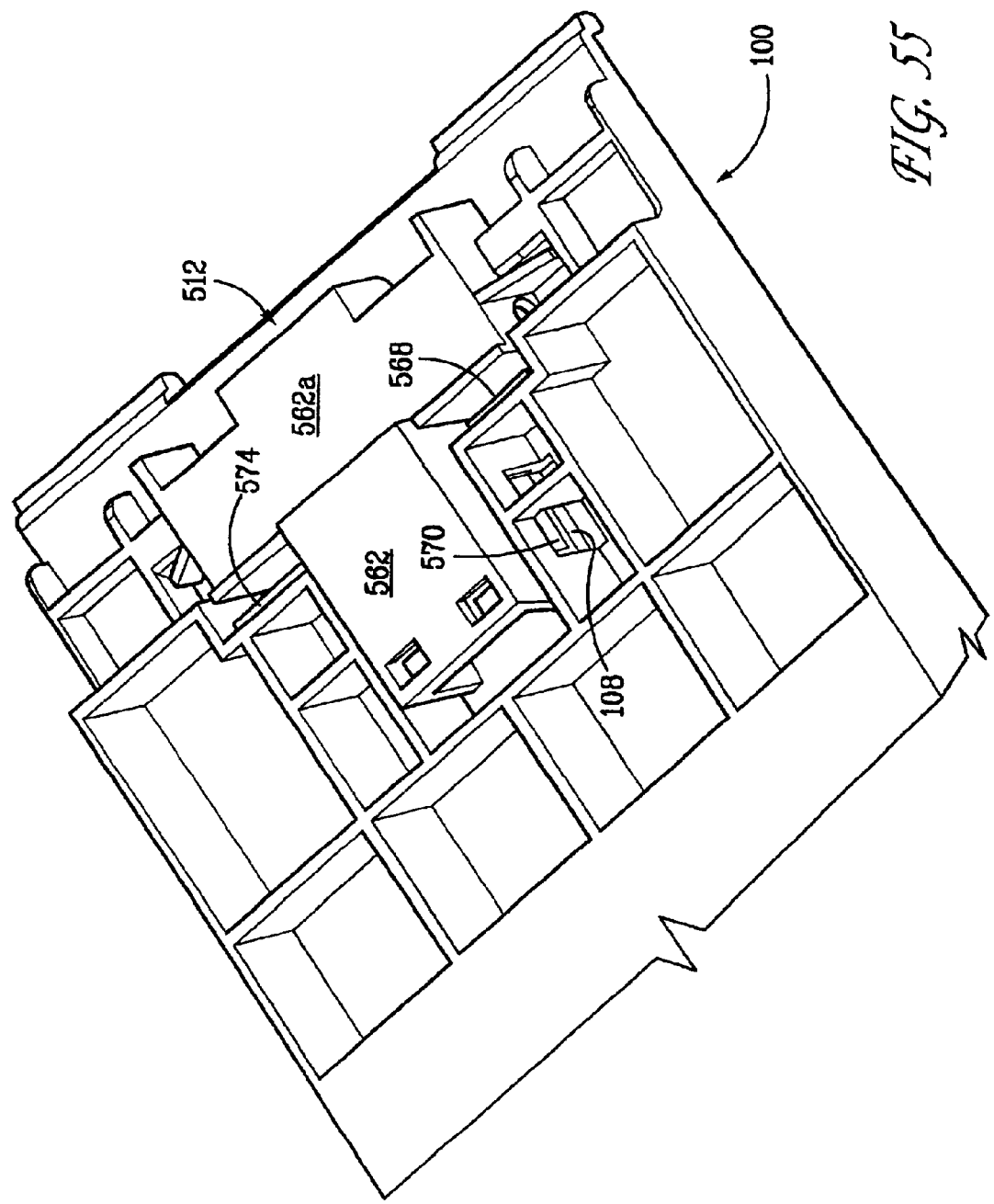
FIG. 55 is a bottom perspective view of the lid for a load floor latch according to the fifth embodiment of the present invention with the housing element of the latch attached.
Figure 56:
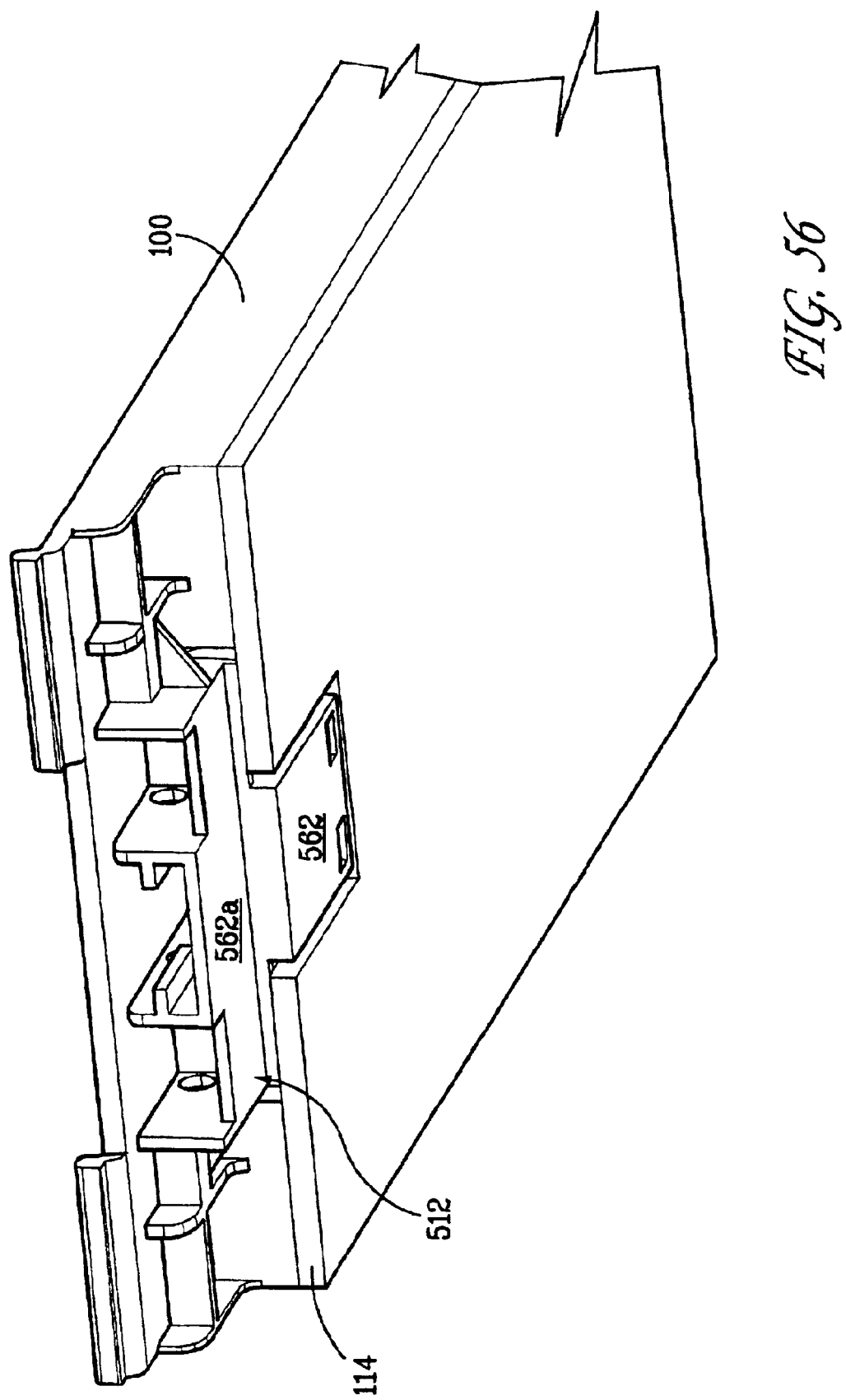
FIG. 56 is a front perspective view of the lid for a load floor latch, according to the fifth embodiment of the present invention with housing element of the latch and bottom lid cover attached.
Figure 57:
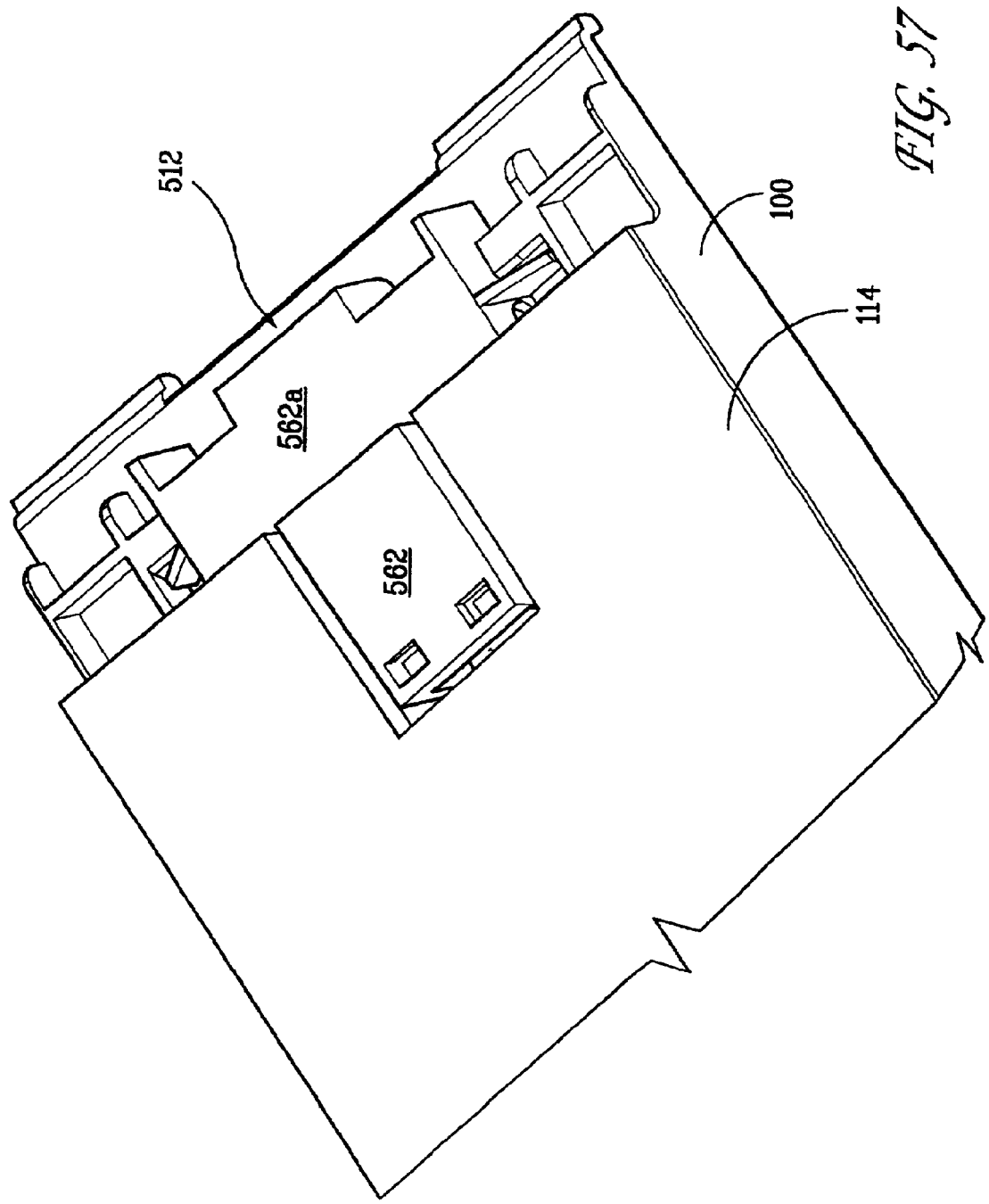
FIG. 57 is a bottom perspective view of the panel for a load floor latch, according to the fifth embodiment of the present invention with housing element of the latch and bottom lid cover attached.

The pawl member 514 is best illustrated in FIGS. 47 and 48. The pawl member 514 comprises a pawl body portion 586 integral at one end with a living spring 588 terminating with a pawl tail 590, and a slam action ramped element 592 on the opposite end. The living spring 588 flexes during opening and (slam action) closing of the latch 510 based on the displacement of the slam action ramped element 592 (described below). The pawl body portion 586 has an extended center area 588A which terminates on either end with sliding surfaces 594,596 which guide the movement of the pawl member 514 during (slam action) closing and opening of the latch 510. The pawl tail 590 fits into the pawl tail slot 584 located on the rear of the housing 512 to resist movement of the latch 510 when engaged.

The assembly of the latch is best illustrated in FIGS. 49 through 53. The latch 510 is assembled by inserting the L-shaped arms detent features 534,536,538,540 into the recesses 534A,536A,538A,540A located on the hoop legs element 542. Thereafter, the assembled actuation assembly is attached to the housing by the snap in shafts 546,548 located at the distal end of each section of the hoop legs element 542A,542B. The snap in shaft 546,548 flex inward as they slide along side walls 558,560 and the center walls 564,566 of the housing 512 into the recesses 546A,546B, 546A,548B. Once in place, the snap in shafts 546,548 are free to rotate in the recesses 546A,546B,548A,548B. The pawl member 514 slides onto the bottom side 562 and guide bottom 562A of the housing 512 by first putting the pawl tail 590 into the tail slot 584 in the housing 512 and sliding the living spring 588 until slam action element 592 contacts the shaft 544 of the actuator assembly 516, thereby maintaining the pawl member 514 in place by the tension of the living spring 588.

The attachment of the assembled housing 512 into the lid 500 is best illustrated in FIGS. 54 through 57. The assembled housing 512 snaps into the lid 500 by pushing the housing 512 into the lid 500 until the snap legs 568,570, 572,574 engage recesses 106,108,110,112 in the lid 100. When the housing 512 is attached to the lid 500, a bottom lid cover 114 is attached and is flush with the extended portion of the housing guide bottom 562A.

Another embodiment of the latch in accordance with the present invention is illustrated in FIGS. 58 through 76. The latch 610 in the present embodiment is similar in both structure and function to many of the features already described in detail with respect to the latch 10, and for this reason, only the differences in the latch 610 from the latch 10 will be described herein for the sake of brevity, Also, for ease of reference, portion in this embodiment similar to the latch 10 will describing using the same number designation except beginning with 610.

Figure 58:
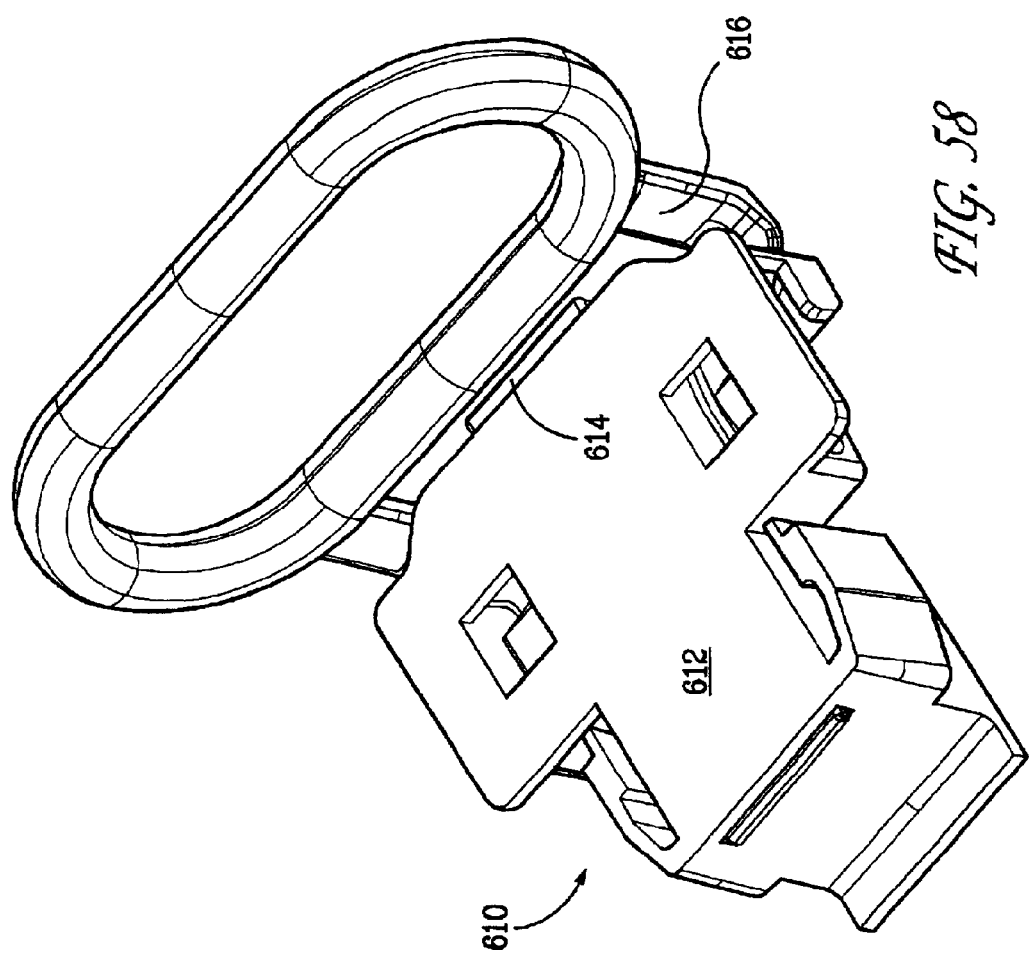
FIG. 58 is a top perspective view of a load floor latch according to the six embodiment of the present invention.
Figure 59:
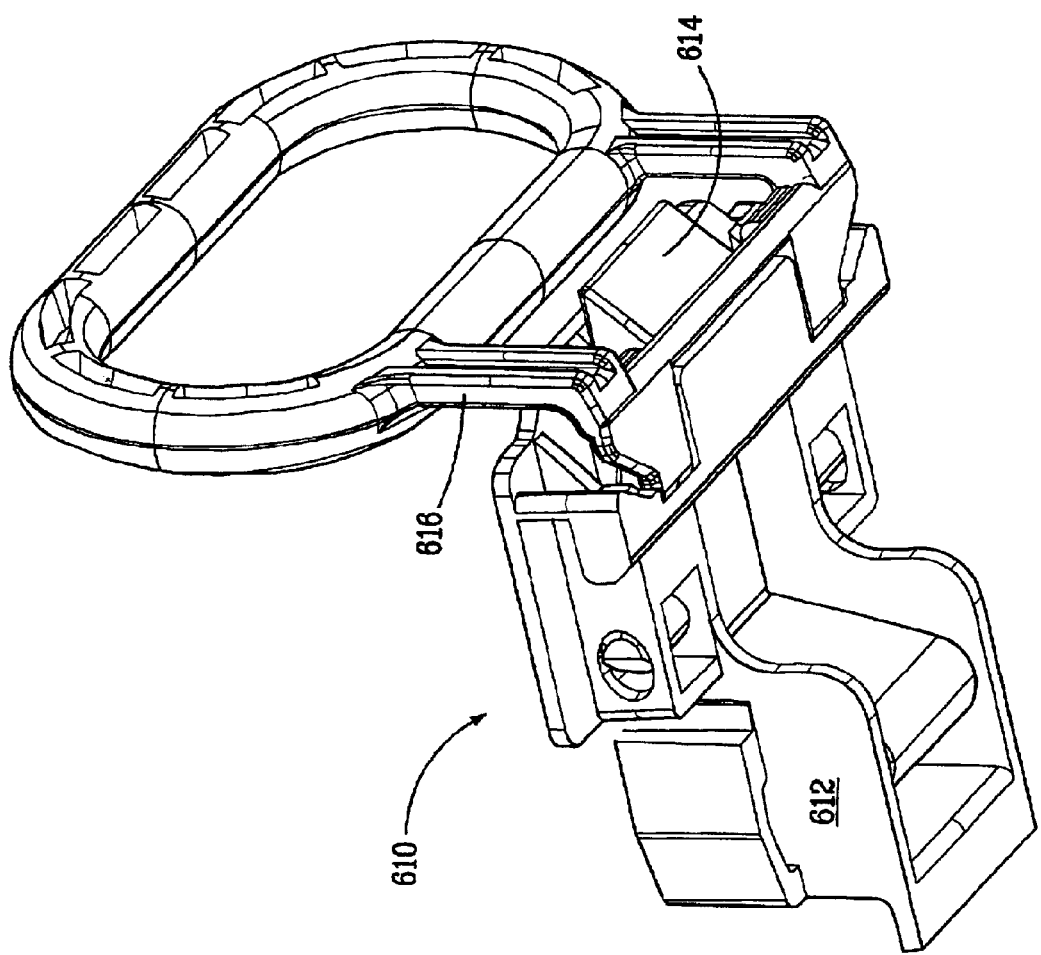
FIG. 59 is a side perspective view of a load floor latch according to the six embodiment of the present invention.
Figure 60:
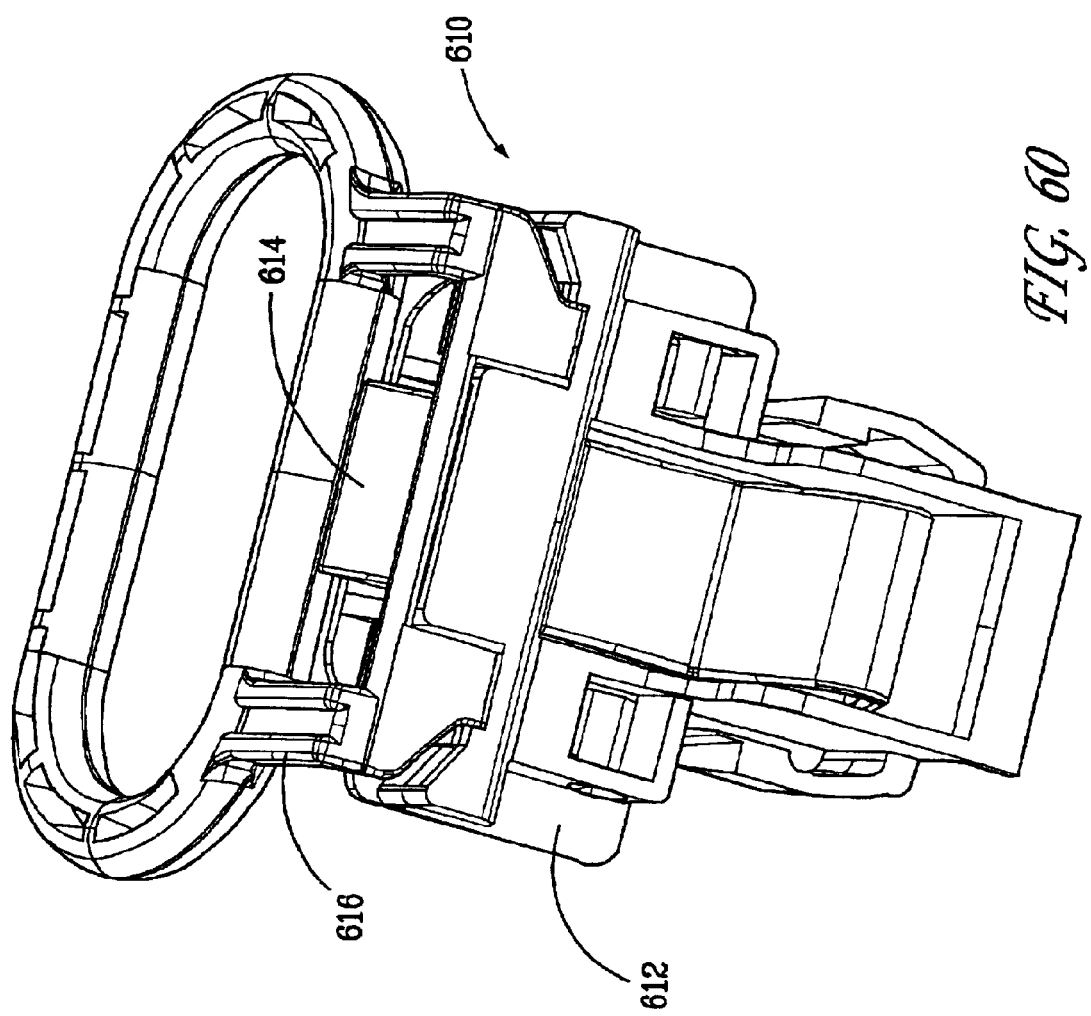
FIG. 60 is a bottom perspective view of the load floor latch according to the six embodiment of the present invention.
Figure 61:
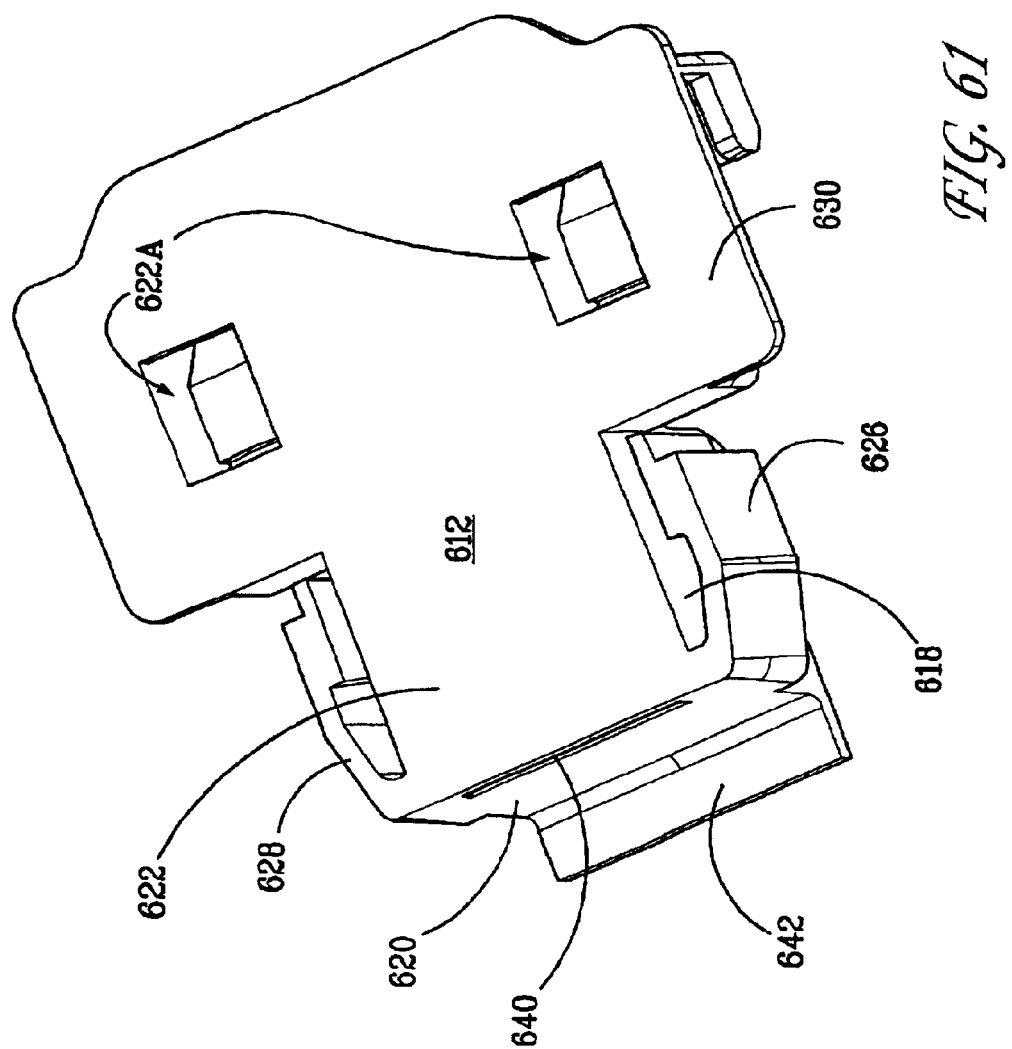
FIG. 61 is a top perspective view of a housing for a load floor Latch according to the six embodiment of the present invention.
Figure 62:
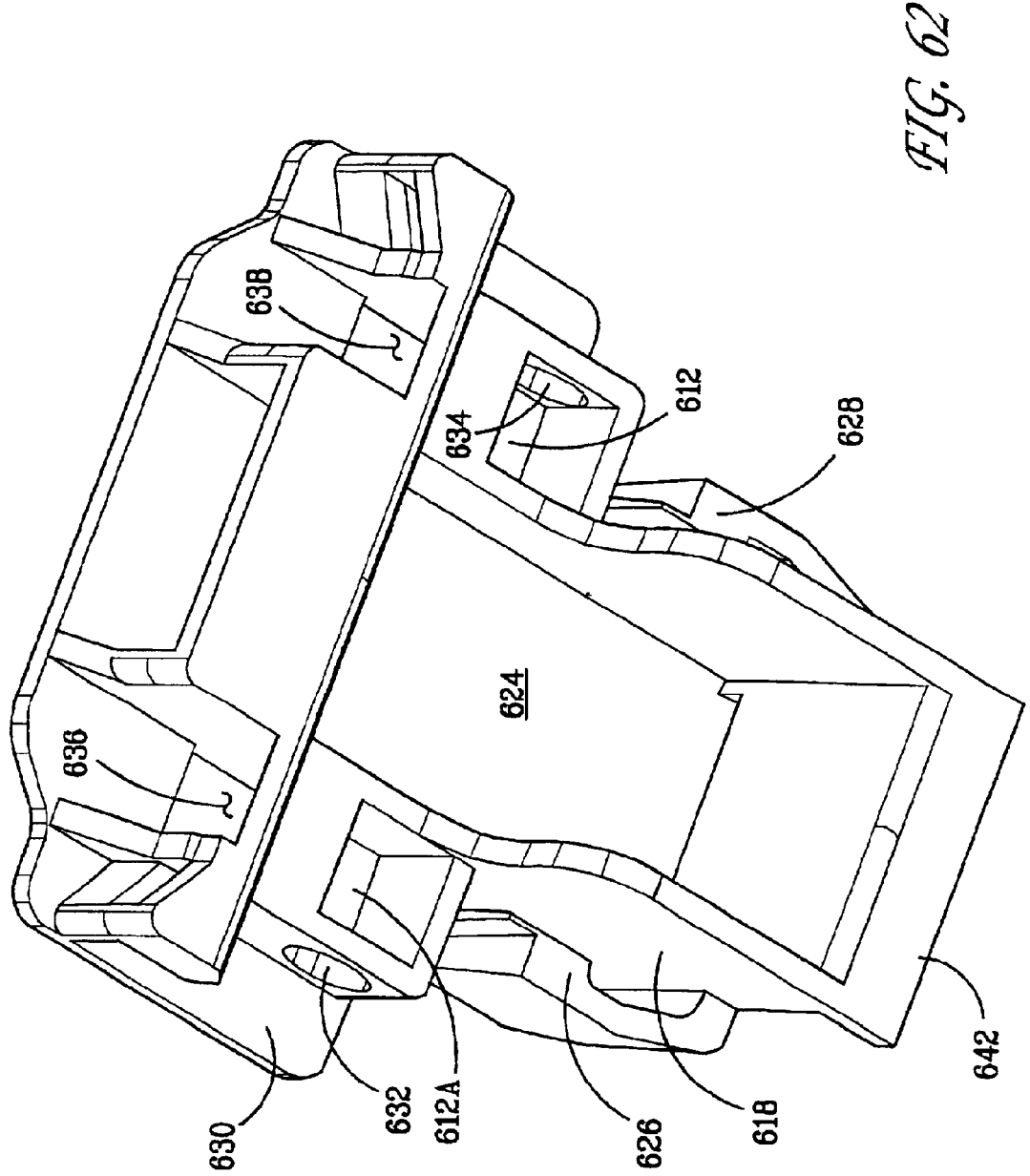
FIG. 62 is a bottom perspective view of a housing for a load floor latch. according to the six embodiment of the present invention.
Figure 63:
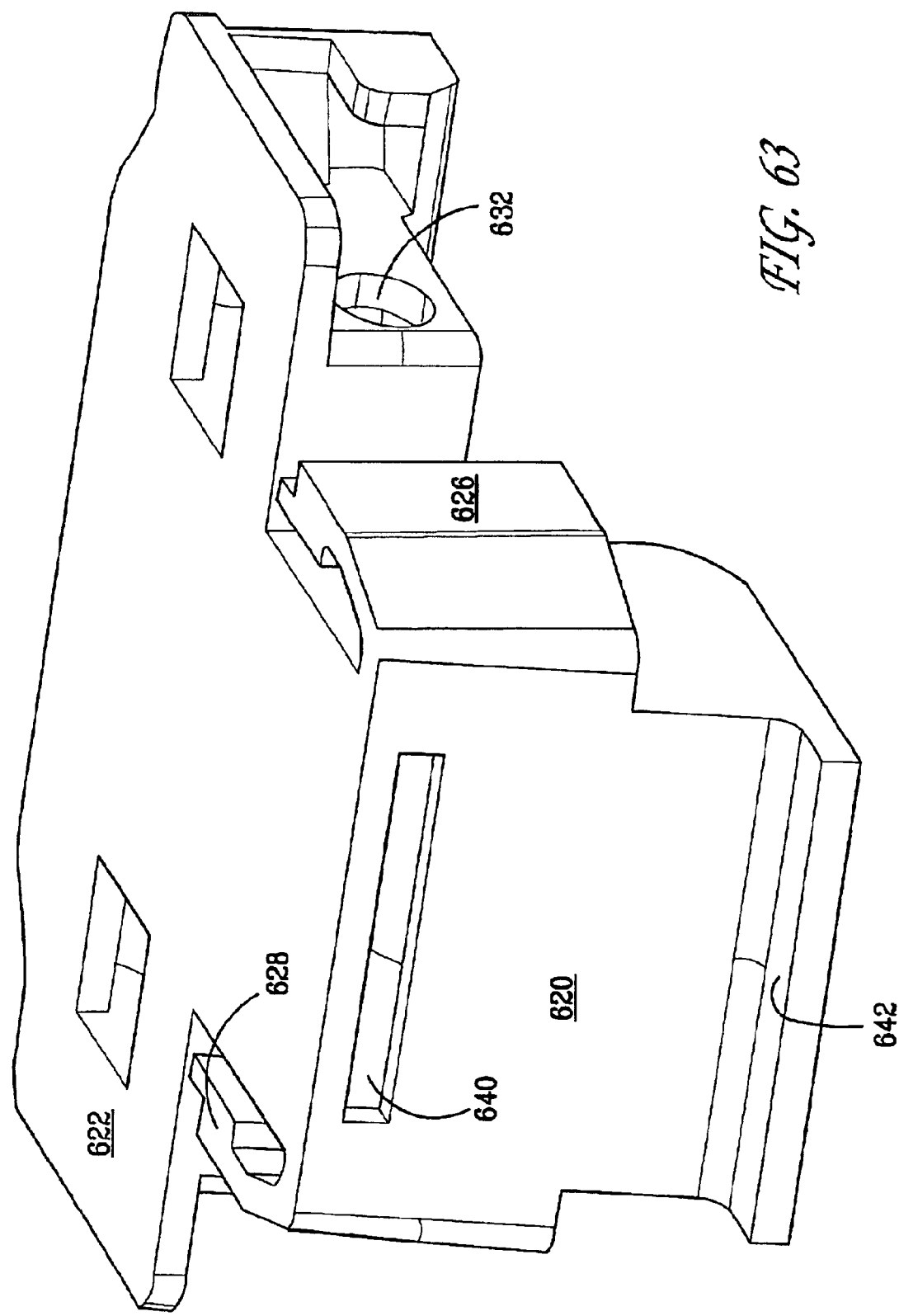
FIG. 63 is a rear perspective view of a housing for a load floor latch according to the six embodiment of the present invention
Figure 64:
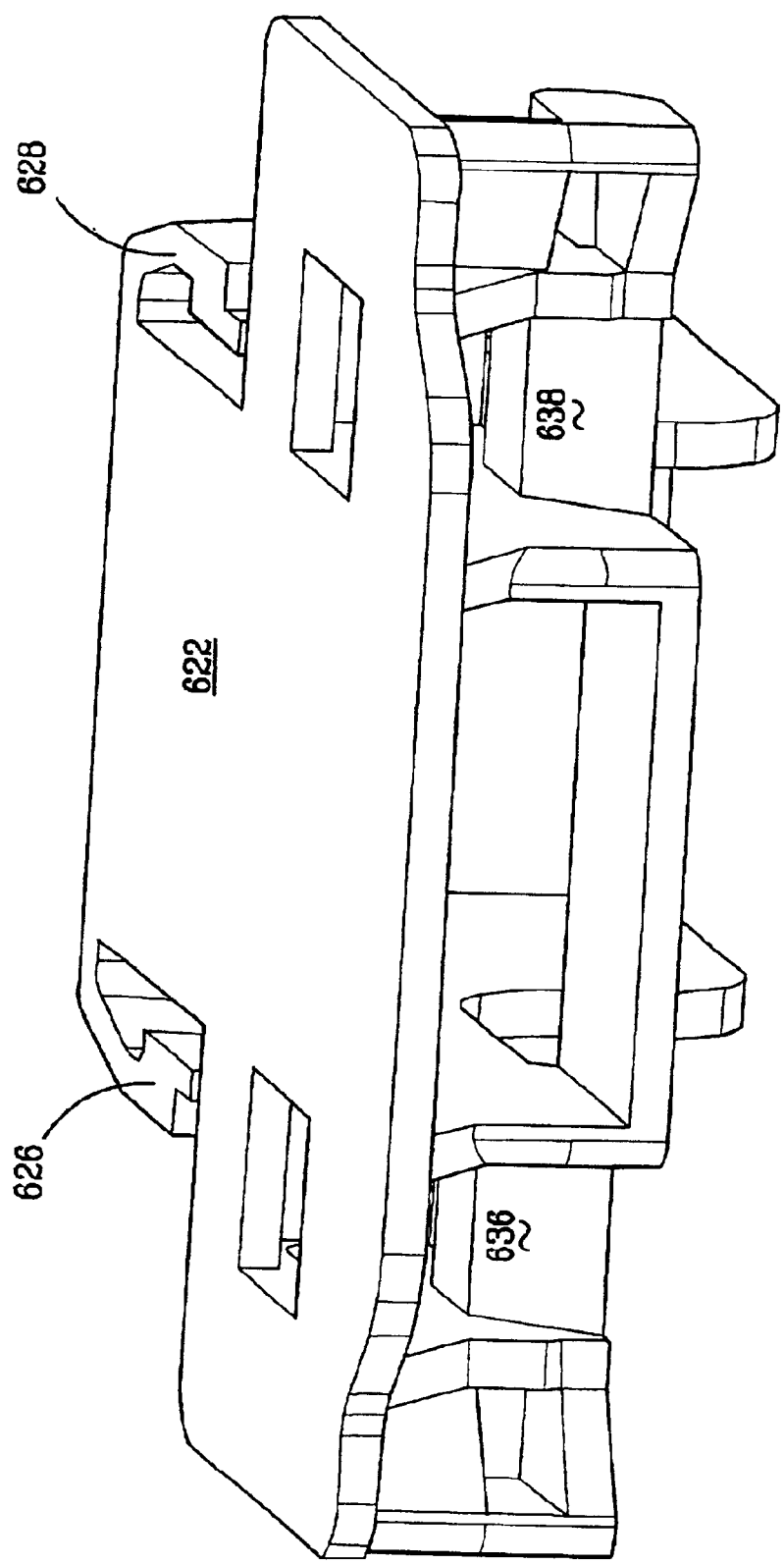
FIG. 64 is a front perspective view of a housing for a load floor latch according to the six embodiment of the present invention

Referring to FIGS. 58 through 60, the load floor latch 610 includes a housing 612, a pawl member 614, and a hoop actuation element 616.

The housing 12 is best illustrated in FIGS. 61 through 64. The housing 612 includes a side walls 618,618A a rear wall 620, a top portion 622 (shown having molding cores 622A), a bottom portion 624, a pair of snap legs 626 and 628 protruding outward from the side walls 618,618A, a roof 612A and an outwardly extending flange 630 around the top and sides of the housing 612. The sidewall 618 includes recess means 632,634 for rotation of the hoop actuation means 616 (described below). The housing's bottom portion 624 includes two slots 636,638 dimensioned and configured to receive the legs of the hoop actuation means (described below). The housing rear wall 620 has a pawl tail slot 640 for receiving the living spring of the pawl member 614 (described below). The housing tail 642 at the base of the rear wall 620 is used to secure the housing when attached to the lid (described below).

Figure 65:
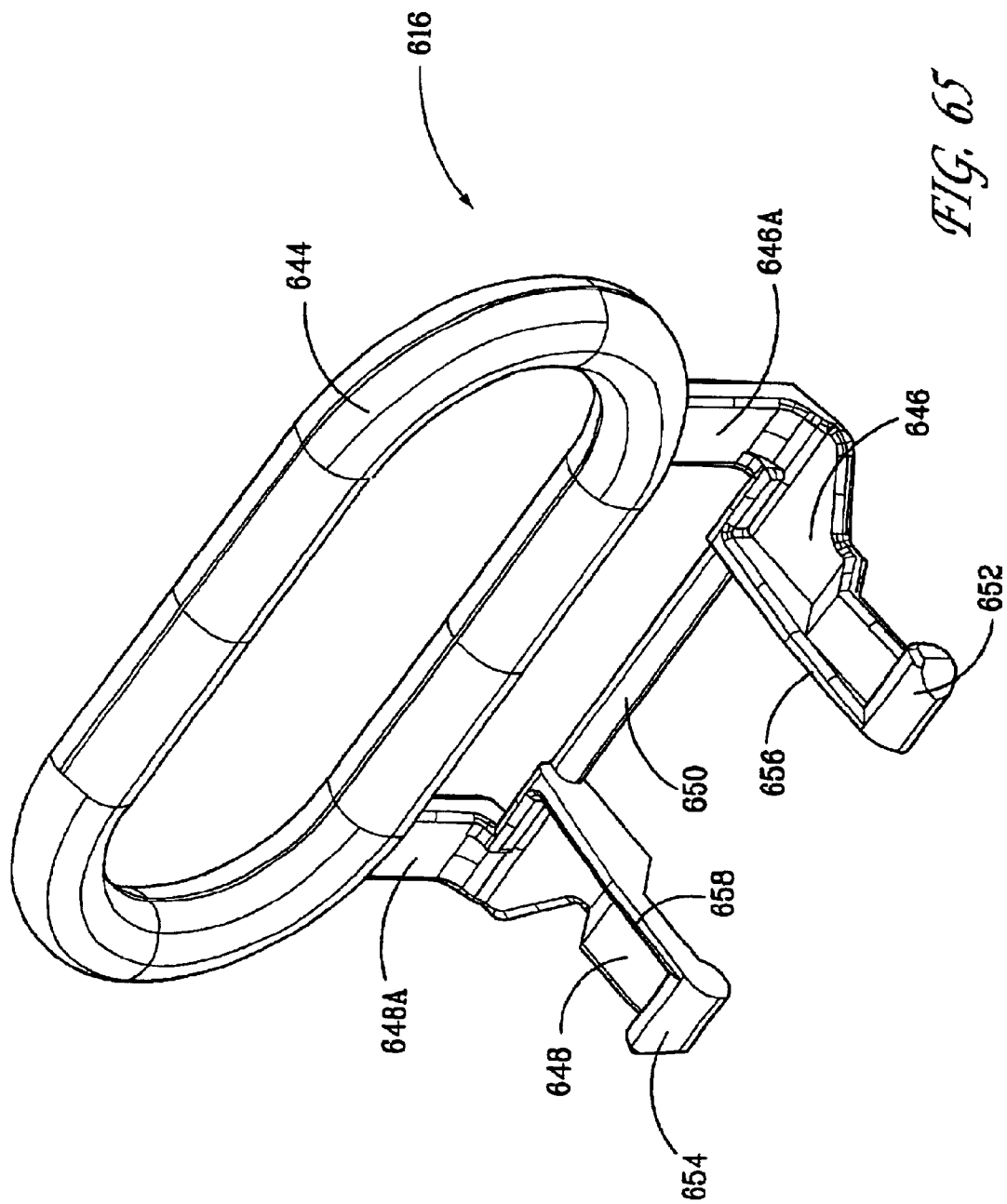
FIG. 65 is a top perspective view of the hoop actuation element for a load floor latch according to the six embodiment of the present invention.
Figure 66:
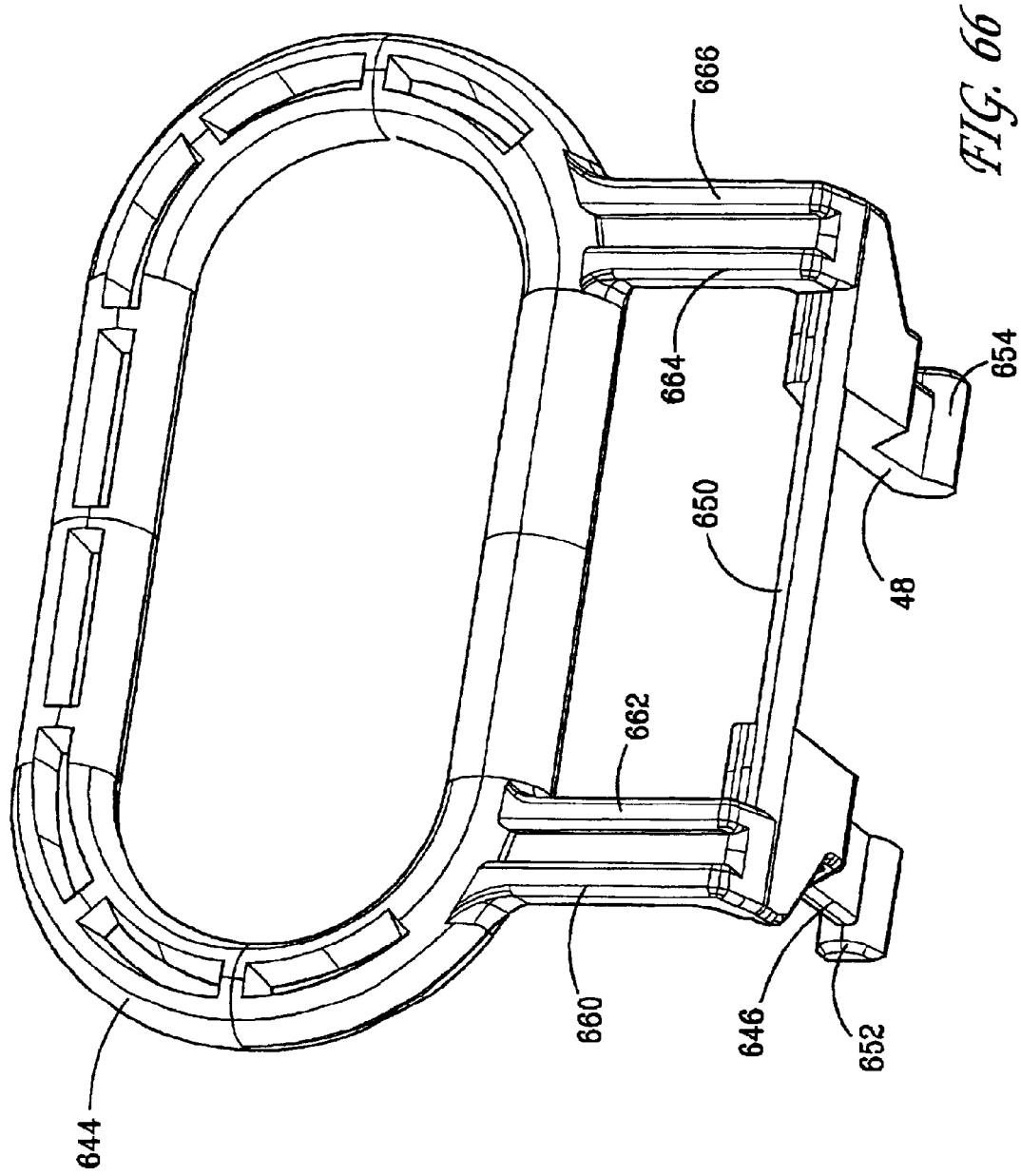
FIG. 66 is a front perspective view of the hoop actuation element for a load floor latch according to the six embodiment of the present invention.

The hoop actuation means is best illustrated in FIGS. 65 and 66. The hoop actuation means 616 is comprised of a hoop handle section 644 which is integral with a pair of legs 646,48 extending in a perpendicular direction from the hoop handle section 44, having vertical extensions 646A,648A to attach to the hoop handle section 644. The legs 646,48 are connected at one end by a shaft 650 which is in constant contact with the pawl member 614 (described below). The opposite end of each leg 646,648 has a perpendicular snap in shaft 652,654 which allows for rotational movement of the hoop actuation means 616 when inserted into the recesses 632,634 of the housing 612. Strength ribs 656,658 located on the topside of the legs are in contact with the housing roof 612A when the panel is lifted (described below). Strength ribs 660,662,664 and 666 located on the front side of the hoop handle 644 section of the hoop actuation means 616 support the hoop handle 644 during actuation.

Figure 67:
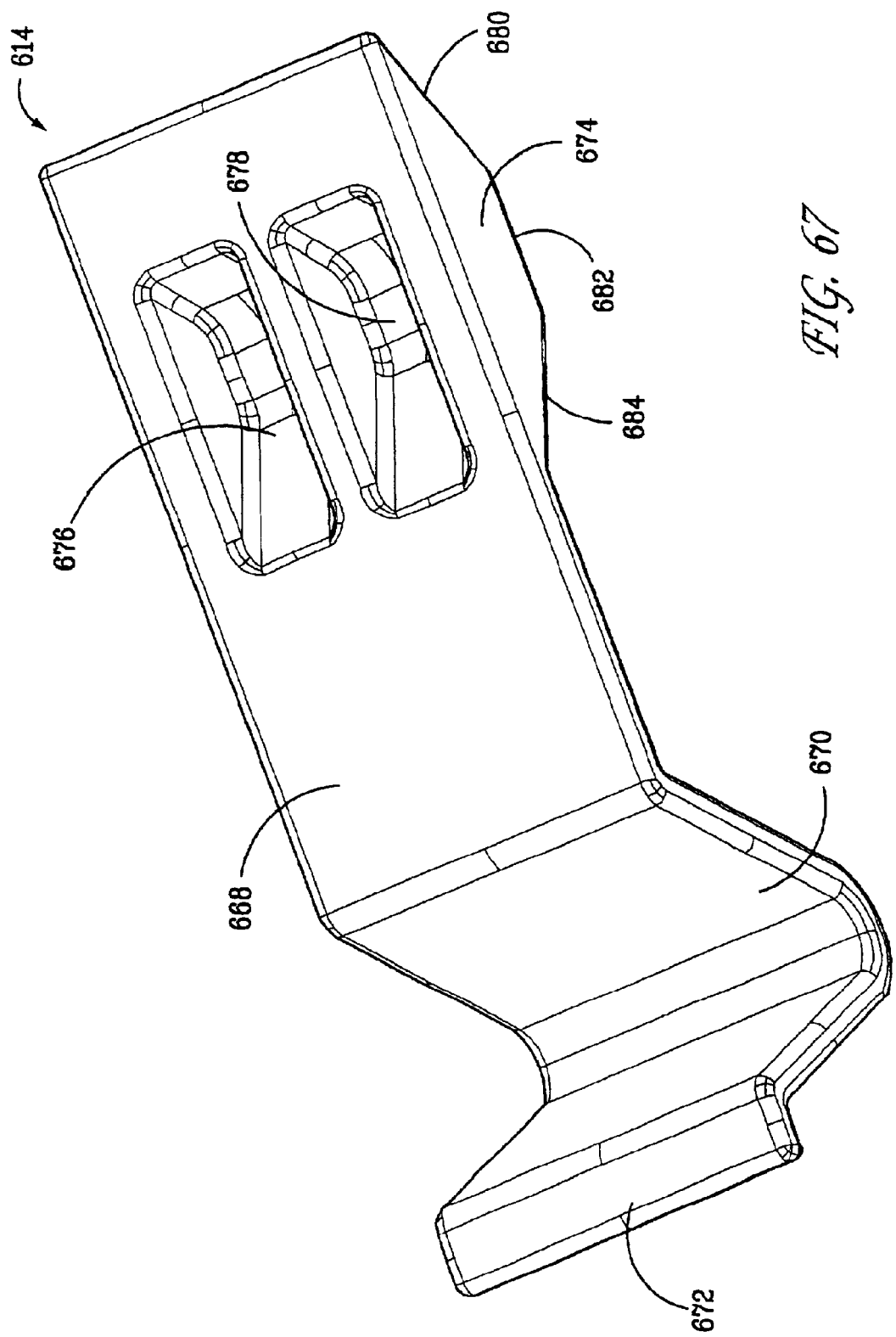
FIG. 67 is a top perspective view of the pawl member for a load floor latch according to the six embodiment of the present invention.
Figure 68:
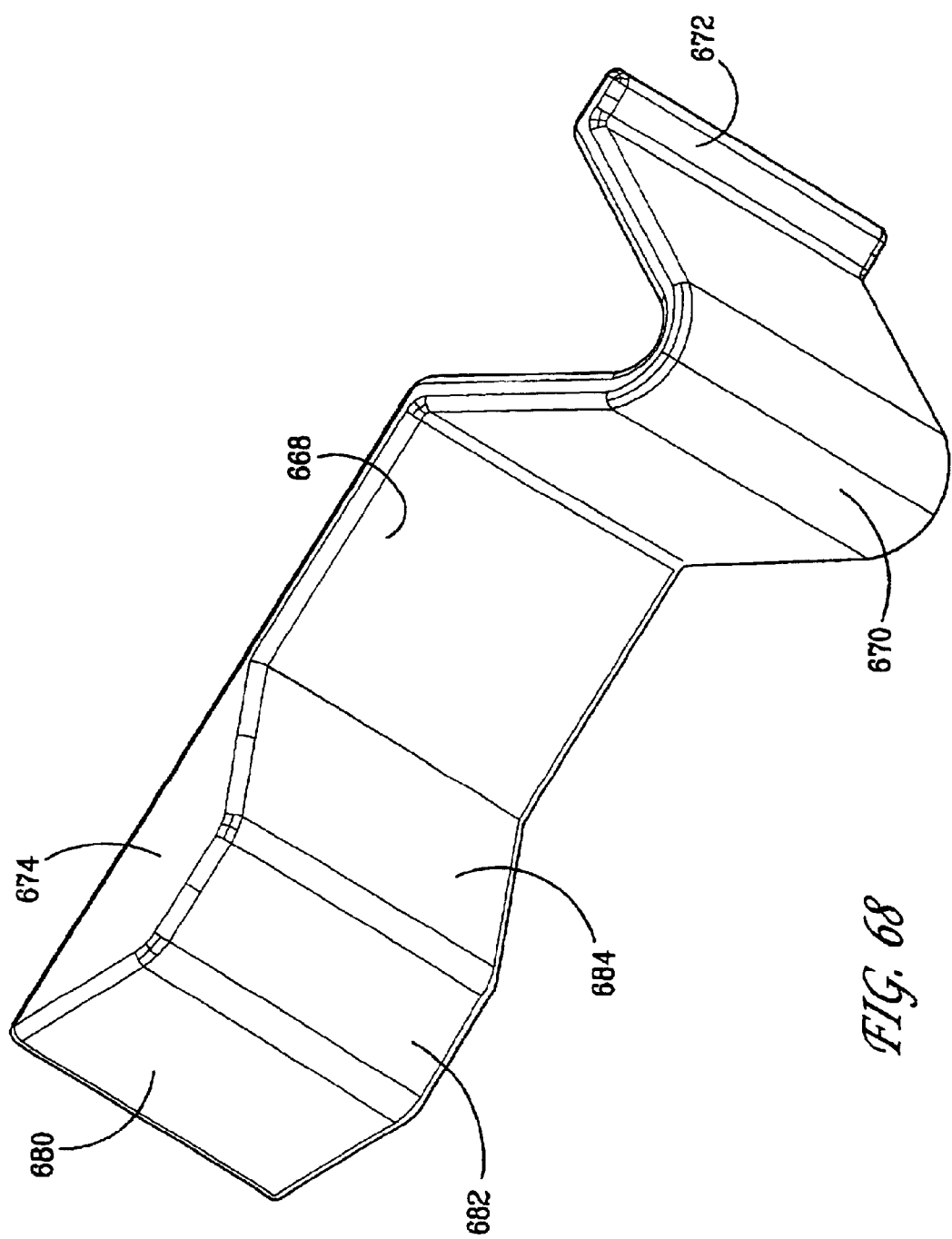
FIG. 68 is a bottom perspective view of the pawl member for a load floor latch according to the six embodiment of the present invention.

The pawl member 614 is best illustrated in FIGS. 67 and 68. The pawl member 614 comprises a pawl body portion 668 integral with a living spring 670 terminating with a pawl tail 672 at one end and a pawl slam action element 674 on the opposite end. The pawl body portion 668 is shown having molding cores 676,678 above the slam action element 674. The pawl tail 672 fits into the housing tail slot 640 located on the back wall 620 of the housing 612 to resist movement of the latch 610 when engaged. The slam action element 674 is frustoconical and inverted in reference to the horizontal plane of the pawl body portion 668 and comprises a front diagonal slam action side 680, a horizontal midsection 682 and the second diagonal side 684.

Figure 69:
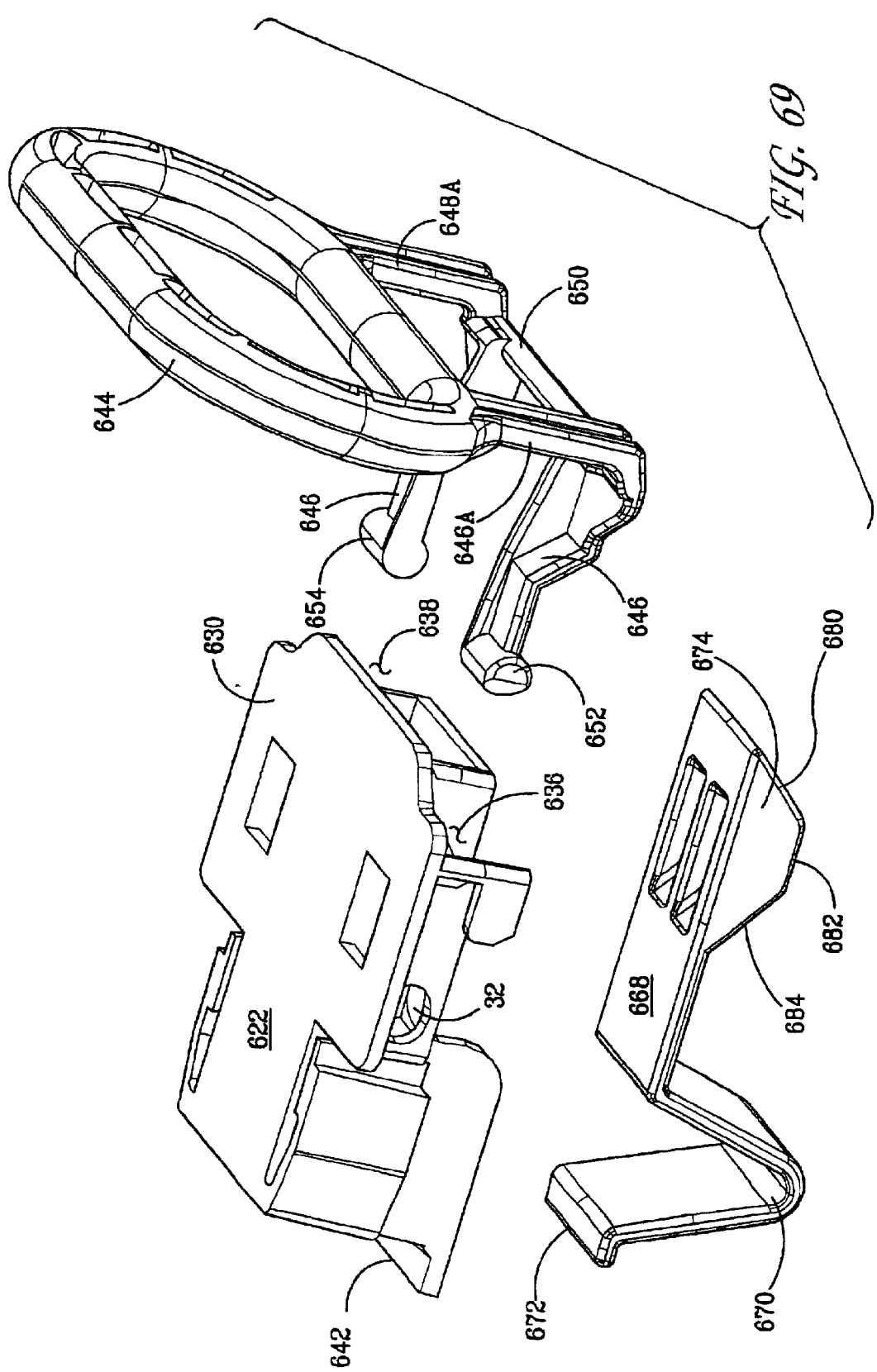
FIG. 69 is an exploded perspective view of a load floor latch according to the six embodiment of the present invention.
Figure 70:
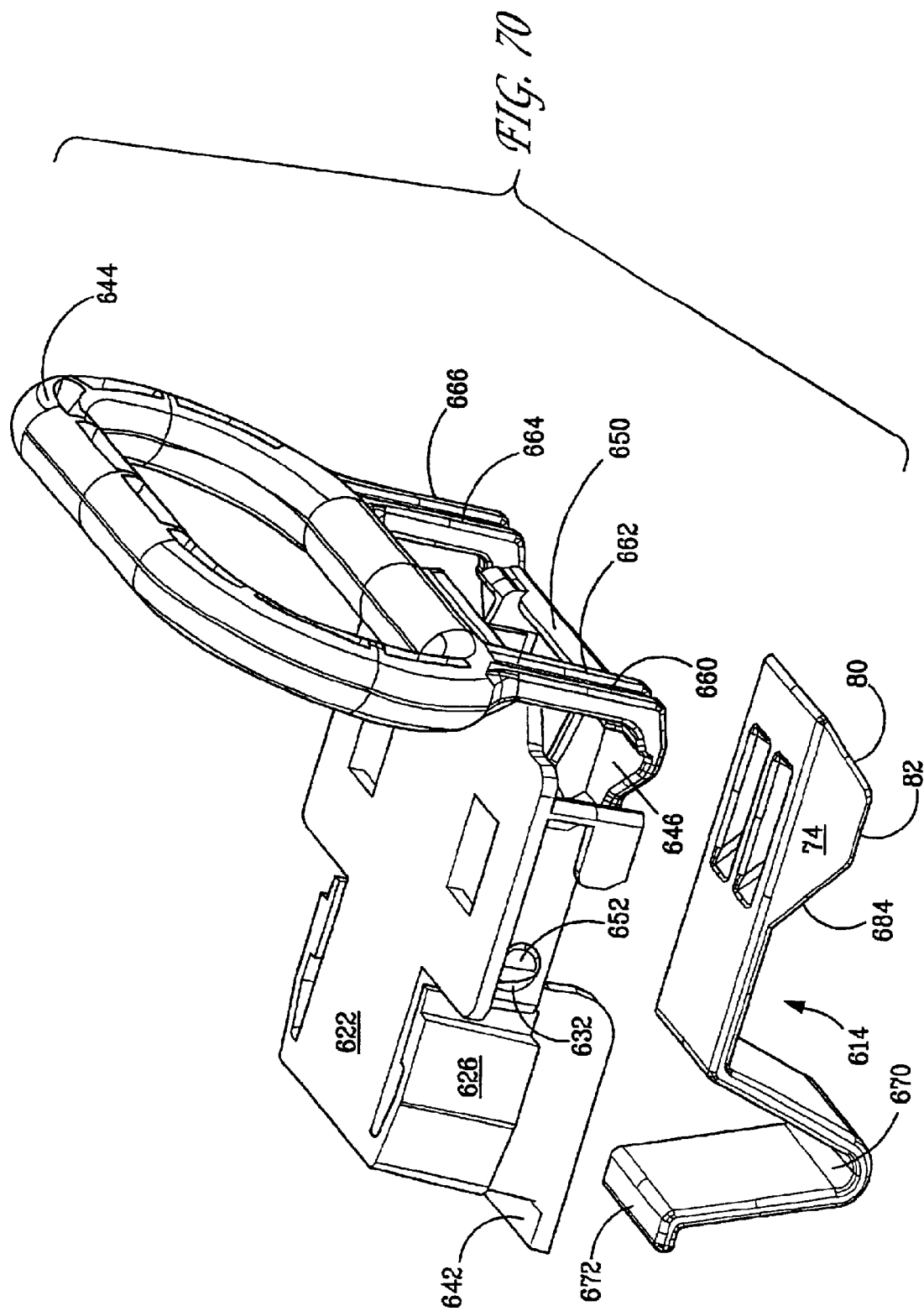
FIG. 70 is a partially exploded perspective view of a load floor latch according to the six embodiment of the present invention, illustrating the assembled relationship of the housing and hoop actuation element prior to attachment of the pawl member.
Figure 71:
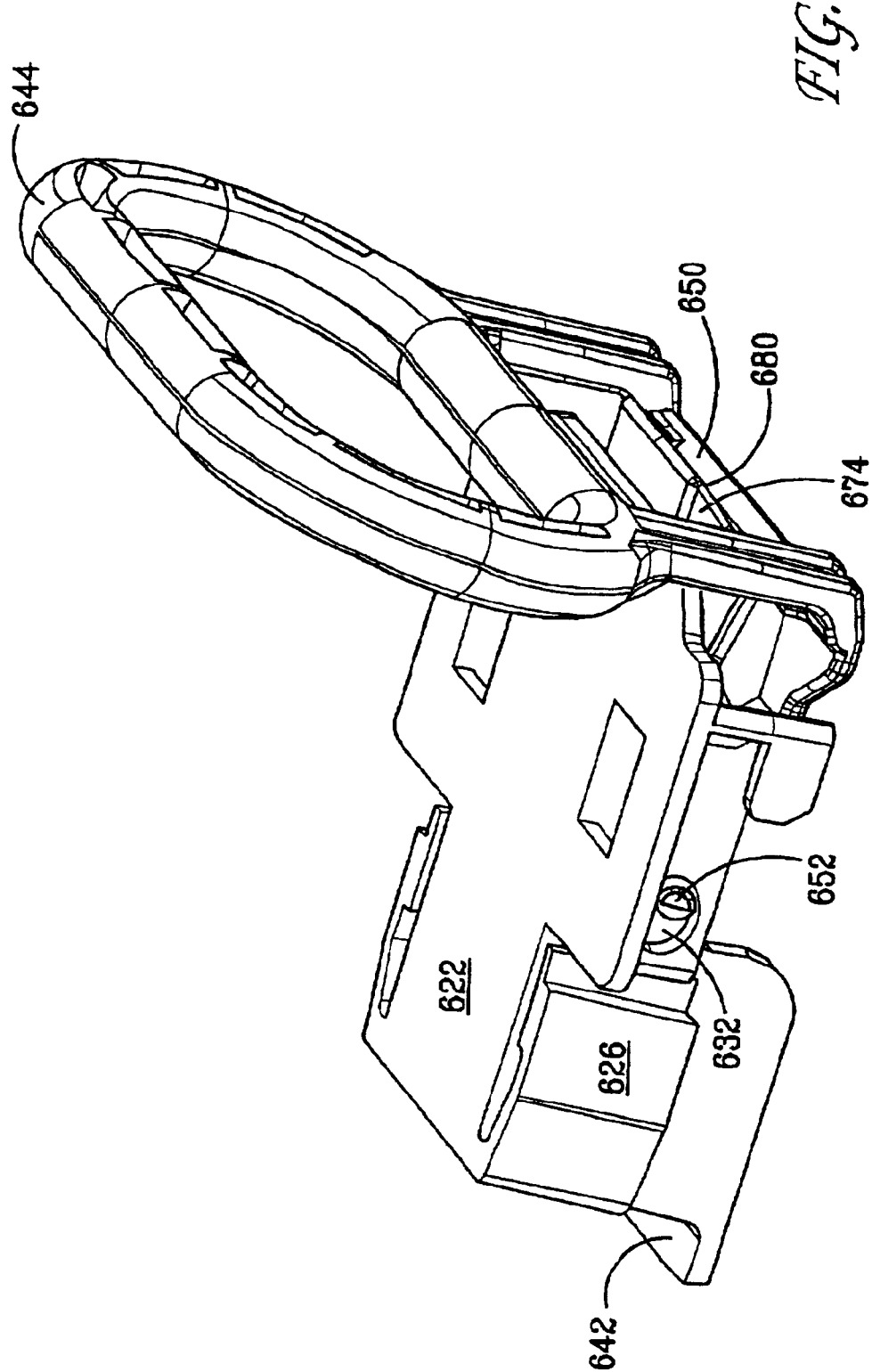
FIG. 71 is a perspective view of a load floor latch according to the six embodiment of the present invention, illustrating the assembled relationship of the housing, hoop actuation element and pawl member.
Figure 72:
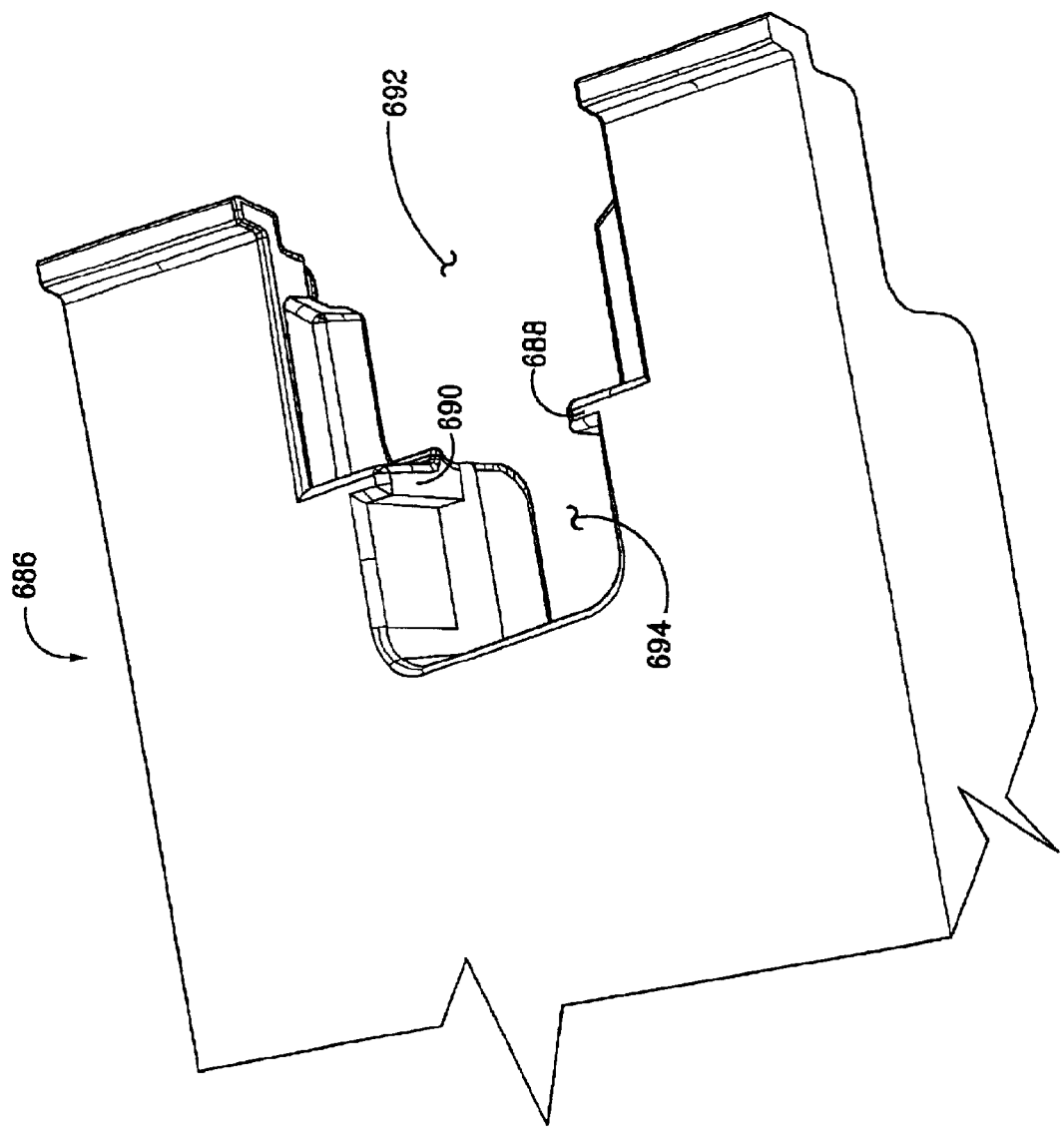
FIG. 72 is a top perspective view of the panel for a load floor latch according to the six embodiment of the present invention
Figure 73:
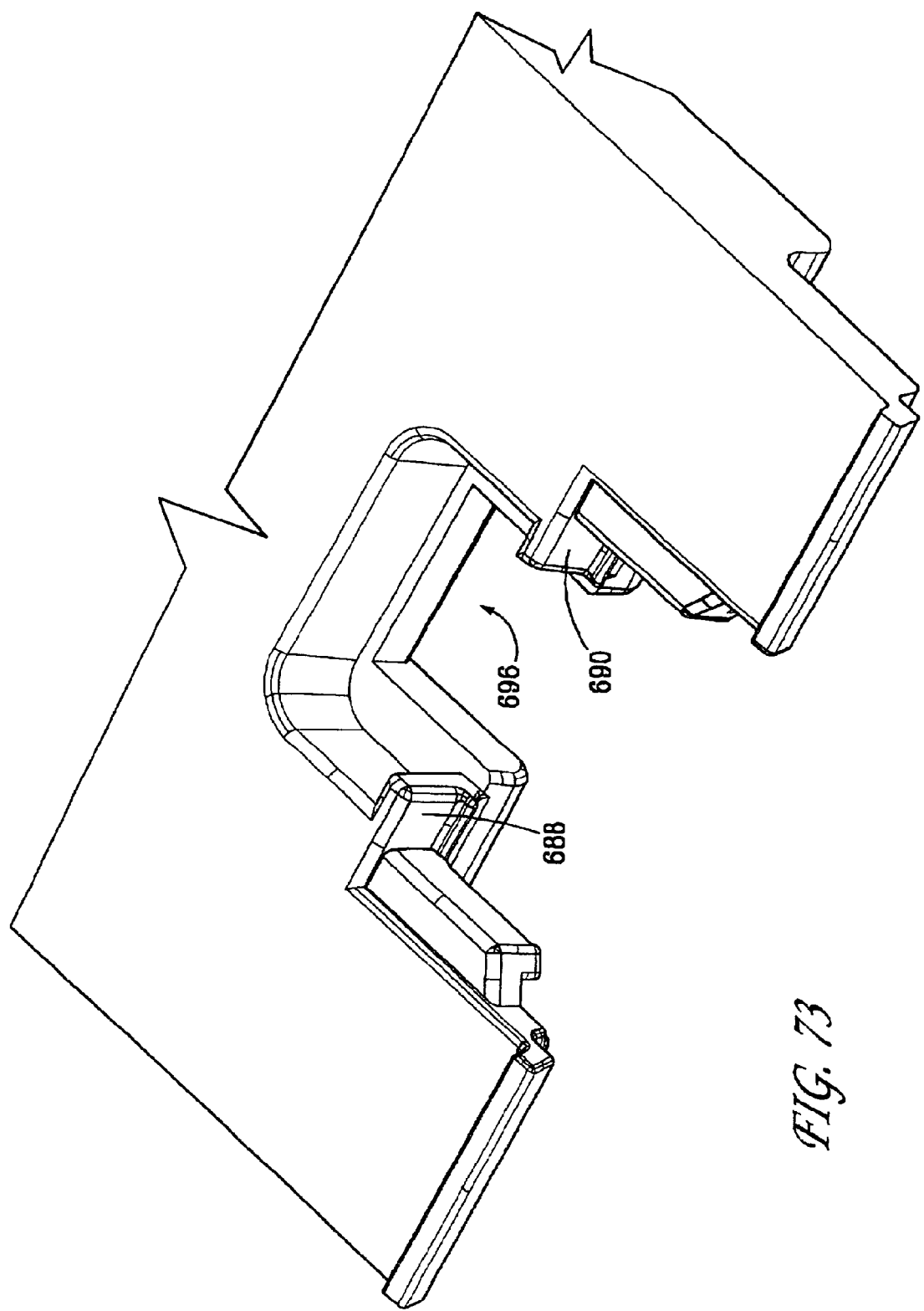
FIG. 73 is a front perspective view of the panel for a load floor latch according to the six embodiment of the present invention
Figure 74:
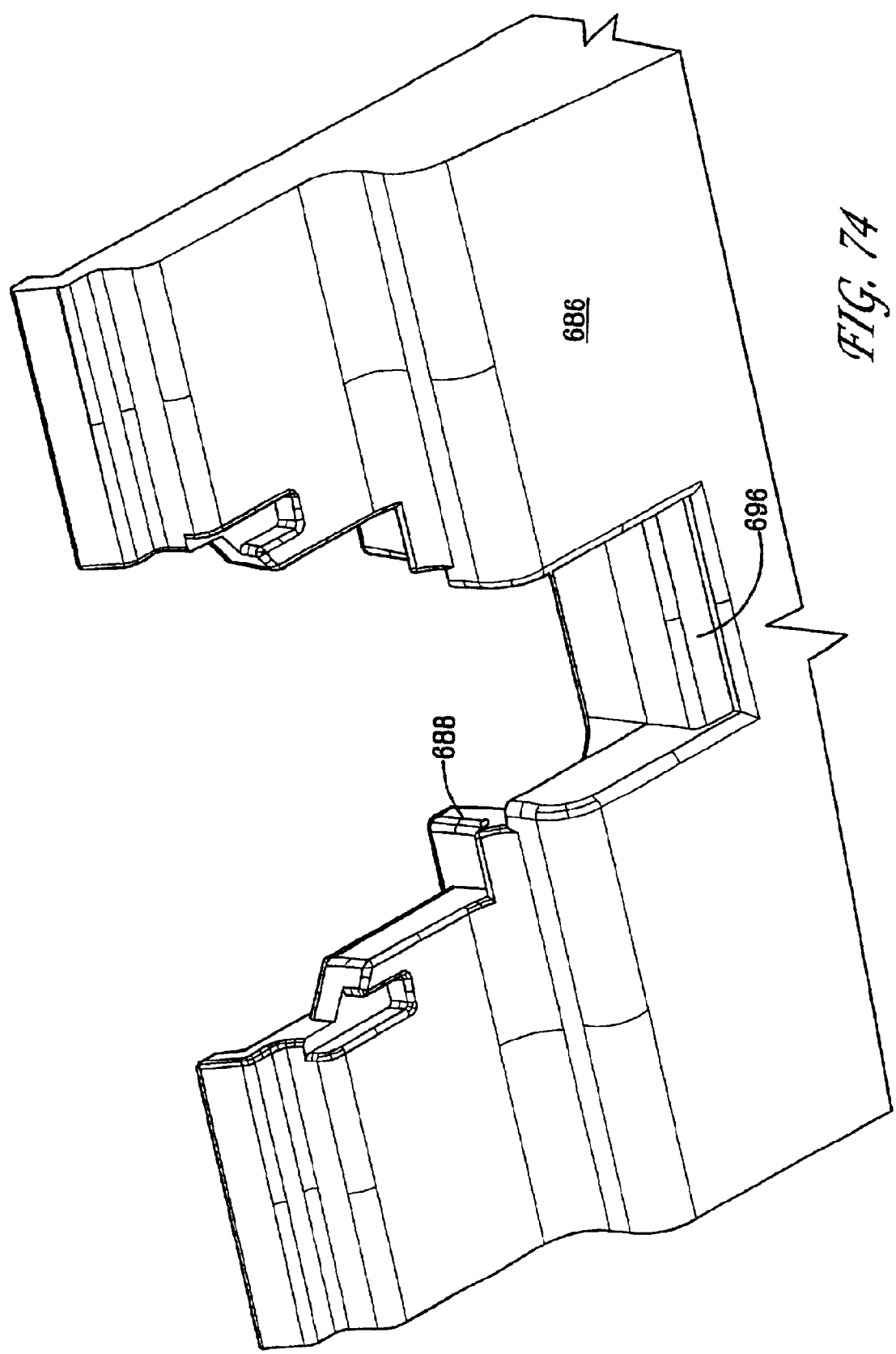
FIG. 74 is a bottom perspective view of the panel for a load floor latch, according to the six embodiment of the present invention.
Figure 75:
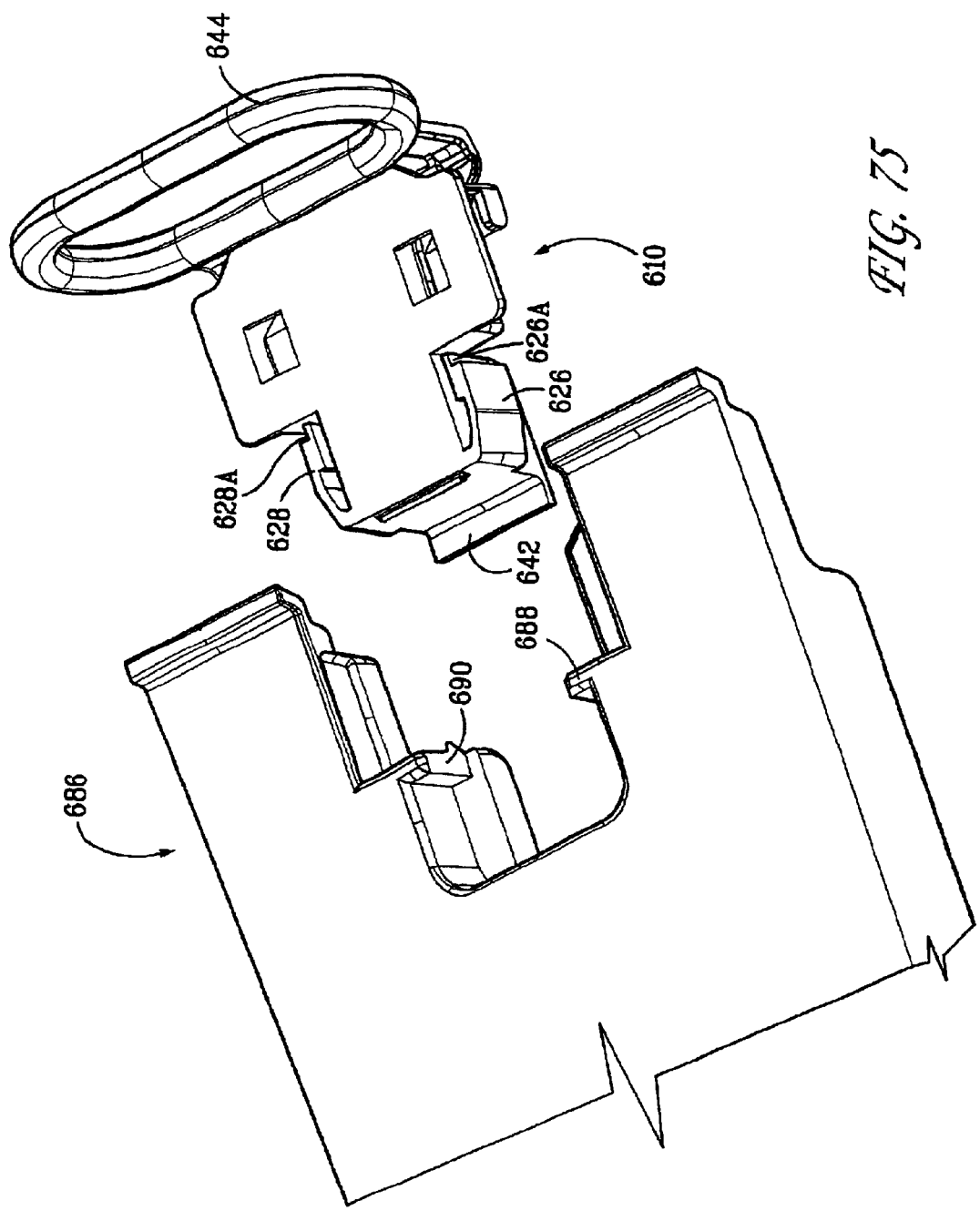
FIG. 75 is a perspective view of a load floor latch according to the six embodiment of the present invention, illustrating the assembled relationship of the assembled latch prior to attachment to the panel member.
Figure 76:
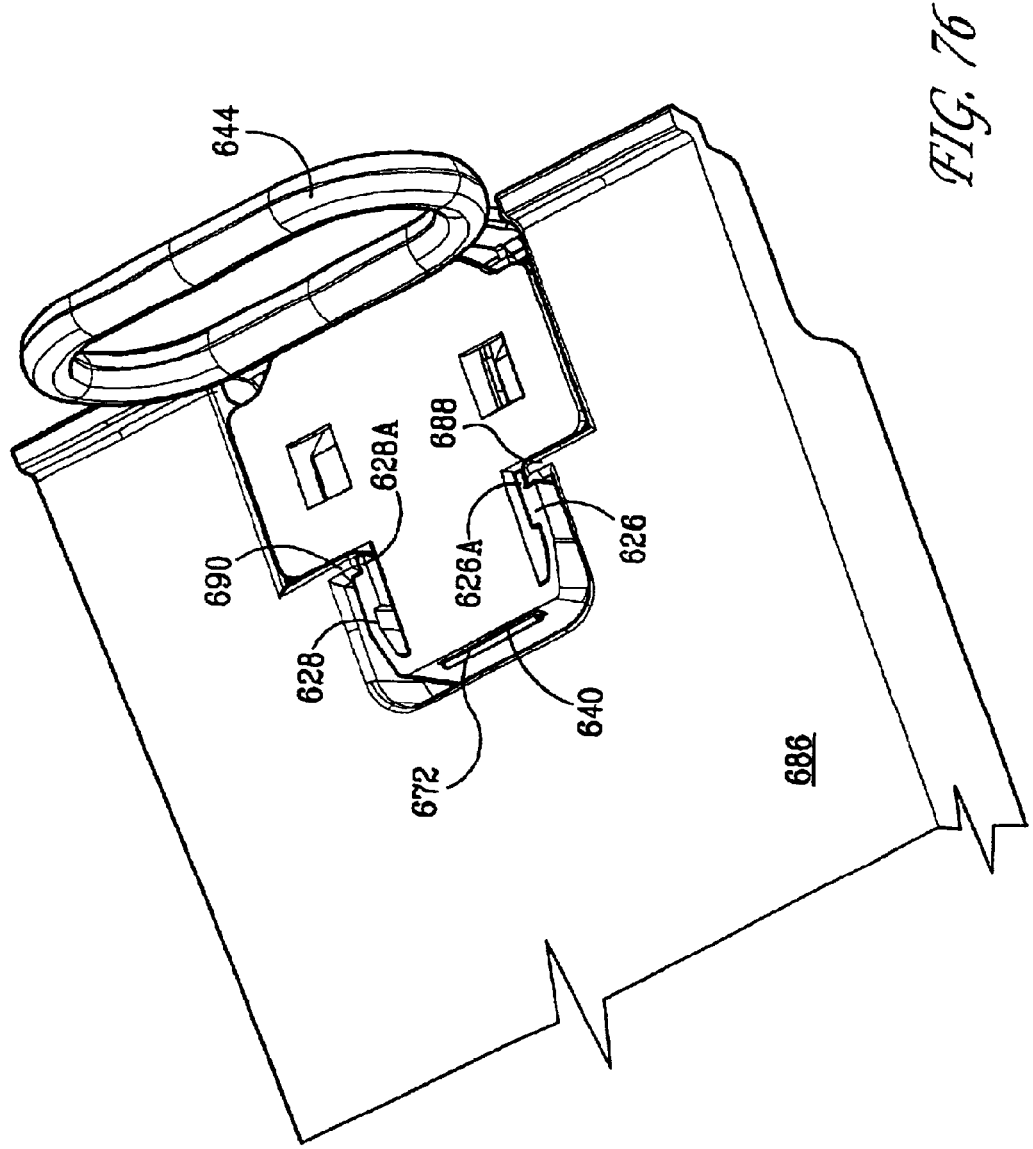
FIG. 76 is a perspective view of a load floor latch according to the six embodiment of the present invention, illustrating the assembled relationship of the assembled latch after attachment to the panel member.
Figure 77:
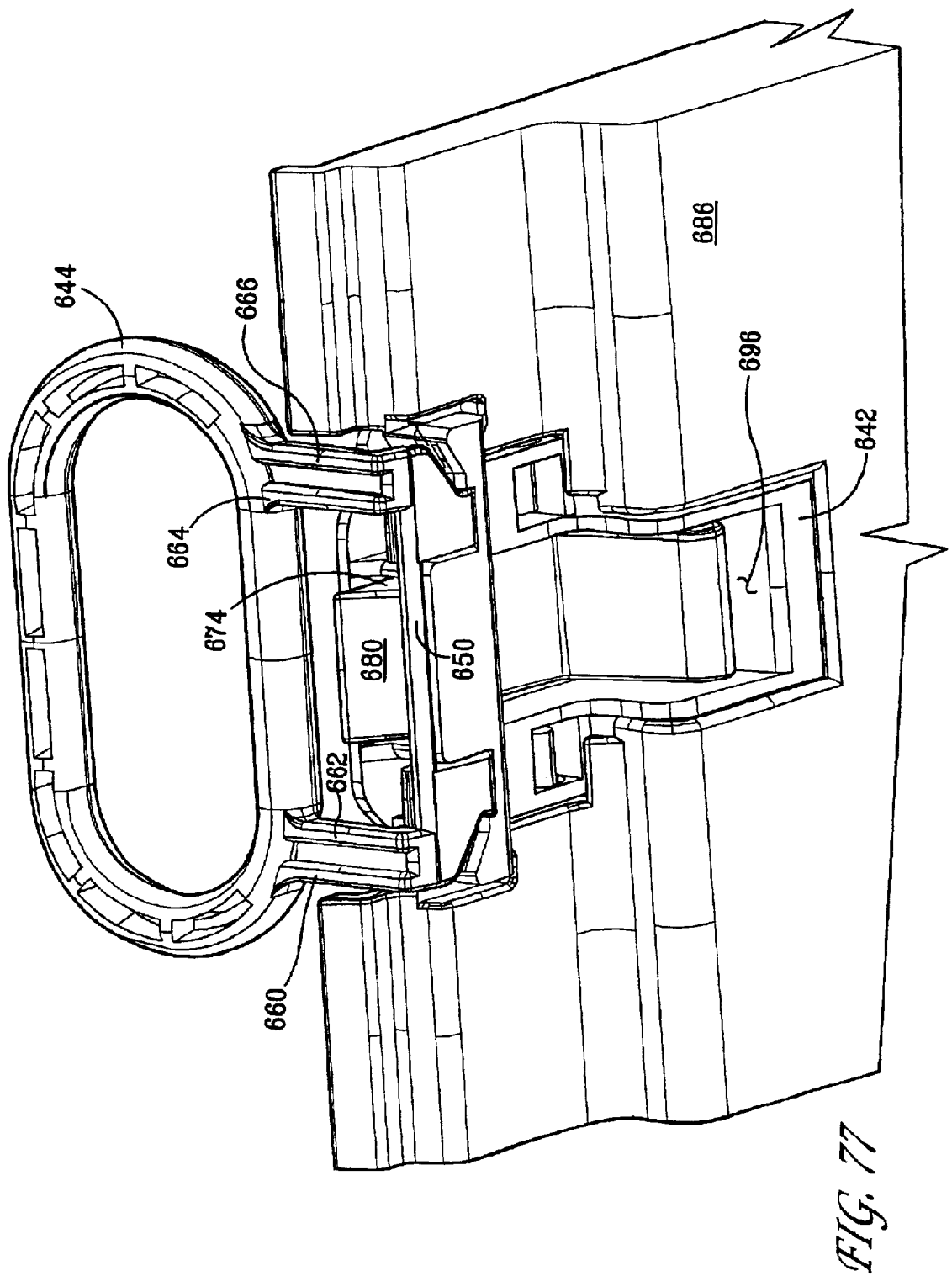
FIG. 77 is a bottom perspective view of a load floor latch according to the six embodiment of the present invention, illustrating the assembled relationship of the assembled latch after attachment to the panel member.

The assembly of the latch is best illustrated in FIGS. 69, 70 and 71. The latch 610 is assembled by inserting the legs 646,648 of the hoop actuation means 616 into the slots 636,638 in the housing 612. The snap in shafts 652,654 located at the distal end of the legs 646,648 flex inward as they slide in the slots 636,638 of the housing 612 until they snap into the recesses 632,634 located on the side walls 618,618A of the housing 612. Once in place the snap in shafts 652,654 are free to rotate in the recesses 632,634. The pawl member 614 snaps onto the bottom side 624 of the housing 612 by first putting the pawl tail 672 into the tail slot 640 in the housing 612 and forcing the living spring 670 to flex to allow the front diagonal slam action side 680 surface to rest above the hoop shaft 650.

The attachment of the assembled latch 610 into the lid 686 is best illustrated in FIGS. 72 through 76. The assembled latch 610 snaps into the lid 686 by sliding the rear wall 20 of the housing 612 first into the lid 86 causing the snap legs 626,628 on the sides of the housing 612 to flex to pass the mounting studs 688,690 extending inward at the interface of the exterior 692 and interior 694 lid apertures. Once passed the mounting studs 688,690 the snap legs 626,628 expand engaging the mounting studs 688,690 with the pawl shaped ends 626A,628A. Simultaneously, the rear flange 642 of the housing inserts into flange slot 696 of the panel 674. Once installed the housing bottom 624 is flush with panel bottom surface 664A

Another embodiment of the latch in accordance with the present invention is illustrated in FIGS. 78 through 87. The latch 710 in the present embodiment is similar in both structure and function to many of the features already described in detail with respect to the latch 10, and for this reason, only the differences in the latch 710 from the latch 710 will be described herein for the sake of brevity, Also, for ease of reference, portion in this embodiment similar to the latch 10 will describing using the same number designation except beginning with 710.

Figure 78:
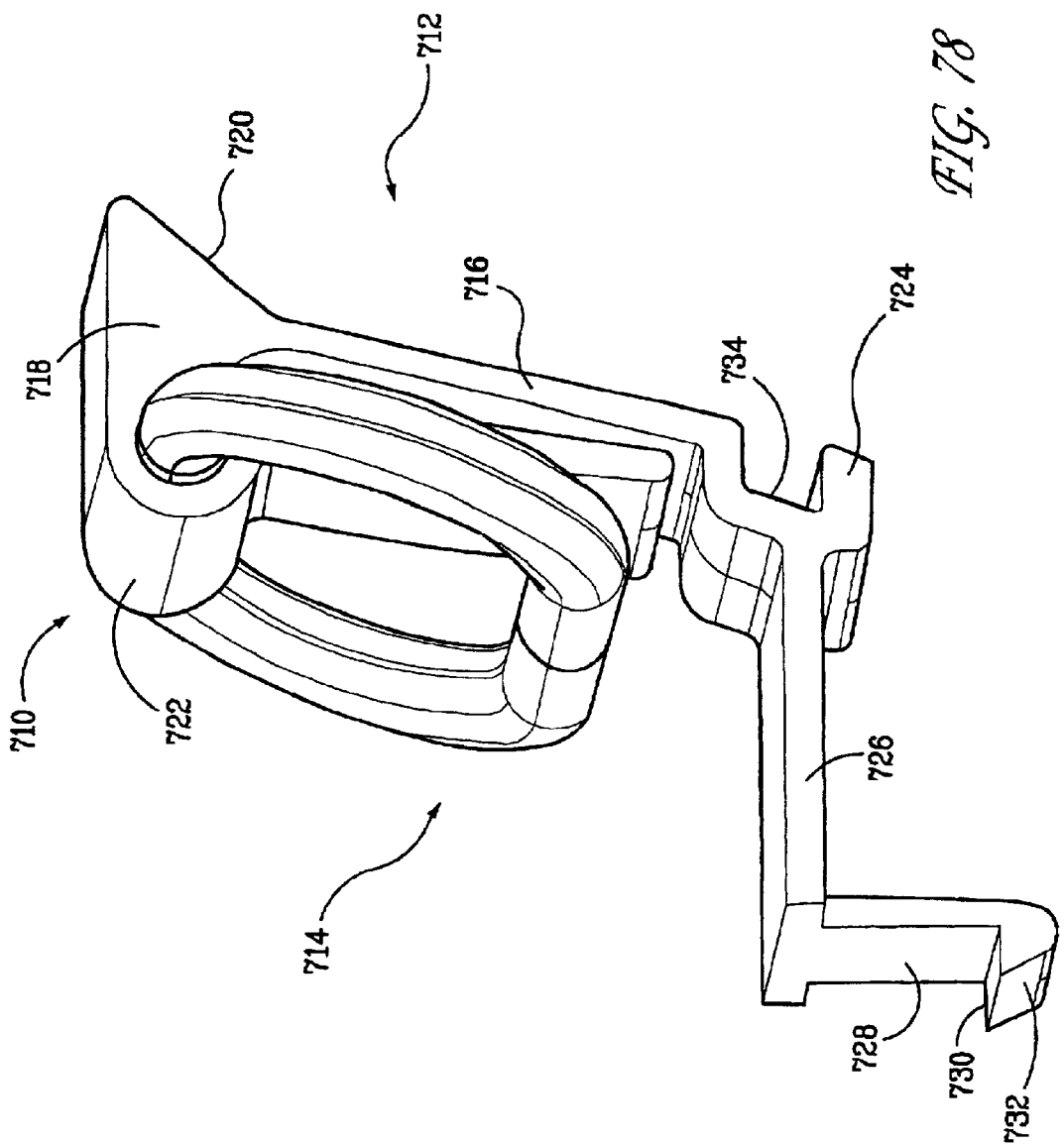
FIG. 78 is a front perspective view of a load floor latch according to the seventh embodiment of the present invention.
Figure 79:
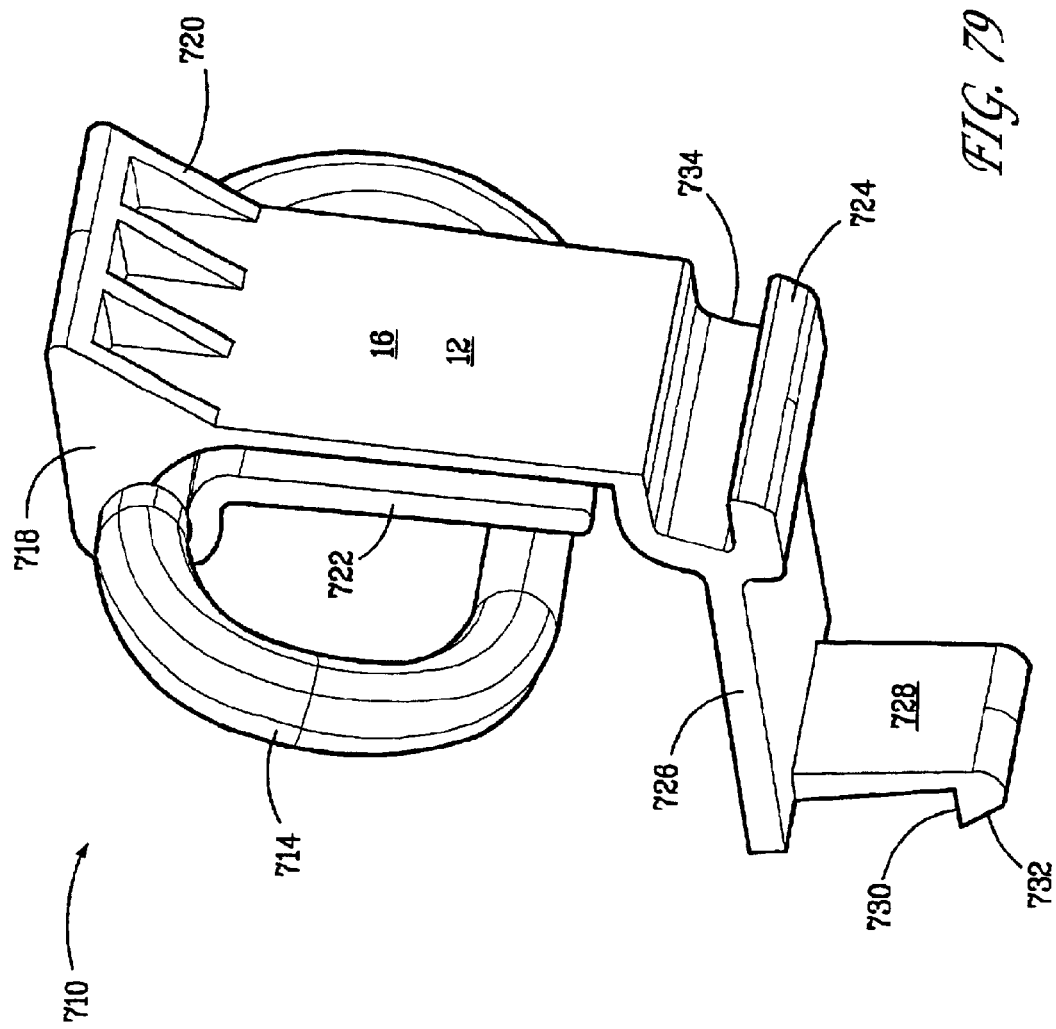
FIG. 79 is a rear perspective view of a load floor latch according to the seventh embodiment of the present invention.

Referring to FIGS. 78 and 79, the latch 710 includes a bezel 712 and a handle 714. The bezel includes a vertically extending living spring 716. The top end of the living spring 716 includes a pawl 718, having a lower ramped surface 720. A handle snap-in leg 722 extends from the top of the living spring 716, opposite the pawl 718, and extends downward along the living spring 716. At the bottom of the living spring 716, a bezel lid hook 724 extends outward in substantially the same direction as the pawl 718, forming a channel 734 between the bezel lid hook 724 and the living spring 716, dimensioned and configured to receive the edge of an opening in a lid. The bezel's base 726 extends horizontally from the bezel lid hook 724. The opposite end of the base 726 includes a downwardly extending bezel lid snap-in leg 728. The bezel lid snap-in leg ends in hook 730, having a lower ramped surface 732.

Assembling the latch is accomplished by simply inserting the handle 714 between the living spring 716 and handle snap-in leg 722.

Figure 80:
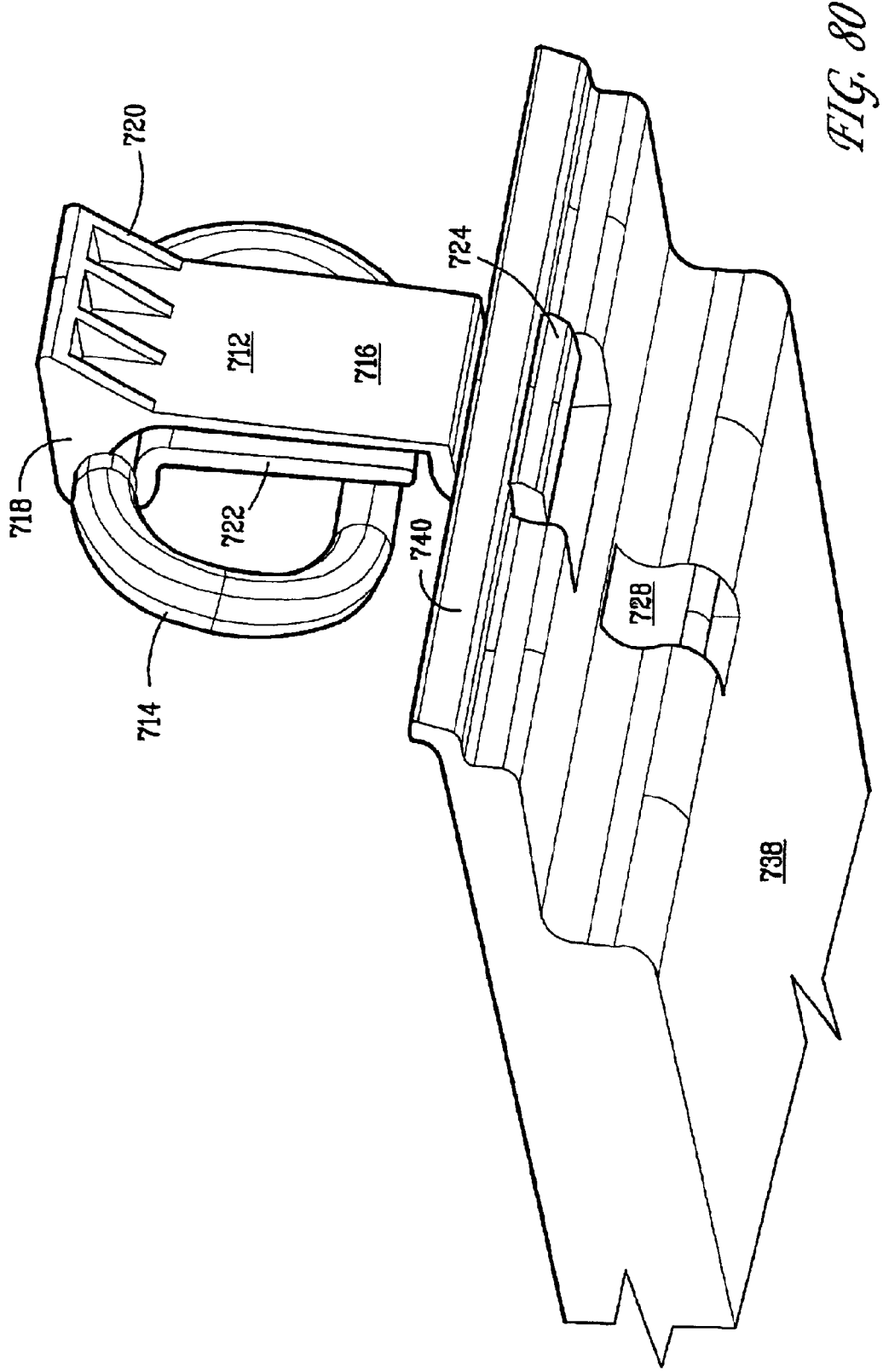
FIG. 80 is a rear environmental, perspective view of a load floor latch according to the seventh embodiment of the present invention, showing the latch partially installed in a lid.
Figure 81:
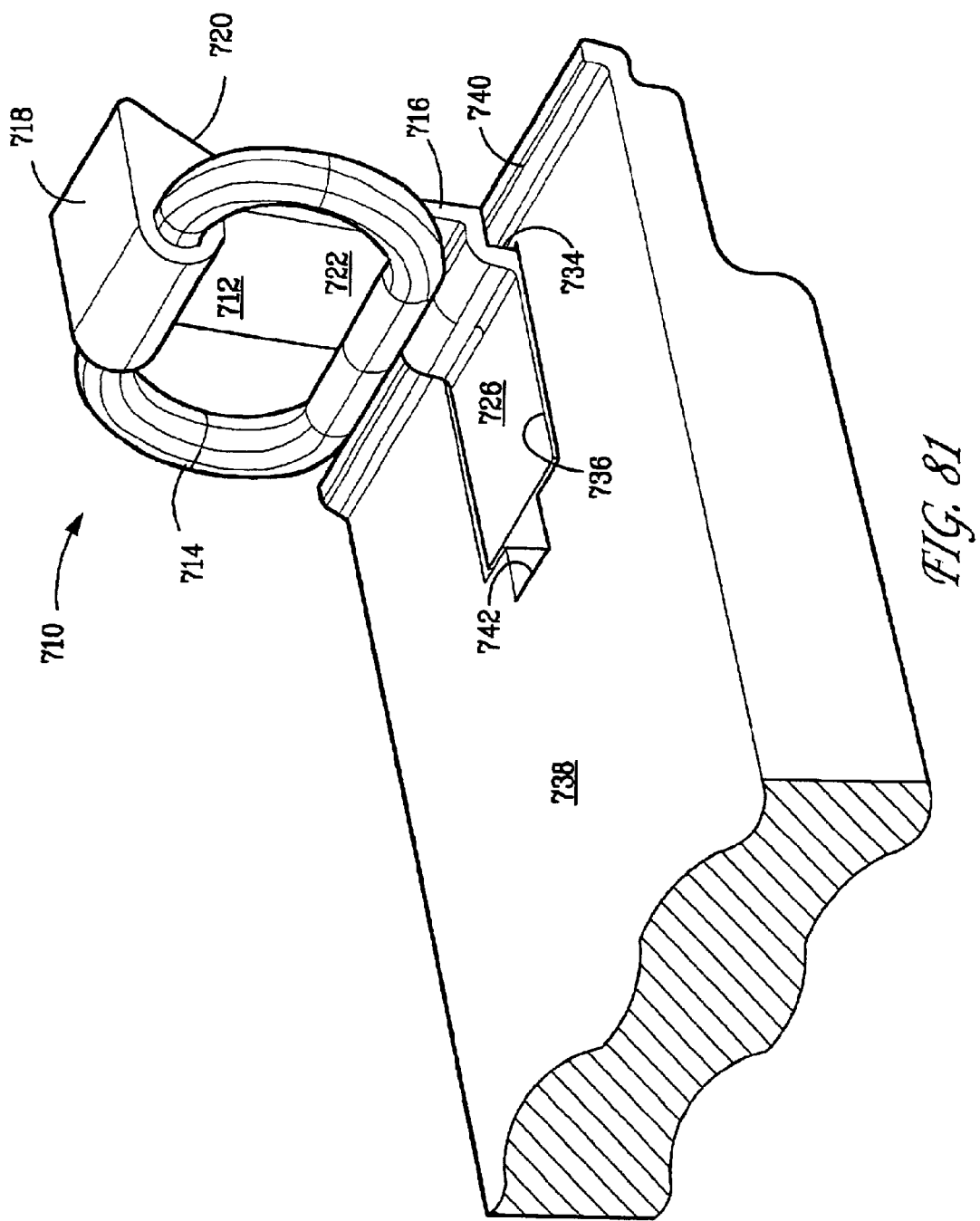
FIG. 81 is a rear environmental, perspective view of a load floor latch according to the seventh embodiment of the present invention, showing the latch installed in a lid, and the lid's carpeting removed.

Referring to FIGS. 80–81, the process of installing a latch 710 in a lid is illustrated. First, the bezel lid hook 724 is inserted into the opening 736 defined within the lid 738, so that the edge 740 closest to the end of the lid 738 is secured within the channel 34. Next, the latch 10 is rotated downward. The bezel lid snap-in leg's ramp 732 strikes the opposite edge 742 of the opening 736, causing the bezel lid snap-in leg 728 to bend so that the hook 730 can pass the edge 742. Once the hook 730 clears the edge 742, the bezel lid snap-in leg 728 returns to its original position, wherein the hook 730 engages the lid 738, securing the latch 710 within the lid 738. To improve the appearance of the lid, a carpet 744 may be secured to the lid 738 and surrounding frame 746, illustrated in FIGS. 82 and 83. The handle 714 is dimensioned and configured so that it will clear both standard carpet 744 and the taller luxury carpet 744.

Alternatively, the bezel 712 and lid 738 may be made from one-piece construction, preferably by injection molding. Because the bezel 712 and lid 738 will be formed from one solid piece, there is obviously no need to install a separate bezel 712 within the lid 738. Once the one-piece bezel 712 and lid 738 was molded, completing the assembly would only require inserting the handle 714 between the living spring 716 and the handle snap-in leg 722.

Figure 82:
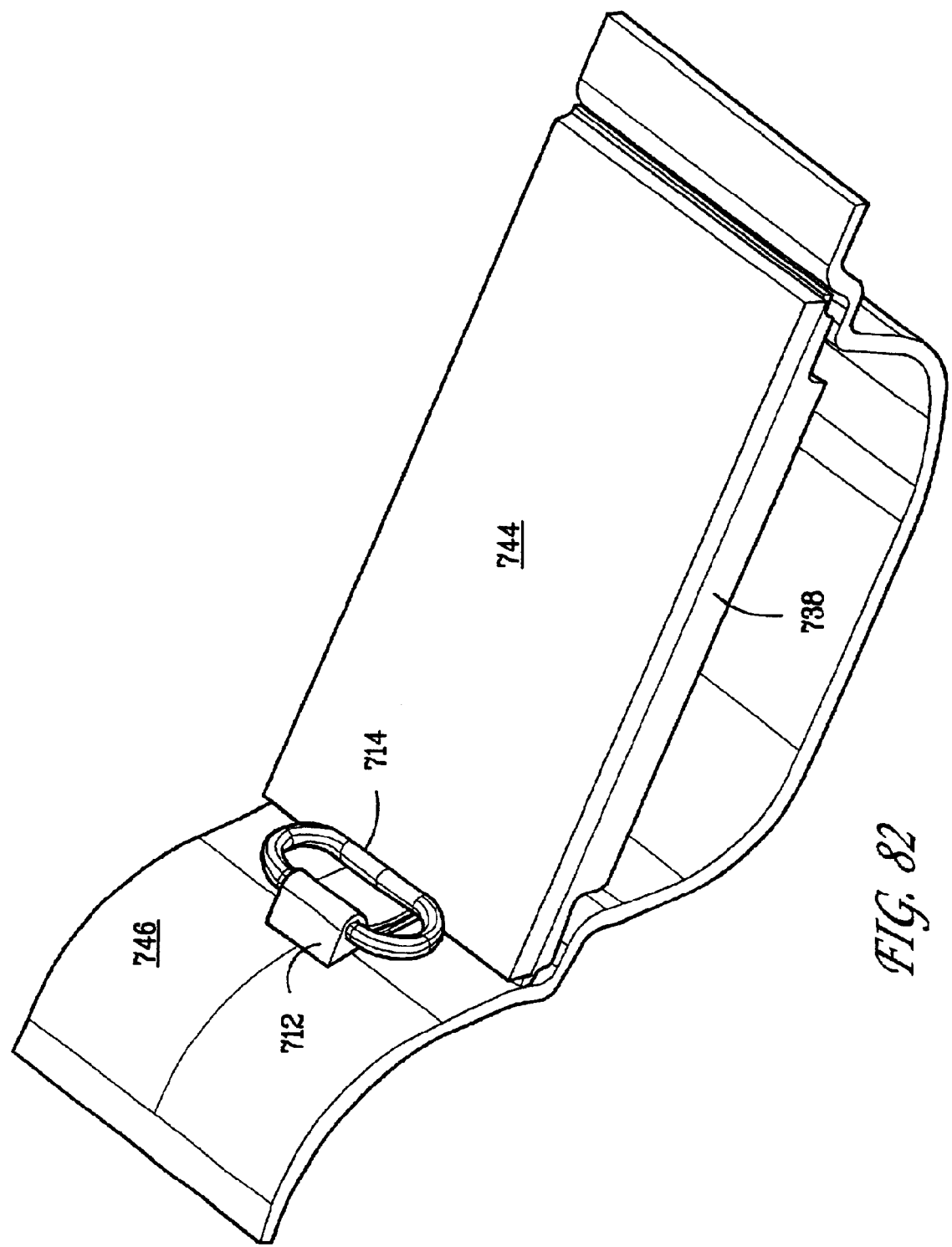
FIG. 82 is an environmental, top perspective view of a load floor latch according to the seventh embodiment of the present invention.
Figure 83:
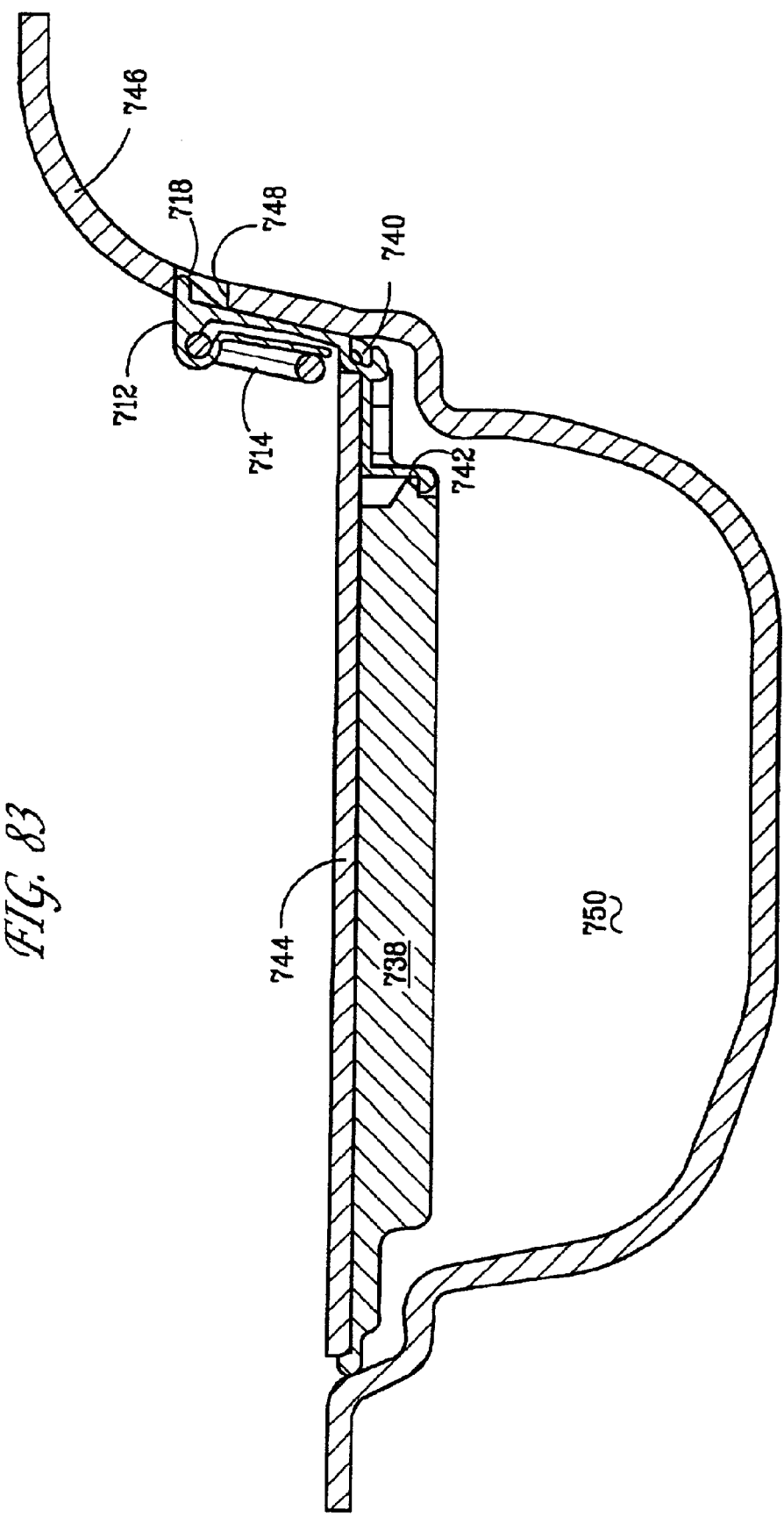
FIG. 83 is a cutaway side environmental view of a load floor latch according to the seventh embodiment of the present invention, showing the latch in its latched position.
Figure 84:
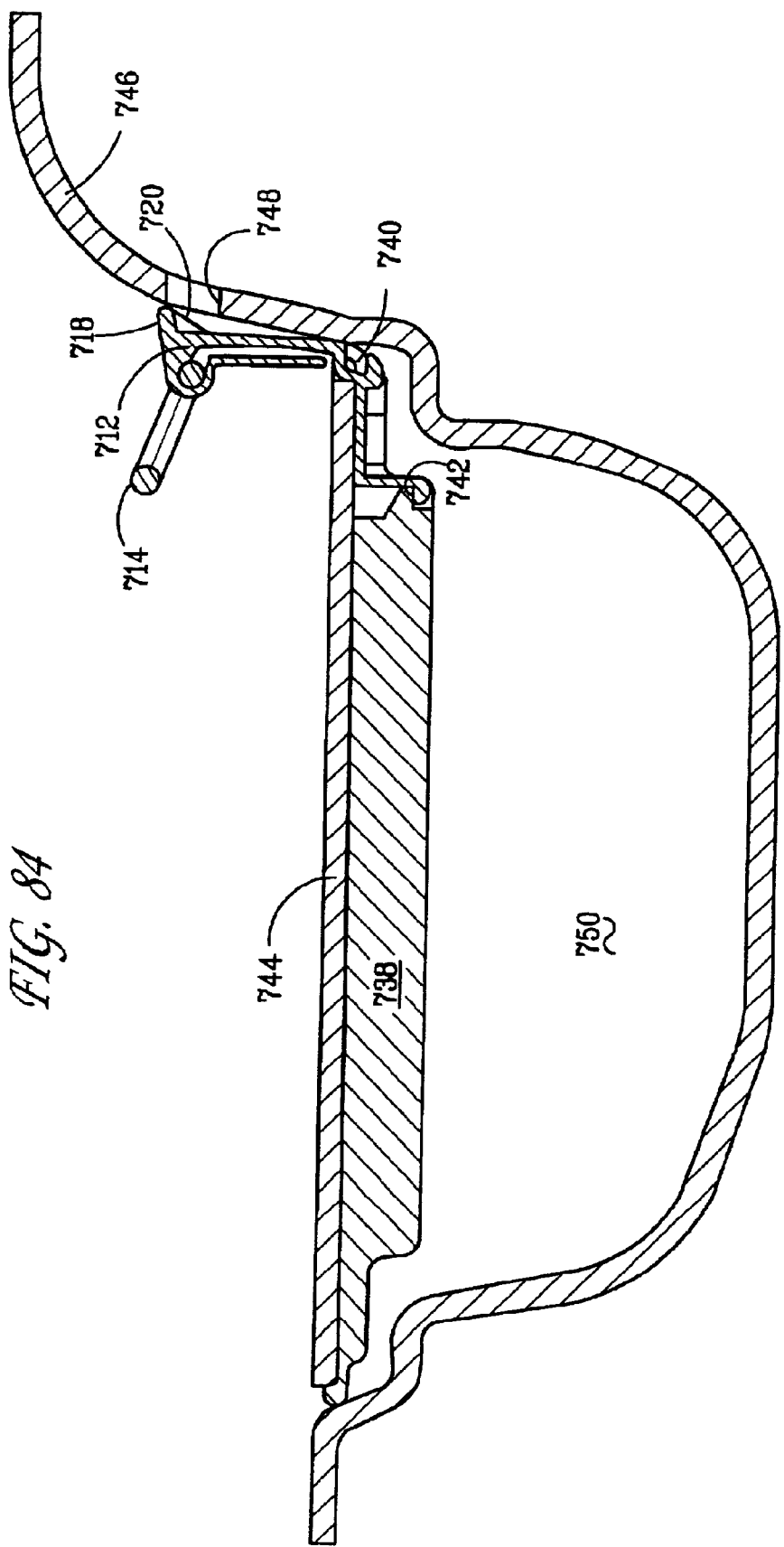
FIG. 84 is a cutaway side environmental view of a load floor latch according to the seventh embodiment of the present invention, showing the latch in its unlatched position.
Figure 85:
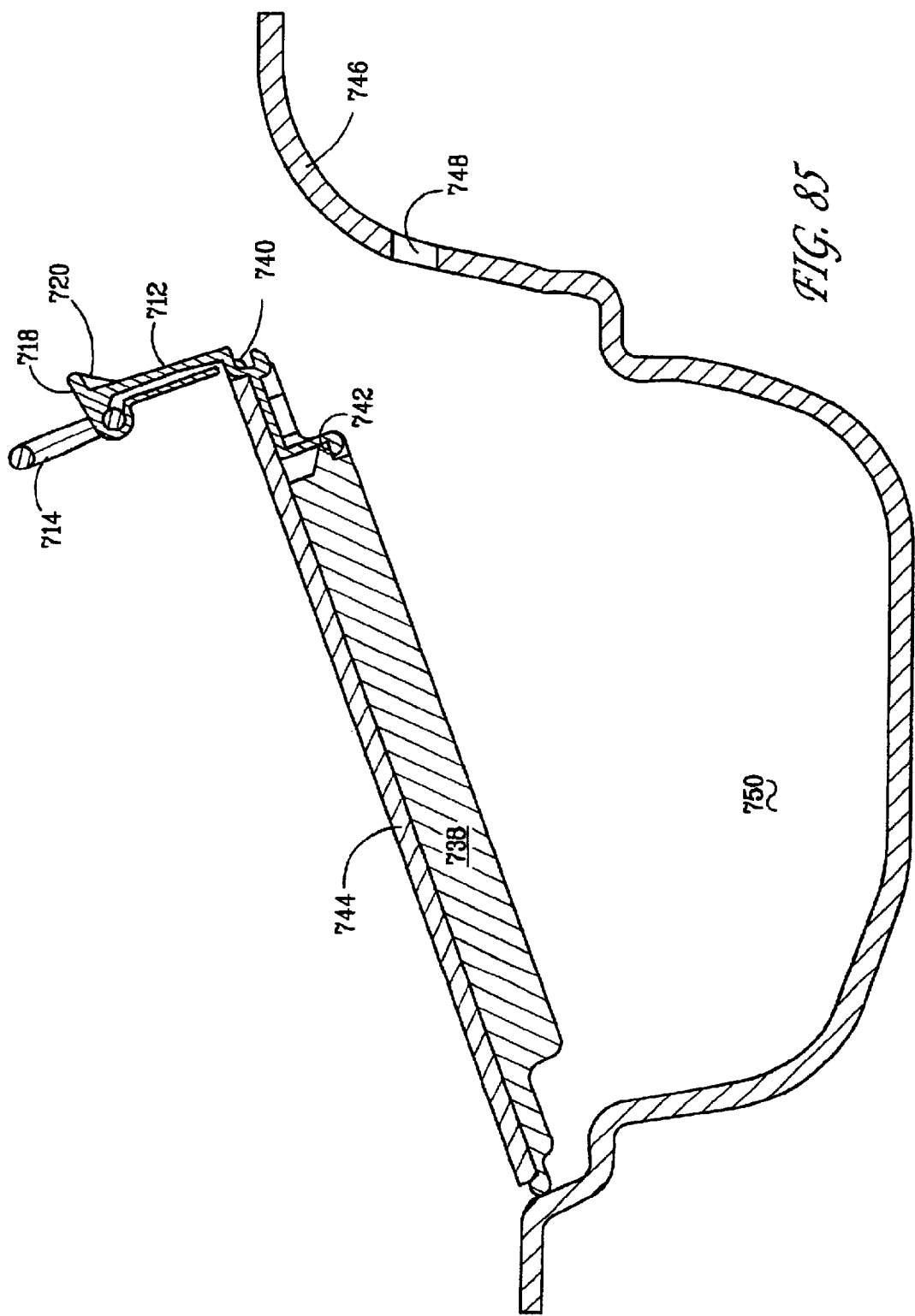
FIG. 85 is a cutaway side environmental view of a load floor latch according to the seventh embodiment of the present invention, showing the latch in its unlatched position and the lid raised.
Figure 86:
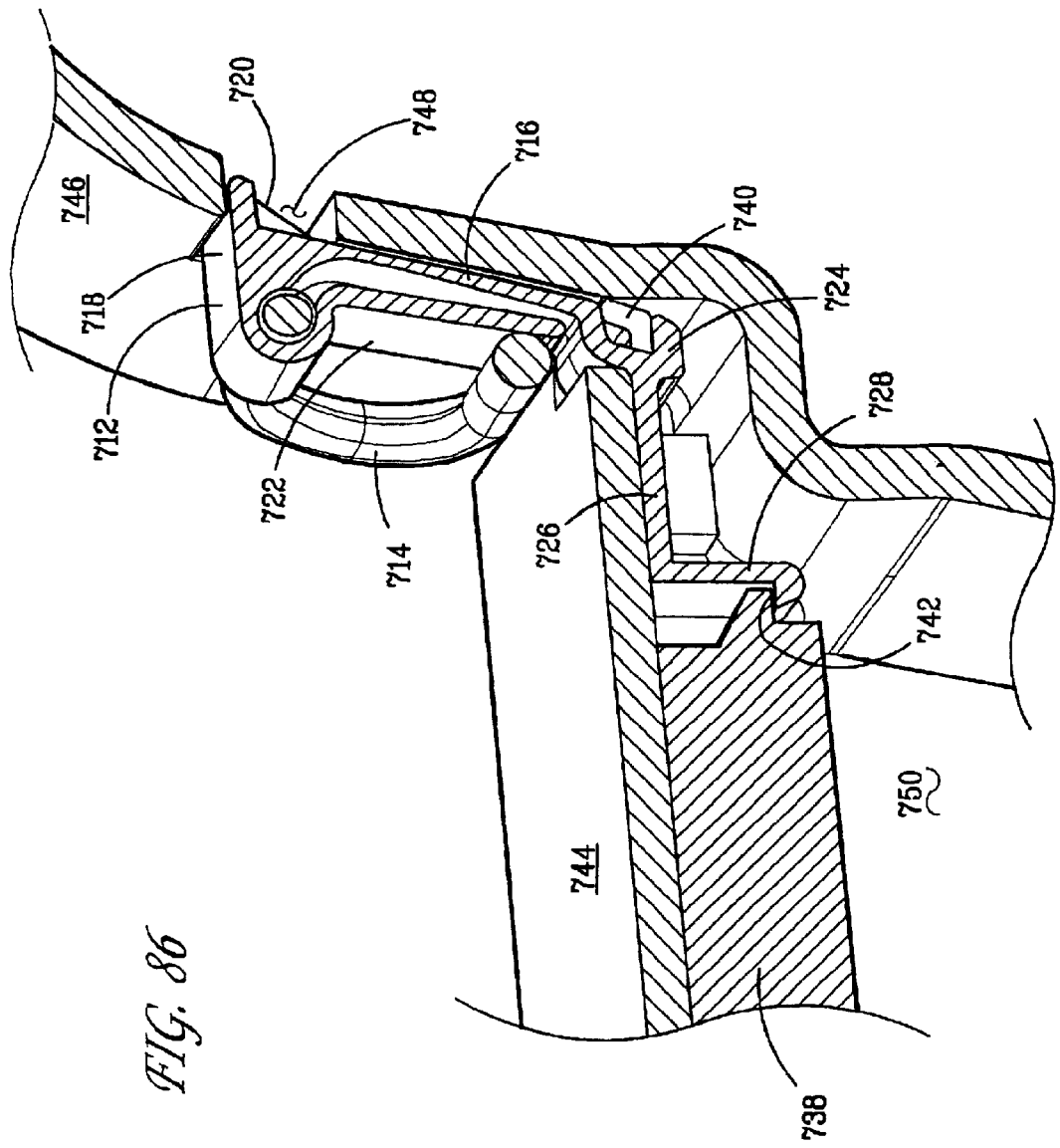
FIG. 86 is a cutaway environmental perspective view of a load floor latch according to the seventh embodiment of the present invention, showing the latch in its latched position.

The operation of the latch 710 is illustrated in FIGS. 83 through 87. The latched position of the latch 710 is shown in FIGS. 82 and 86. In this position, the pawl 718 fits within an opening 748 defined within the frame 746, thereby securing the lid 738 in its closed position. The handle 714 hangs downward against the handle snap-in leg 722, thereby keeping the handle out of the way of any person's feet that may be on top of the lid 738. To open the lid 738, the handle 714 is first raised to the position shown in FIGS. 84 and 87 to facilitate grasping. Continued pulling on handle 714 disengages the pawl from the opening 748, so that further pulling on handle 714 raises the lid 738 to the position shown in FIG. 85. The storage compartment 750 below lid 738 can now be accessed.

To close and secure the lid 738, the lid 738 can simply be slammed shut. As the lid 738 closes, the pawl's ramped surface 720 will strike the frame 746, bending the living spring 716 so that the pawl 718 can pass by the frame 746 and enter the opening 748. Once the pawl 718 enters the opening 748, living spring 716 returns to its original position, so that the pawl 718 engages the frame 746, securing the latch 710 in its latched position.

Another embodiment of the latch in accordance with the present invention is illustrated in FIGS. 88 through 102. The latch 810 in the present embodiment is similar in both structure and function to many of the features already described in detail with respect to the latch 10, and for this reason, only the differences in the latch 500 from the latch 10 will be described herein for the sake of brevity, Also, for ease of reference, portion in this embodiment similar to the latch 10 will describing using the same number designation except beginning with 810.

Figure 89:
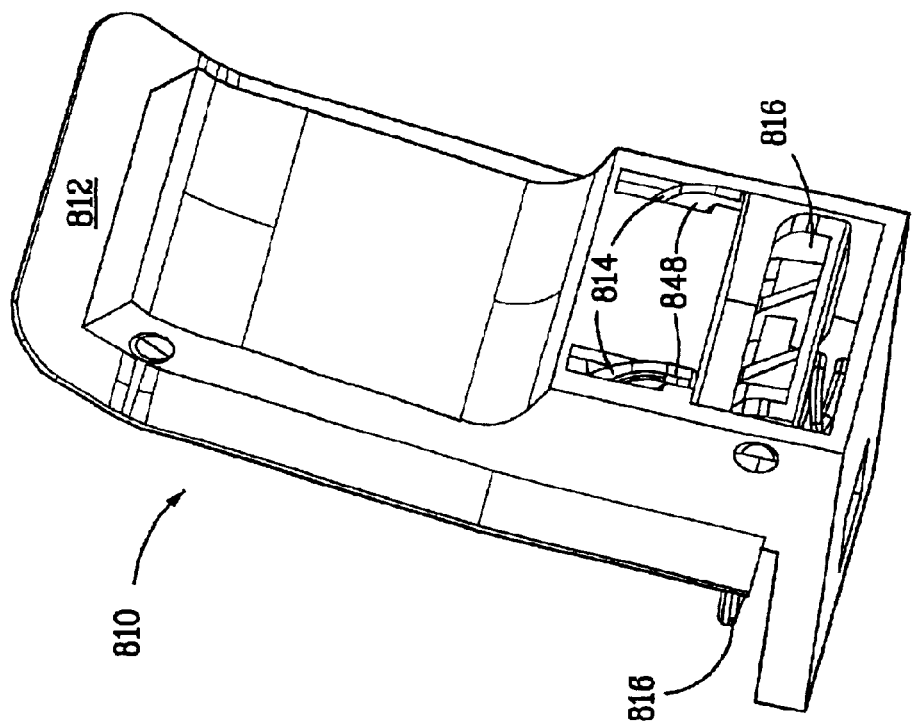
FIG. 89 is a rear perspective view of a load floor latch according to the eight embodiment of the present invention present invention.
Figure 88:
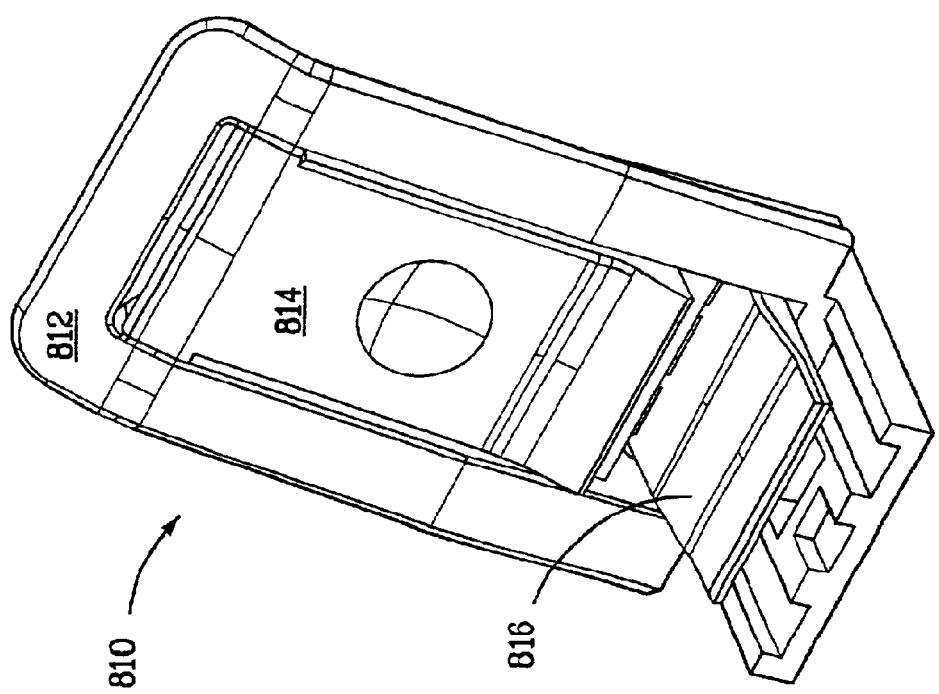
FIG. 88 is a front perspective view of a load floor latch according to the eight embodiment of the present invention.

The invention is a load floor latch. Referring to FIGS. 88–89, the load floor latch 810 includes a housing 812, a button 814, and possibly an ejector 816.

Figure 91:
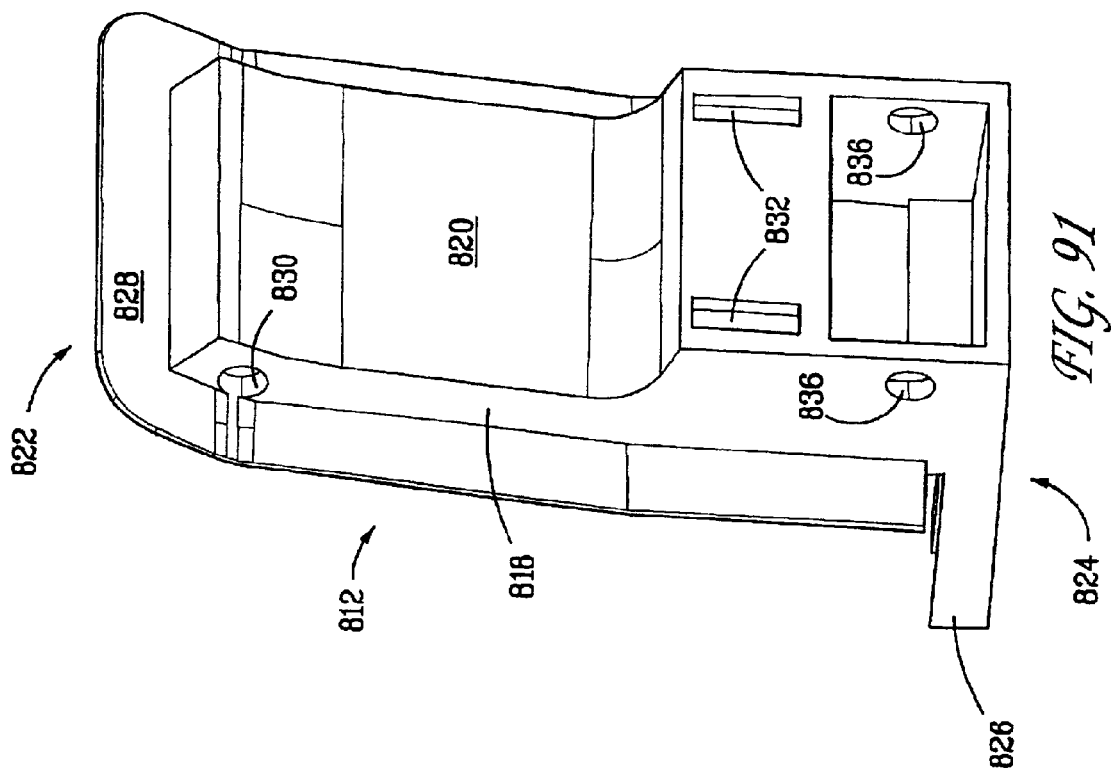
FIG. 91 is a rear perspective view of a housing for a load floor latch according to the eight embodiment of the present invention present invention.
Figure 90:
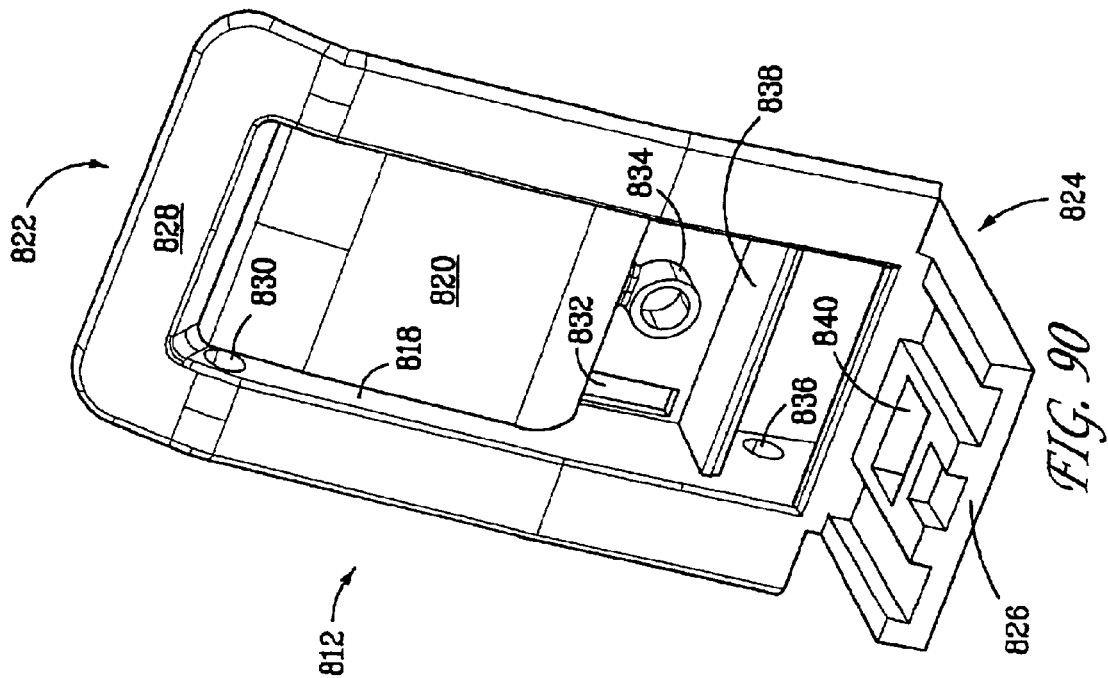
FIG. 90 is a front perspective view of a housing for a load floor latch according to the eight embodiment of the present invention present invention.

The housing 12 is best illustrated in FIGS. 90–91. The housing 812 includes a pair of side walls 818, a rear wall 820, a top portion 822, a bottom portion 824, a horizontal flange 826 protruding outward from the bottom and defining a hole 840, and an outwardly extending flange 828 around the top and sides of the housing 812. The housing's top portion 822 includes means for pivotally securing a button, which are preferably apertures 830 defined within the side walls 818. The housing's bottom portion 824 includes at least one, and preferably two, slots 832, dimensioned and configured to receive a stop tab of a button (described below). A spring guide 834 may protrude from between the slots 832. Below the slots 822, the housing's bottom portion 824 also may include means for pivotally securing an ejector, preferably a pair of holes 836 within the side walls 818. An ejector stop 838 is located above the holes 836.

The button 814 is best illustrated in FIGS. 92–93. The button 814 defines a top portion 842 and a bottom portion 844. The top portion 842 includes means for pivotally securing the button 814 to housing 812, which are preferably shafts 846, dimensioned and configured to mate with the holes 830. The shafts 846 are preferably ramped to facilitate snapping the button 814 into the housing 812. The bottom portion 844 includes at least one, and preferably two, stop tabs 848, dimensioned and configured to mate with the slots 832 within the housing 812. The bottom portion 844 also defines a pawl 872.

The ejector 816 is best illustrated in FIGS. 94–95. The ejector 816 includes means for pivotally securing the ejector 816 to the housing 812, which are preferably a pair of shafts 850, dimensioned and configured to mate with the apertures 836 within housing 812. The shafts 850 are preferably ramped to facilitate snapping the ejector 816 into the housing 812. The ejector 816 may also include a spring guide 852 on its lower surface.

The components of the assembled latch 810 are best illustrated in FIGS. 88–89, and 810. To assemble the latch 810, a spring 868 is first placed over the spring guide 834 of the housing 812. Next, the button's stop tabs 848 are inserted into the slots 832. Third, the button's shafts 846 are snapped into the housing's apertures 830. The button 814 is now installed in the housing 812, and is biased outward by the spring 868. To install the ejector, first the spring 870 is placed over the ejector's spring guide 852. Next, the ejector's shafts 850 are snapped into the housing's apertures 836. The ejector 816 is now biased upward by the spring 870. The latch 810 is now fully assembled.

Figure 97:
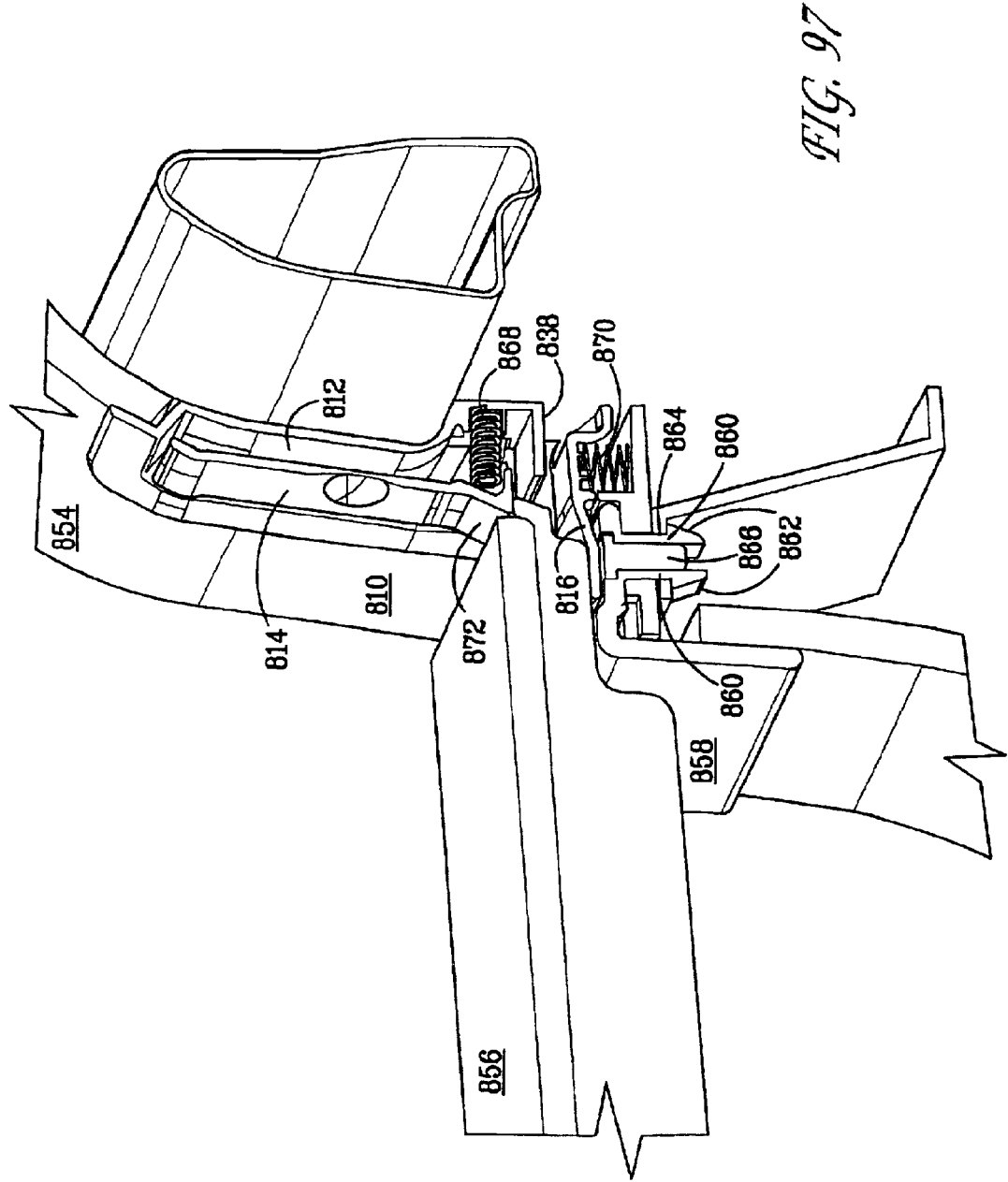
FIG. 97 is a cutaway perspective view of a load floor latch according to the eight embodiment of the present invention present invention, showing the latch engaging the lid, and the lid in the closed position.

Referring to FIG. 96, the latch is illustrated installed within a frame 854, securing a lid or load floor 856. The latch 810 is installed in the frame 854 by first inserting the latch 810 into an opening within the frame 854. Referring to FIG. 97, a lid support 858 is then placed on top of the housing's horizontal flange 26. The lid support 858 includes at least two downwardly protruding tabs 860, terminating in barbs 862. The tabs 860 are inserted through the hole 840, bending inward to allow the barbs 862 to pass through the hole 840. An additional hole 864 is defined within the frame 854, corresponding to the hole 840. Once the barbs 862 clear both the hole 840 and the hole 864, the tabs 860 return to their original position so that the barbs 862 engage the edge of hole 64, thereby securing both the lid support 858 and latch 810 within the frame 854. Lastly, a retainer 866 is inserted into the hole 840, between the tabs 860, thereby preventing the tabs 860 from bending inward, as would be necessary to disengage the lid support 858 from the frame 854.

Figure 98:
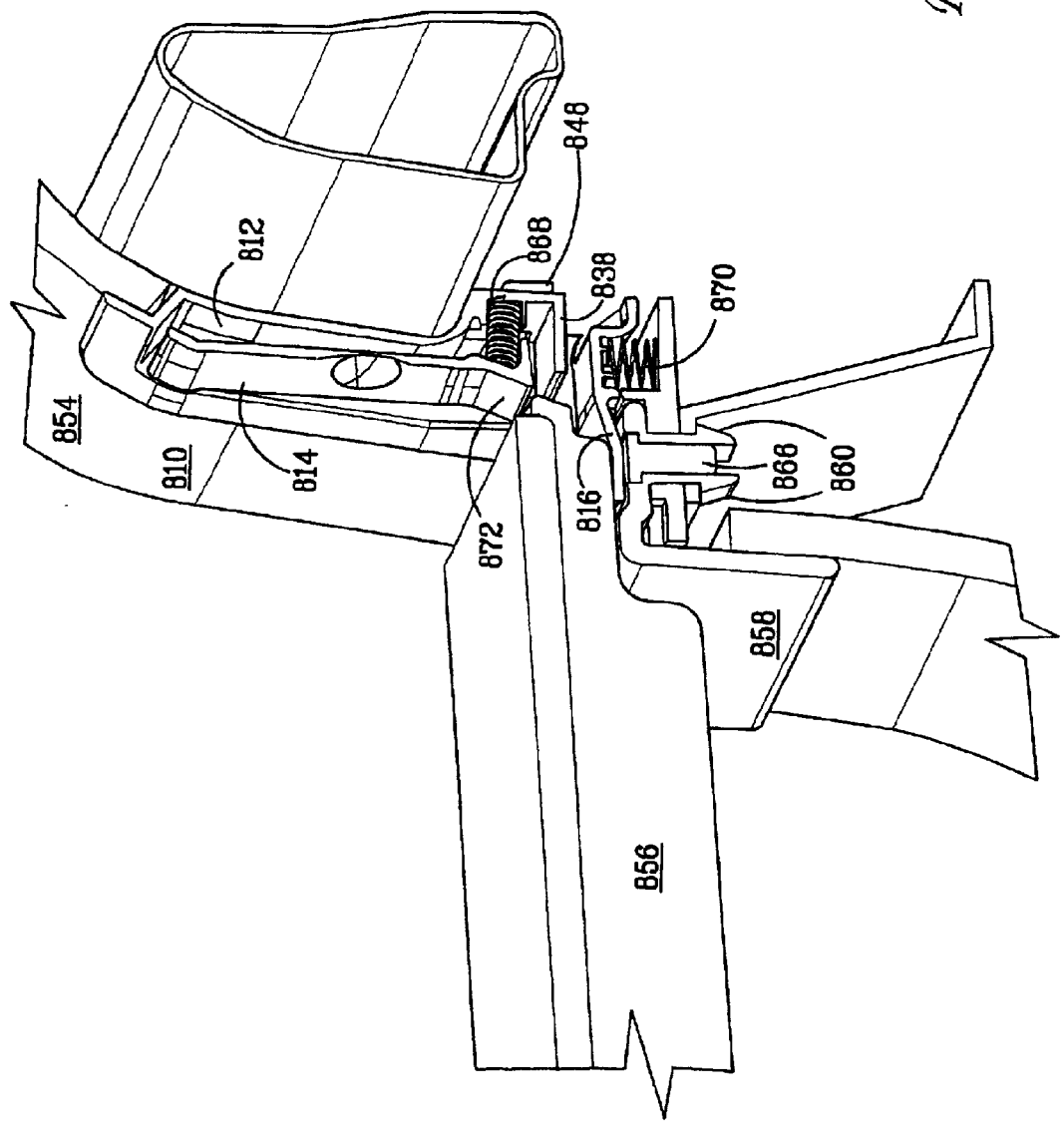
FIG. 98 is a cutaway perspective view of a load floor latch according to the eight embodiment of the present invention present invention, showing the latch disengaged from the lid, and the lid in the closed position.
Figure 99:
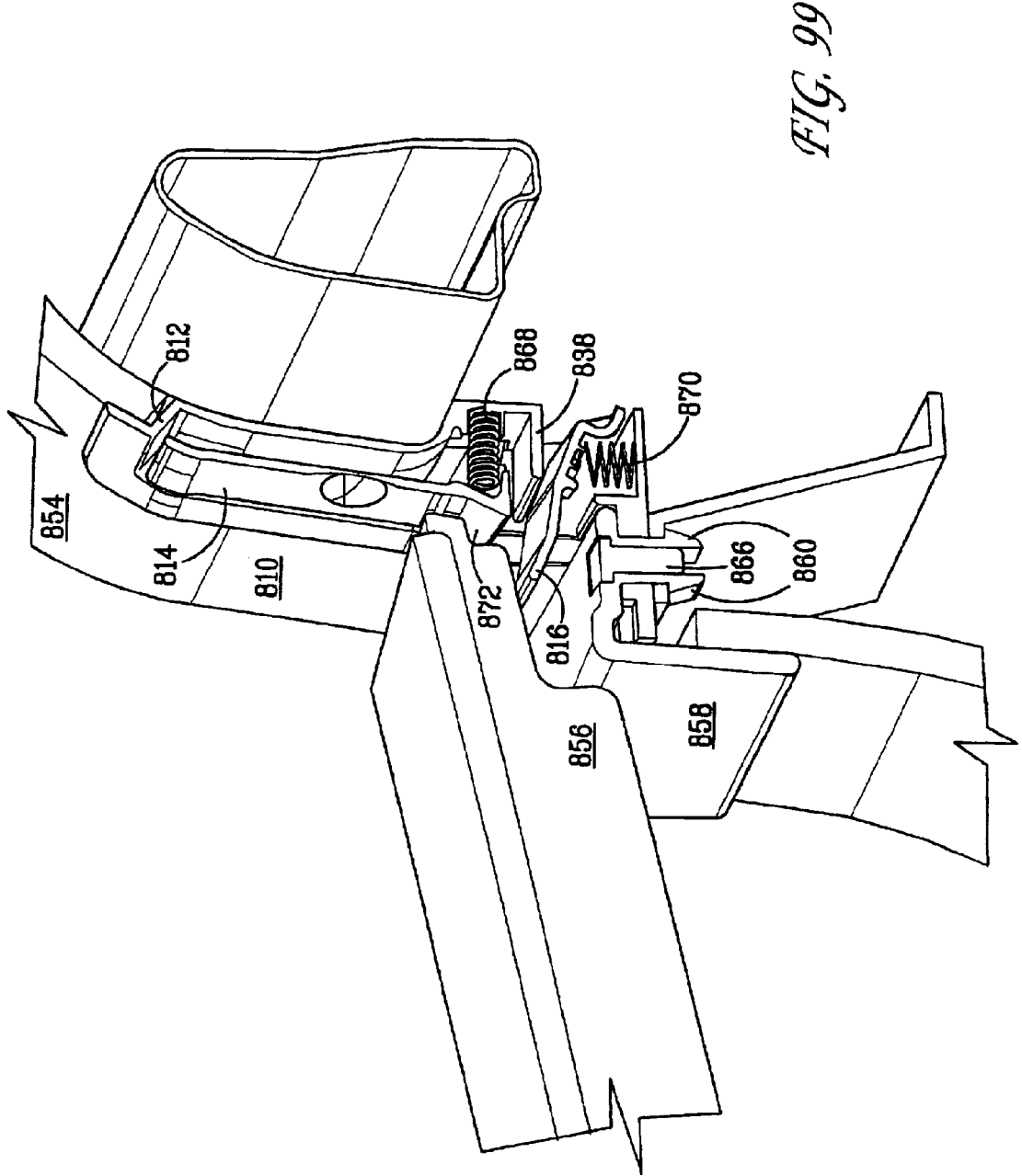
FIG. 99 is a cutaway perspective view of a load floor latch according to the eight embodiment of the present invention present invention, showing the latch disengaged from the lid, and the lid in the open position.
Figure 100:
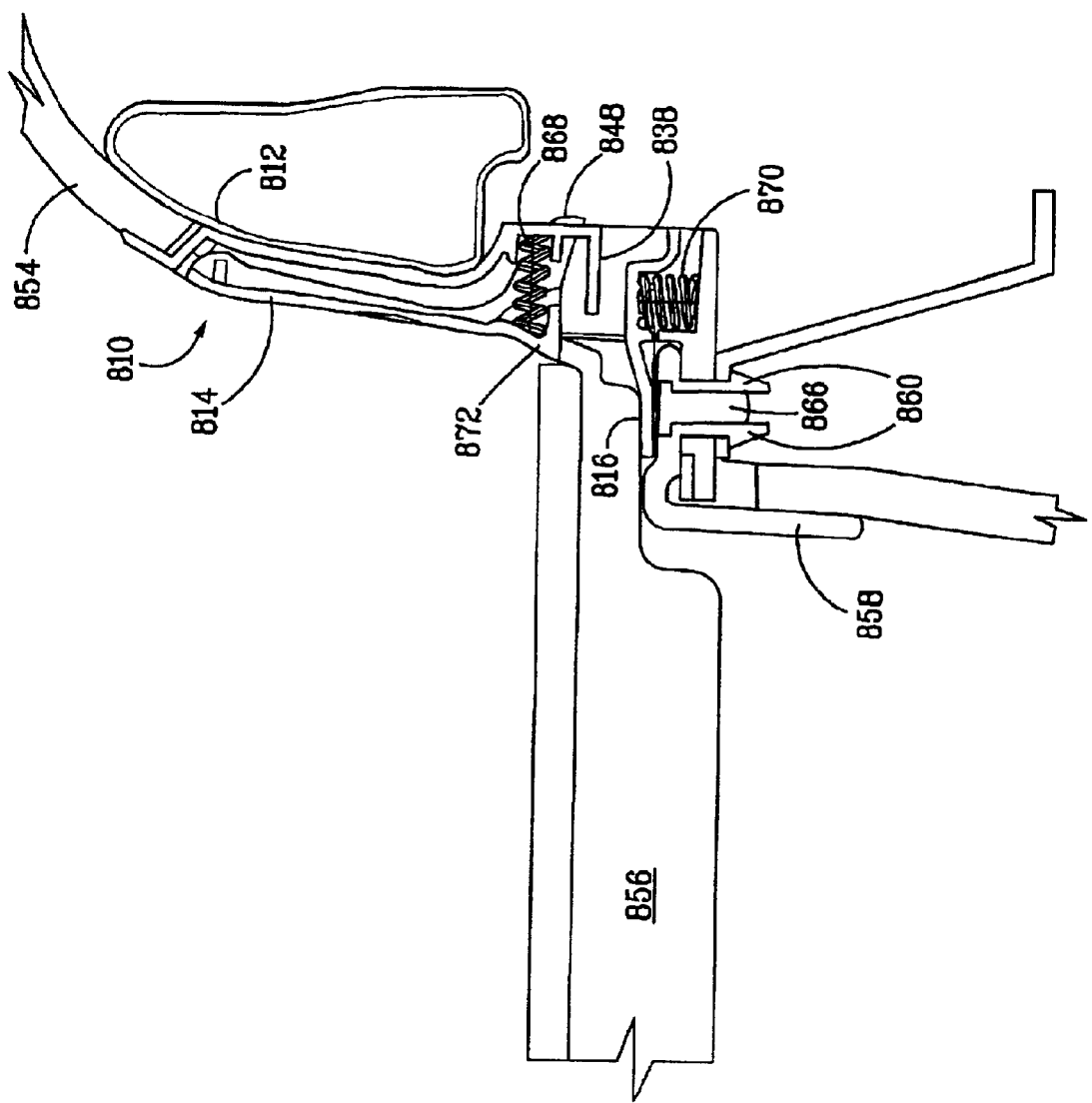
FIG. 100 is a side view of a load floor latch according to the eight embodiment of the present invention present invention, showing the latch engaging the lid, and the lid in the closed position.
Figure 101:
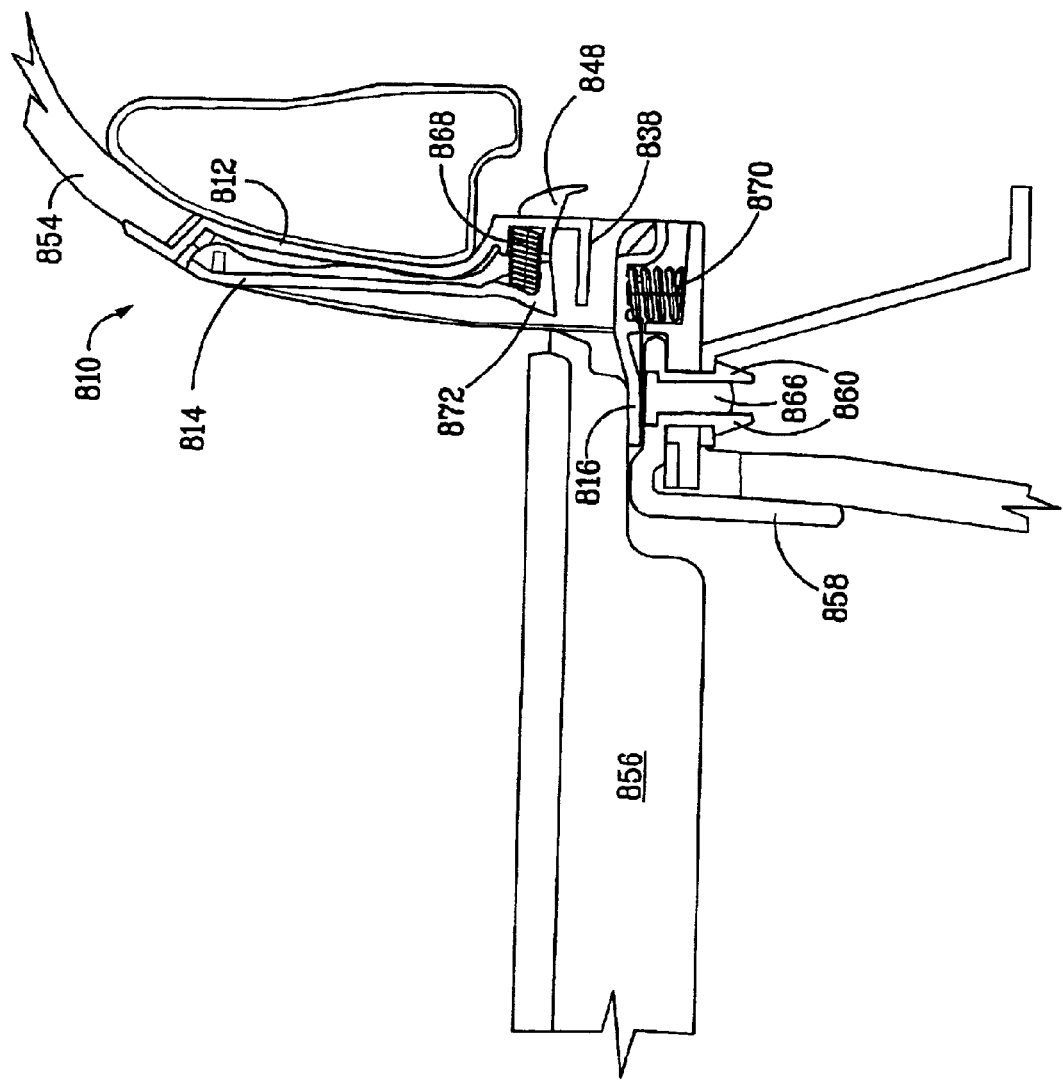
FIG. 101 is a side view of a load floor latch according to the eight embodiment of the present invention, showing the latch disengaged from the lid, and the lid in the closed position.
Figure 102:
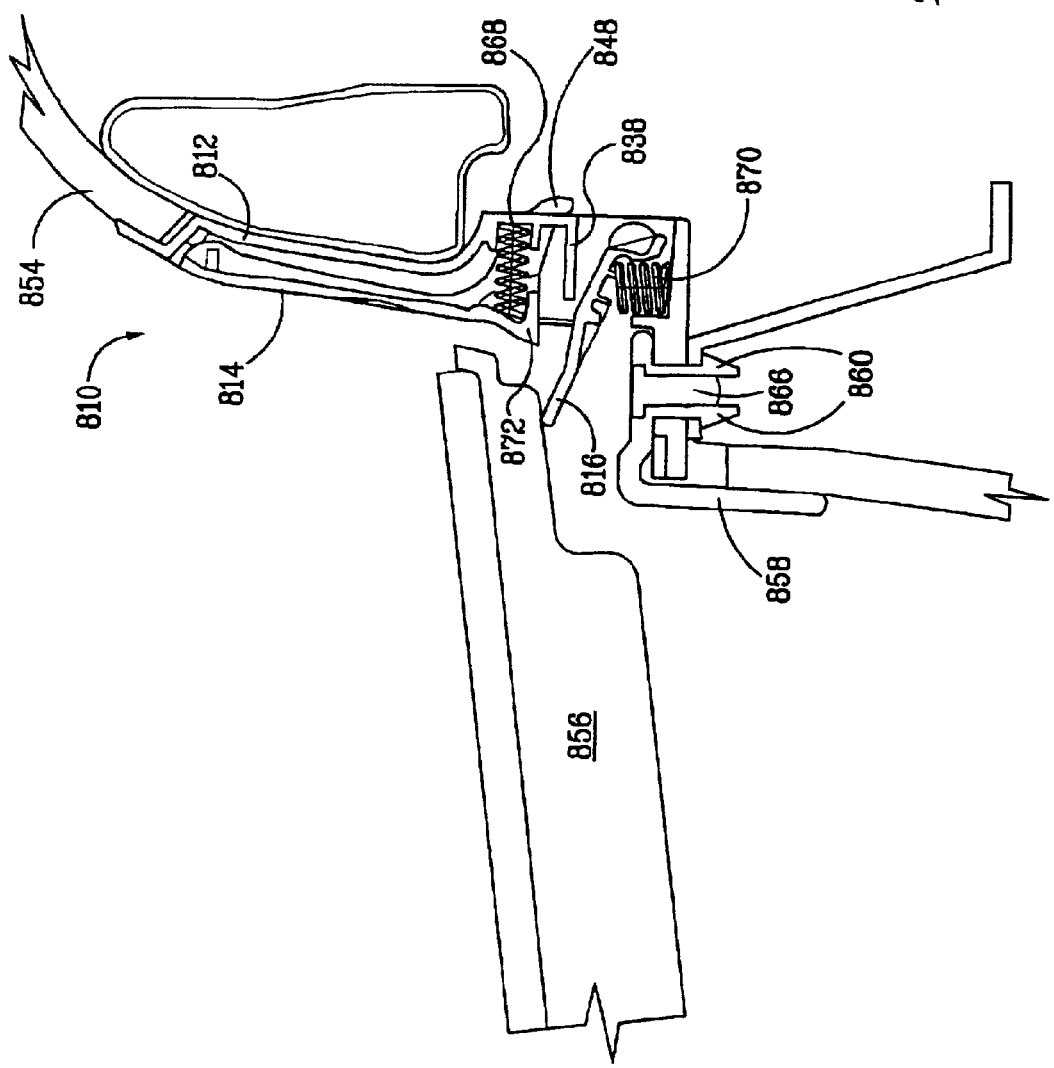
FIG. 102 is a side view of a load floor latch according to the eight embodiment of the present invention present invention, showing the latch disengaged from the lid, and the lid in the open position.
Figure 104:
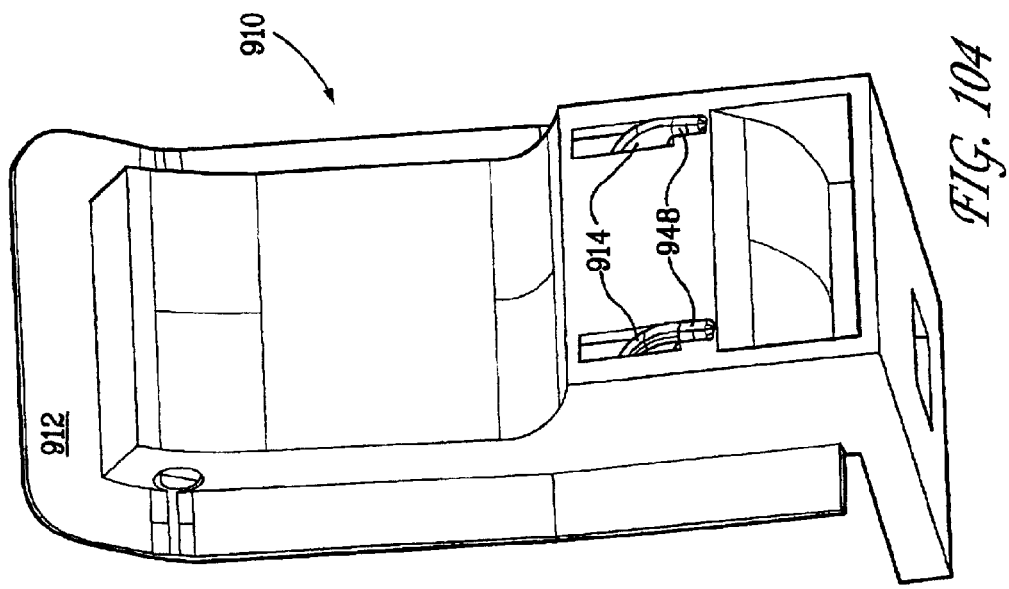
FIG. 104 is a rear perspective view of a ninth embodiment of a load floor latch according to the present invention.
Figure 103:
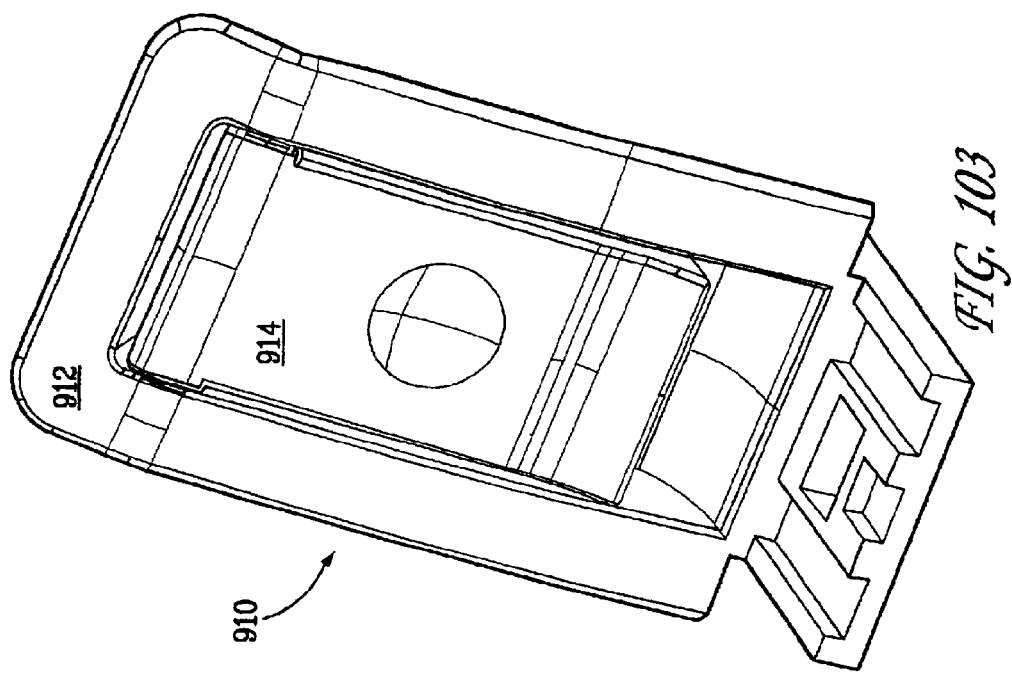
FIG. 103 is a front perspective view of a ninth embodiment of a load floor latch according to the present invention.
Figure 107:
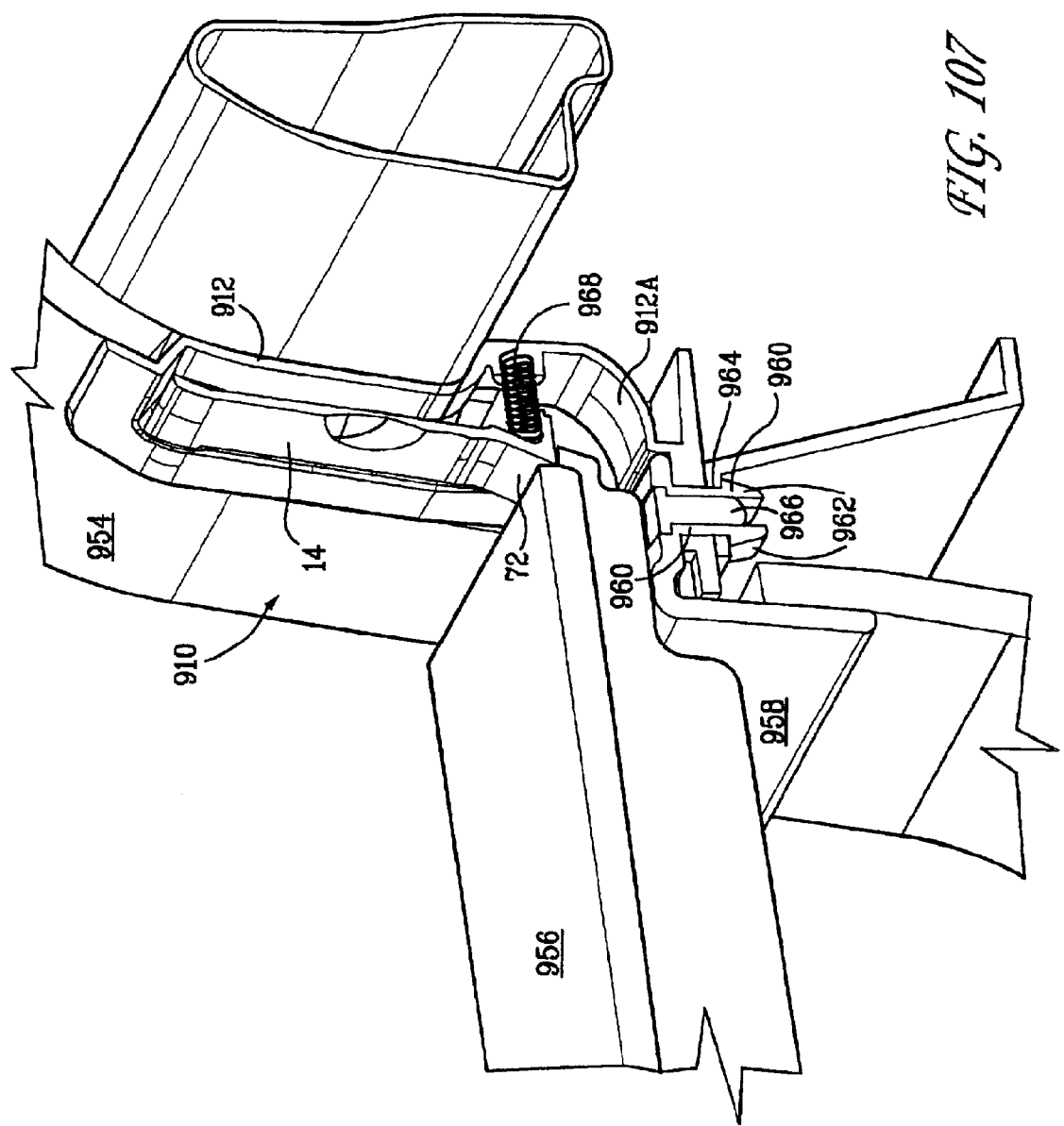
FIG. 107 is a cutaway perspective view of a ninth embodiment of a load floor latch according to the present invention, showing the latch engaging the lid, and the lid in the closed position.
Figure 108:
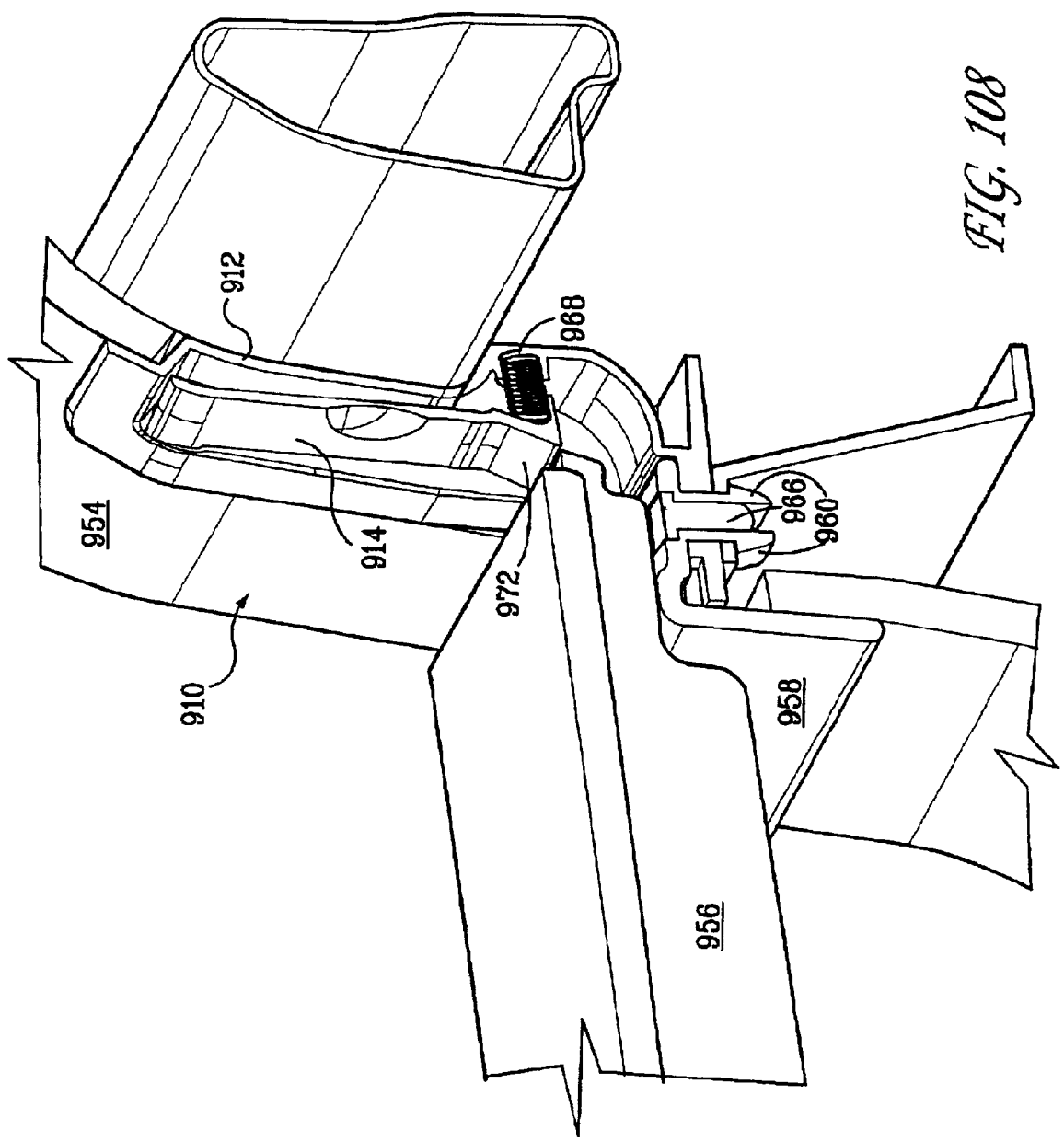
FIG. 108 is a cutaway perspective view of a ninth embodiment of a load floor latch according to the present invention, showing the latch disengaged from the lid, and the lid in the closed position.
Figure 109:
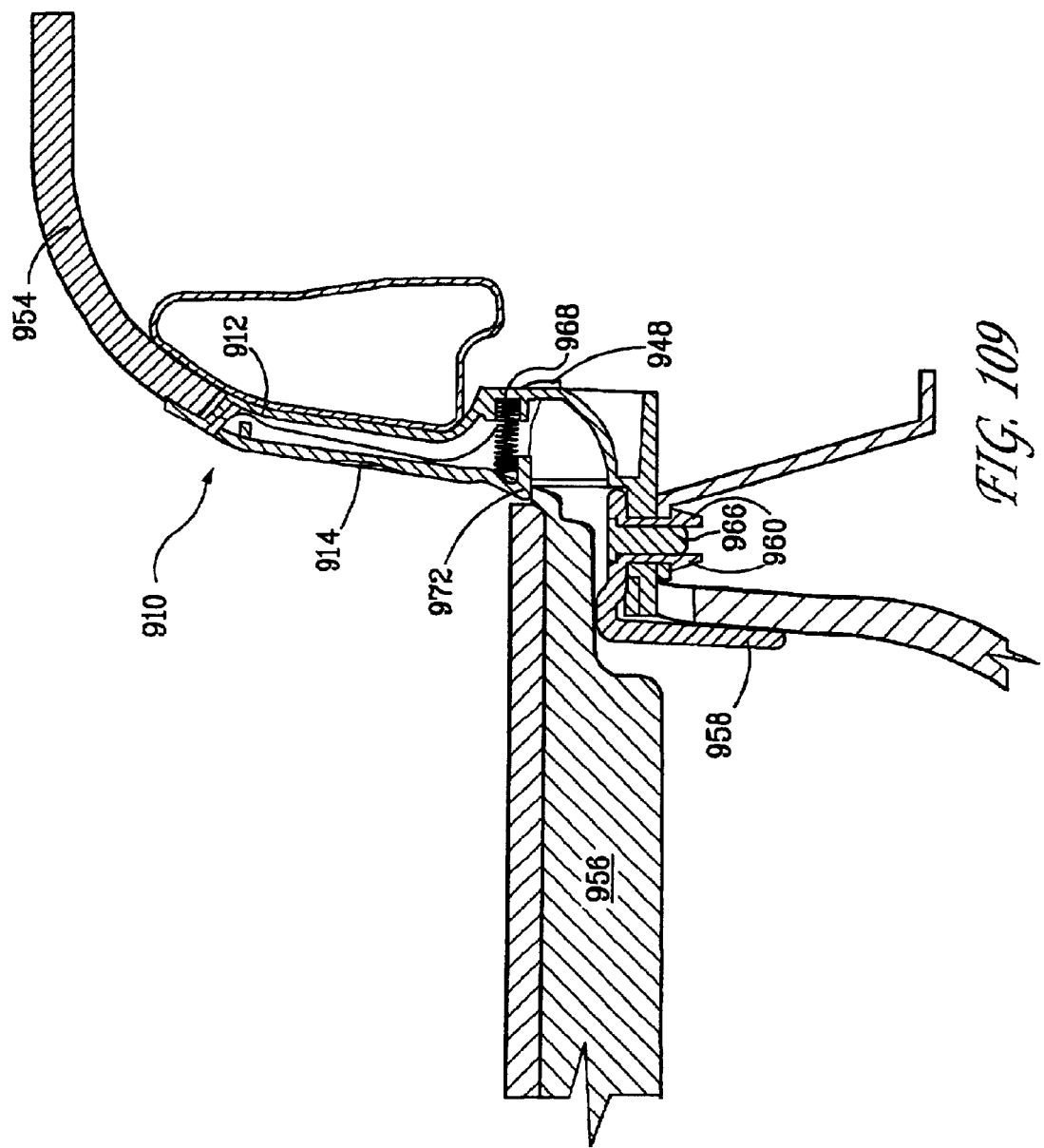
FIG. 109 is a side view of a ninth embodiment of a load floor latch according to the present invention, showing the latch engaging the lid, and the lid in the closed position.
Figure 110:
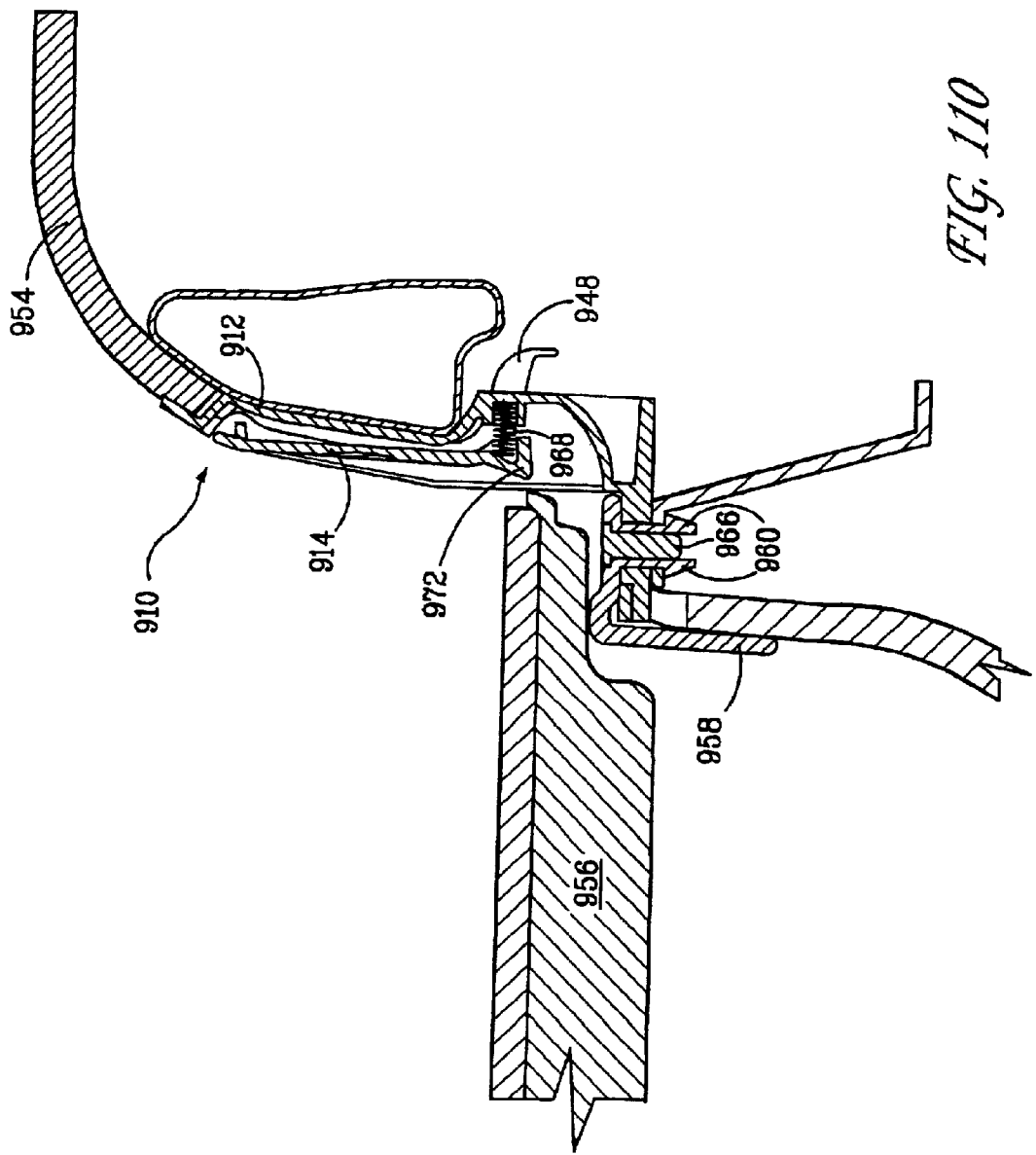
FIG. 110 is a side view of a ninth embodiment of a load floor latch according to the present invention, showing the latch disengaged from the lid, and the lid in the closed position.

The operation of the latch 810 is best illustrated in FIGS. 97 through 102. FIGS. 97 and 100 illustrate the lid 856 closed and the button 814 biased outward by the spring 868, so that the lid 856 is secured in its closed position by the pawl 872. The stop tabs 848 engage the edges of the slots 832, thereby preventing further outward movement of button 814. The ejector 816 is forced down by the lid 856, so that the spring 870 is compressed. Pushing inward on the button 814 disengages the pawl 872 from the lid 856, as illustrated in FIGS. 98 and 101. Once the pawl 872 is disengaged from the lid 856, the spring 870 biases the ejector 816 upward, raising the lid 856 a sufficient height so that it may be easily grasped, as illustrated in FIGS. 99 and 102. The ejector 816 stops moving upward when it strikes the ejector stop 838. The button 814 is free to return to its outward position to which it is biased by the spring 868.

The lid 856 is closed by slamming it shut. The lid will strike the button 814, pushing the pawl 872 inward to permit the lid 856 to pass. The lid will depress the ejector 816 as it passes the pawl 872. Once the lid 856 clears the pawl 72, the spring 868 will bias the button 814 outward until the stop tabs 848 engage the edges of the slots 832, so that the pawl secures the lid 856 closed.

A ninth embodiment of the latch 910 is illustrated in FIGS. 103 through 110. The principal difference between the first and second embodiments is the lack of an ejector in the ninth embodiment. Therefore, the housing 912 does not have aperture 836 and a ejector stop 838. This portion of the housing 912 is filled by inner housing wall 912A. The remainder of the latch 910 is identical to the latch of the eight embodiment 810.

I claim:

1. A load floor latch comprising:
    an actuation assembly;
    a pawl member;
    a lid having connected therewith said actuation assembly and said pawl member; and
    a lid cover enclosing said lid and said pawl member;
    wherein said actuation assembly includes a hoop-shaped handle, a pair of L-shaped arms extending therefrom, and detent features located at the distal ends of each L-shaped arm;
    wherein said L-shaped arms each also have stops attached to the distal end thereof;
    wherein said actuation assembly further includes a leg actuation element having two identical shaft sections connected by a center shaft, wherein said identical shaft sections each have a first end having apertures therein for attachment to said detent features at said distal end of a respective mating one of said L-shaped arms, and each have a second end having snap-in shaft member extending substantially parallel to said center shaft of said actuation element, wherein on one side of each said identical shaft sections is included a strength rib.

2. The load floor latch of claim 1, wherein each said identical shaft section has a camming surface for abutting said stops attached to said distal end of said respective L-shaped arm.

3. The load floor latch of claim 2, wherein said pawl member comprises:
    a body portion having a slam action-type ramped element at one end;
    a living spring having one end thereof integral with and extending from the other end of said body portion; and
    a pawl tail integral with and extending from the of said living spring.

4. The load floor latch of claim 3, wherein said lid includes a pair of central walls, said central walls defining a slot area for positioning said pawl member, and a pair of sidewalls, each said central wall being connected to a respective sidewall by a perpendicular wall.

5. The load floor latch of claim 4, wherein said perpendicular walls each have a positioning tabs to align a respective said snap-in shaft member of one of said identical shaft sections, wherein during activation said hoop-shaped handle is pulled upward, said leg actuation element contacts the lid thereby causing said center shaft thereof to contact and slide upward along said ramped element of said pawl member body portion thereby causing said body portion to retract into said lid against the bias of said living spring.

6. The load floor latch of claim 5, wherein said lid cover includes a camming structure positioned between said central walls for camming said living spring during activation and slam action closure of said latch.

7. The load floor latch of claim 6, wherein said camming structure is a diagonal camming surface extending from said lid to in between said central walls, the end of said diagonal camming surface holding said pawl tail against said lid.

8. The load floor latch of claim 6, wherein said camming structure is a cross member pawl tail holder extending between said central walls, said pawl tail being held against said lid by said pawl tail holder.

9. The load floor latch of claim 8, wherein said lid includes an aperture for accessibility to said pawl tail.

10. The load floor latch of one of claims 7 to 8, wherein said lid is flat and continuous.

11. The load floor latch of one of claims 7 to 8, wherein said lid cover is flat and compliments the shape of said lid.

12. The load floor latch of claim 8, wherein said cross member pawl tail holder is a support bar which traverses said slot area and is attached to each of said central walls.

13. The load floor latch of claim 1, further including:
    a housing for maintaining said actuation assembly and said pawl member; wherein said housing comprises a pair of side wall sections having an interior and exterior. surfaces, wherein said pair of sidewalls connected by a perpendicular sidewall, wherein said pair of side wall sections define a slot area having a back wall for positioning of said pawl member, wherein said exterior surfaces contain a plurality of snap legs, wherein said side walls have a plurality of aperture for attachment of said actuation assembly; and
    a lid having a plurality of walls designed to compliment the shape of said housing for attachment thereof, wherein said walls have engagement recesses.

14. The load floor latch of claim 13, wherein said actuation means comprises a hoop actuation element having a hoop handle attached proximal to a pair of L-shaped arms extending therefrom, wherein said L-shaped arms have integral detent features on the distal ends.

15. The load floor latch of claim 14, wherein said actuation means further comprises a leg actuation element having two identical shaft sections connected by a center shaft, wherein said identical sections have a first end having apertures therein for attachment to said detent feature on said hoop actuation and a second end having snap-in shaft member substantially parallel to said center shaft for attachment to said side walls of said lid, wherein during activation of said latch said leg actuation element contact said lid when said hoop handle is pulled upward causing said central shaft to slide upward along said ramped element against the bias of said living spring thereby forcing the pawl member to disengage a frame.

16. The load floor latch of claim 15, wherein said pawl member comprises a body portion integral at one end with a living spring wherein said living spring terminates with a pawl tail, wherein a second end of said body portion comprises a slam action ramped element.

17. The load floor latch of claim 16, wherein said pawl body portion has extended side sections each having a sliding surface thereon.

18. The load floor latch of claim 17, wherein said slot area of said housing comprising a pair of guide attached to said interior surface of said pair of side wall sections for guiding and restraining said sliding surfaces of said extended area of said pawl member body, wherein said plot further comprises a pawl holder for camming said pawl tail.

19. The load floor latch of claim 16, wherein said housing comprising a protruding flange and a surface flange for attachment to said lid, wherein said back wall comprises a slot for positioning of said pawl tail.

20. The load floor latch of claim 19, wherein said lid has a flange slot for mating with said protruding flange of said housing, wherein the housing further includes mounting studs for mating with said snap legs of said housing.

* * * * *

UNITED STATES PATENT AND TRADEMARK OFFICE
CERTIFICATE OF CORRECTION

PATENT NO. : 6,786,518 B2
DATED : September 7, 2004
INVENTOR(S) : Fabrice Vitry

It is certified that error appears in the above-identified patent and that said Letters Patent is hereby corrected as shown below:

Column 3,
Lines 22 and 49, insert -- invention -- between "present" and ".";

Column 4,
Lines 15 and 66, delete the period "." between "latch" and "according";
Line 63, replace "Latch" with -- latch --;

Columns 4-5,
Figs. 58-77, in the phrase "six embodiment". replace "six" with -- sixth --;

Column 5,
Lines 3, 6, 34 and 37, add a period -- . -- after "invention";

Column 6,
Fig. 88, in the phrase "eight embodiment" replace "eight" with -- eighth --;
Figs. 89-100, in the phrase "eight embodiment" replace "eight" with -- eighth -- and delete the duplicate "present invention";

Column 7,
Fig. 101, in the phrase "eight embodiment" replace "eight" with -- eighth --;
Fig. 102, in the phrase "eight embodiment" replace "eight" with -- eighth -- and delete the duplicate "present invention";
Lines 13 and 16, in the phrase "a housing for s ninth embodiment" replace "s" with -- a --;

Column 9,
Lines 31-34, replace the phrase beginning with "Also, for ease of reference,..." with
-- Also, for ease of reference, portions in this embodiment similar to the latch 10 will be described using the same number designation except beginning with 210. --.
Lines 60-63, replace the phrase beginning with "Also, for ease of reference,..." with
-- Also, for ease of reference, portions in this embodiment similar to the latch 10 will be described using the same number designations except beginning with 310. --.

UNITED STATES PATENT AND TRADEMARK OFFICE
CERTIFICATE OF CORRECTION

PATENT NO.    : 6,786,518 B2
DATED         : September 7, 2004
INVENTOR(S)   : Fabrice Vitry It is certified that error appears in the above-identified patent and that said Letters Patent is hereby corrected as shown below:

Column 10,
Line 33, replace the comma "," after "brevity" with a period -- . --;
Lines 33-36, replace the phrase beginning with "Also, for ease of reference,..." with
-- Also, for ease of reference, portions in this embodiment similar to the latch 10 will be described using the same number designations except beginning with 410. --;
Line 55, the phrase "latch 50" should read -- latch 510 --;
Lines 56-59, replace the phrase beginning with "Also, for ease of reference,..." with
-- Also, for ease of reference, portions in this embodiment similar to the latch 10 will be described using the same number designations except beginning with 510. --;
Line 65, replace "100.e" with -- 100. The --;

Column 11,
Lines 31-32, replace the phrase "into the recesses 546A; 546B. 546A. 548B." with .
-- into the recesses 546A, 546B, 548A, 548B, --;
Line 56, replace the comma "," after "brevity" with a period -- . --;
Lines 56-59, replace the phrase beginning with "Also, for ease of reference,..." with
-- Also, for ease of reference, portions in this embodiment similar to the latch 10 will be described using the same number designations except beginning with 610. --;
Line 63, replace "The housing 12" with -- The housing 612 --;

Column 12,
Lines 14 and 16, replace "646, 48" with -- 646, 648 --;
Line 57, replace "20" with -- 620 --;
Line 58, replace "86" with -- 686 --;

Column 13,
Lines 6-7, the phrase "the latch 710 from the latch 710" should read -- the latch 710 from the latch 10 --;
Line 7. replace the comma "," after "brevity" with a period -- . --;
Lines 7-10, replace the phrase beginning with "Also, for ease of reference,..." with
-- Also, for ease of reference, portions in this embodiment similar to the latch 10 will be described using the same number designation except beginning with 710. --;

UNITED STATES PATENT AND TRADEMARK OFFICE
CERTIFICATE OF CORRECTION

PATENT NO. : 6,786,518 B2
DATED : September 7, 2004
INVENTOR(S) : Fabrice Vitry

It is certified that error appears in the above-identified patent and that said Letters Patent is hereby corrected as shown below:

Column 14,
Line 14, replace "500" with -- 810 --;
Line 15, replace the comma "," after "brevity" with a period -- . --;
Lines 15-18, replace the phrase beginning with "Also, for ease of reference...." with -- Also, for ease of reference, portions in this embodiment similar to the latch 10 will be described using the same number designation except beginning with 810. --;
Line 19, delete "The invention is a load floor latch" and start paragraph with "Referring to Figs. 88-89...";
Line 22, replace "12" with -- 812 --;
Line 57, replace "Figs. 88-89 and 810." with -- Figs. 88-89 and 96-102. --;

Column 15,
Line 6, replace "26" with -- 826 --:
Line 14, replace "64" with -- 864 --;
Line 39, replace "72" with -- 872 --;

Column 16,
Line 50, replace the phrase "eight embodiment" with -- eighth embodiment --;
Line 7, delete "of said" in the phrase "extending from the of said living spring";

Column 18,
Line 5, replace "plot" with -- slot --.

Signed and Sealed this

Eighteenth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,786,518 B2  
APPLICATION NO. : 09/880525  
DATED : September 7, 2004  
INVENTOR(S) : Fabrice Vitry Page 1 of 1

It is certified that error appears in the above-identified patent and that said Letters Patent is hereby corrected as shown below:

Column 15, line 50, replace the phrase "eight embodiment" with --eighth embodiment--;
Column 16, line 18, delete "of said" in the phrase "extending from the of said living spring";
Column 16, line 25, replace "tabs" with --tab--;
Column 18, line 10, replace "plot" with --slot--.

Signed and Sealed this

Eighth Day of July, 2008

JON W. DUDAS  
*Director of the United States Patent and Trademark Office*